(12) United States Patent
Takita et al.

(10) Patent No.: US 8,025,157 B2
(45) Date of Patent: Sep. 27, 2011

(54) POWER RECOVERY SYSTEM

(75) Inventors: Shigeo Takita, Ohta-ku (JP); Masao Shinoda, Fujisawa (JP); Takashi Yamanaka, Ohta-ku (JP); Akira Goto, Ohta-ku (JP); Hideki Kanno, Ohta-ku (JP)

(73) Assignee: EBARA Corporation, Tokyo (JP)

( * ) Notice: Subject to any disclaimer, the term of this patent is extended or adjusted under 35 U.S.C. 154(b) by 247 days.

(21) Appl. No.: 12/256,145

(22) Filed: Oct. 22, 2008

(65) Prior Publication Data

US 2009/0110563 A1 Apr. 30, 2009

(30) Foreign Application Priority Data

Oct. 25, 2007 (JP) .................. 2007-277991

(51) Int. Cl.
*B01D 24/00* (2006.01)
*B01D 25/00* (2006.01)
*B01D 63/00* (2006.01)
*C02F 3/12* (2006.01)
*B01D 61/00* (2006.01)

(52) U.S. Cl. ............... 210/416.2; 210/257.2; 210/195.1; 210/652

(58) Field of Classification Search .................. 210/652, 210/257.2, 416.2, 195.1
See application file for complete search history.

(56) References Cited

U.S. PATENT DOCUMENTS

| | | | | |
|---|---|---|---|---|
| 4,141,825 A | * | 2/1979 | Conger | 210/638 |
| 4,367,140 A | | 1/1983 | Wilson | |
| 5,306,428 A | * | 4/1994 | Tonner | 210/652 |
| 5,797,429 A | | 8/1998 | Shumway | |
| 6,017,200 A | * | 1/2000 | Childs et al. | 417/404 |
| 6,139,740 A | * | 10/2000 | Oklejas | 210/321.66 |
| 6,468,431 B1 | * | 10/2002 | Oklelas, Jr. | 210/652 |
| 6,491,813 B2 | * | 12/2002 | Verde | 210/137 |
| 6,797,173 B1 | * | 9/2004 | Oklejas, Jr. | 210/652 |
| 7,168,927 B2 | * | 1/2007 | Brueckmann et al. | 417/392 |
| 7,566,402 B2 | * | 7/2009 | Thorsen et al. | 210/652 |

OTHER PUBLICATIONS

Beat Schneider, "Selection, operation and control of a work exchanger energy recovery system based on the Singapore project", Desalination, vol. 184, 2005, pp. 1177-1190.

* cited by examiner

*Primary Examiner* — Ana M Fortuna
(74) *Attorney, Agent, or Firm* — Oblon, Spivak, McClelland, Maier & Neustadt, L.L.P.

(57) ABSTRACT

A power recovery system is used for reducing the total energy consumption in a process such as an industrial treating process or a fluid refining process including the delivery of a fluid under a high pressure. The power recovery system includes a high-pressure pump for pressuring raw water, a reverse osmosis membrane cartridge for treating high-pressure water discharged from the high-pressure pump with a reverse osmosis membrane to produce treated water, a positive-displacement piston pump for pressuring raw water under the pressure of concentrated water which is discharged from the reverse osmosis membrane cartridge without being treated by the reverse osmosis membrane, and a power recovery pump turbine for boosting the pressurized raw water discharged from the positive-displacement piston pump and adding the boosted water to the high-pressure water discharged from the high-pressure pump. The power recovery pump turbine is actuated by pressurized water generated in the power recovery system.

30 Claims, 29 Drawing Sheets

POWER RECOVERY SYSTEM

BACKGROUND OF THE INVENTION

1. Field of the Invention

The present invention relates to a power recovery system for reducing the total energy consumption in a process such as an industrial treating process or a fluid refining process including the delivery of a fluid under a high pressure. Particularly, the present invention is preferably used for a power recovery system serving as a consumption energy reducing means in a seawater desalination plant which employs a reverse osmosis membrane method for removing salinity from seawater.

2. Description of the Related Art

Industrial treating processes or fluid refining processes that use a high-pressure fluid require high cost of power to refine the high-pressure fluid. Several methods have been attempted to recover energy from the high-pressure fluid after the processes. As a typical example of such processes according to the related art, a seawater desalination plant which employs a reverse osmosis membrane method and its problems will be described below.

A seawater desalination plant which employs a reverse osmosis membrane method is composed mainly of a pretreatment system, a high-pressure pump, a reverse osmosis membrane cartridge, and a power recovery system. When seawater is introduced into the seawater desalination plant, the seawater is processed to have certain water qualities by the pretreatment system, and then delivered into the reverse osmosis membrane cartridge under pressure by the high-pressure pump. Part of the high-pressure seawater in the reverse osmosis membrane cartridge passes through the reverse osmosis membrane against the reverse osmosis pressure and is desalinated, and fresh water is taken out from the reverse osmosis membrane cartridge. The remaining concentrated seawater with a high salt content is discharged as a reject from the reverse osmosis membrane cartridge. The operational costs of the seawater desalination plant include electric expenses as the highest cost, and more than half of the electric expenses are consumed to operate the high-pressure pump for pressurizing the seawater. There have been proposed various power recovery systems for effectively recovering the pressure energy from the high-pressure reject with the high salt content which has been discharged from the reverse osmosis membrane cartridge.

One of the proposed power recovery systems is a Pelton-wheel power recovery system in which the high-pressure reject is converted into a high-speed jet by nozzles, and the kinetic energy of the high-speed jet is recovered by a Pelton wheel and used to assist motive energy of a motor that drives the high-pressure pump. The Pelton-wheel power recovery system will hereinafter be also referred to as "Related art A". In this system, the Pelton wheel and a pump impeller are generally mounted on one main shaft, and their rotational speeds cannot be changed independently of each other. Although the Pelton wheel is highly efficient itself, if the seawater desalination plant that is combined with the Pelton-wheel power recovery system is to be operated according to seasonal variations in plant throughput, then the Pelton wheel occasionally needs to be operated at much lower efficiencies than its highest possible efficiency.

Another power recovery system for recovering energy from a high-pressure reject has a turbine runner and a pump impeller that are mounted on one main shaft as an assembly called a power recovery pump turbine. In the power recovery pump turbine, the turbine is rotated by the high-pressure reject to drive the pump that is used as a booster pump, thereby reducing the power required to operate a high-pressure pump for pressurizing seawater. The power recovery system of this type has two variations. According to one variation, the seawater from the pretreatment system is divided and supplied to the high-pressure pump and the pump of the power recovery pump turbine, and the seawater pressurized by the pump of the power recovery pump turbine is added to the seawater pressurized by the high-pressure pump. According to the other variation, the entire seawater from the pretreatment system is supplied to both the high-pressure pump and the pump of the power recovery pump turbine. The former variation will hereinafter be also referred to as "Related art B", and the latter variation as "Related art C". According to Related art B, if the turbine efficiency of the power recovery pump turbine is low, then the power recovery system fails to recover sufficient power, and because the power recovery pump turbine bears the same head as the high-pressure pump, the power recovery pump turbine tends to adversely affect the entire system if its efficiency is low. According to Related art C, because the entire seawater is supplied from the pretreatment system to the pump of the power recovery pump turbine, the power recovery pump turbine is liable to adversely affect the overall energy efficiency of the seawater desalination plant if its pump has a low performance.

Still another power recovery system comprises a positive-displacement piston pump having a piston that is actuated in a cylinder by a high-pressure reject supplied thereto to recover energy from the reject. The power recovery system will hereinafter be also referred to as "Related art D". It is the general practice to place a low-head variable-speed inverter-driven booster pump downstream of the positive-displacement piston pump in order to compensate for a pressure loss caused by a control valve. It is known in the art that the booster pump needs to be of a special pump structure with a high inlet pressure and requires an expensive mechanical seal having high pressure resistance. The power recovery system possesses relatively low reliability because this system includes more electric devices to be supplied with energy from external sources than other power recovery systems.

The above power recovery systems according to the related art will be described in detail below.

Related Art A:

A power recovery system according to Related art A which employs a turbine for recovering energy from a high-pressure fluid that has been processed in an industrial treating process or a fluid refining process will be described below with reference to FIG. 26 of the accompanying drawings. A seawater desalination plant which employs a reverse osmosis membrane method will be described as a typical example of the industrial treating process, and problems of Related art A will be described in specific detail below.

When seawater 1 is pumped into the seawater desalination plant by an intake pump 2, the seawater 1 is processed to have certain water qualities by a pretreatment system 3, and then pressurized and delivered via a high-pressure line 7 into a reverse osmosis membrane cartridge 8 by a high-pressure pump 5 that is driven by an electric motor 6. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a reject from the reverse osmosis membrane cartridge 8 into a concentrated seawater line 13. The pressure energy of the high-pressure reject discharged from the reverse osmosis membrane cartridge 8 is recovered as power by a turbine 14 having a rotating impeller. The recovered power contributes to reduction of the drive power generated by the electric motor 6 which is coaxially coupled to the turbine impeller. The reject from which the pressure energy has been removed by the turbine 14 is discarded as a low-pressure turbine reject 15.

For example, it is assumed that a seawater desalination plant including 16 trains of seawater desalination apparatuses combined with the power recovery system according to Related art A produces about 50 MGD (Megagalons per day) and its reverse osmosis membrane cartridges are placed under a pressure of about 7.7 MPa to desalinate 28% of the intake seawater. In this case, the turbine recovers about 2280 kW of energy per train at an efficiency of 88%, and it is possible to reduce the power required to drive the high-pressure pump to about 2090 kW. However, if the turbine efficiency drops by 5% in a case where optimized operation of the turbine is impeded for the reasons described above with respect to Related art A, then the seawater desalination plant fails to recover about 130 kW of energy. As the type of turbine, a Pelton turbine is often used. In this case, the high-pressure reject is ejected as a high-speed jet into the atmosphere and then impinges upon the buckets of the turbine impeller to drive the turbine impeller. When the reject impinges upon the buckets, its pressure drops to the atmospheric pressure. Therefore, the seawater desalination plant requires ancillary facilities such as pumps for discarding the reject from the discharge line.

When the seawater desalination plant is to desalinate 45% of the intake seawater, the turbine recovers about 1080 kW of energy per train at an efficiency of 88%, and it is possible to reduce the power required to drive the high-pressure pump to about 1630 kW. If it is assumed that the turbine efficiency drops by 5%, then the seawater desalination plant fails to recover about 60 kW of energy.

Related Art B:

A power recovery system according to Related art B which employs a mechanical apparatus called "power recovery pump turbine" or "turbocharger pump" will be described below with reference to FIG. 27 of the accompanying drawings. The power recovery pump turbine or turbocharger pump comprises a pump impeller and a turbine impeller which are coupled to each other by a single shaft such that the pump impeller is driven only by the power recovered by the turbine impeller.

When seawater 1 is pumped into the seawater desalination plant by an intake pump 2, the seawater 1 is processed to have certain water qualities by a pretreatment system 3, and then pressurized and delivered via a high-pressure line 7 into a reverse osmosis membrane cartridge 8 by a high-pressure pump 5 that is driven by an electric motor 6. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a reject from the reverse osmosis membrane cartridge 8 into a concentrated seawater line 13. The high-pressure reject discharged from the reverse osmosis membrane cartridge 8 is introduced into a turbine 14 of a power recovery pump turbine 18 to drive a turbine impeller disposed in a casing of the turbine 14. Thus, a pump impeller in a booster pump 17 that is coupled to the turbine 14 by a rotational shaft 16 is rotated, and the pressure energy possessed by the high-pressure reject is recovered as effective power. The reject from which the pressure energy has been removed by the turbine 14 is discarded as a low-pressure turbine reject 15. The recovered power is consumed to rotate the pump impeller that is coaxially coupled to the turbine impeller. Part of the seawater from the pretreatment system 3 is supplied via a supply line 4 to the booster pump 17, and is pumped by the booster pump 17. The pumped seawater flows through a booster pump outlet line 19 into the high-pressure line 7 where it is added to the seawater from the high-pressure pump 5. The combined seawater is supplied to the reverse osmosis membrane cartridge 8. As a consequence, when the seawater desalination plant is to produce a certain amount of desalinated water, the amount of seawater to be pressurized by the high-pressure pump 5 may be decreased, thus reducing the cost of electric power required to drive the high-pressure pump 5 by the motor 6.

The turbine impeller is driven by the high-pressure seawater that is supplied under a pressure of 7 MPa or higher from the reverse osmosis membrane cartridge 8. Accordingly, there is a narrow choice of the turbine 14. Also, there is a narrow choice of the pump coaxially coupled to the turbine 14 in order to ensure high efficiency.

It is assumed that a seawater desalination plant including 16 trains of seawater desalination apparatuses combined with the power recovery system according to Related art B produces about 50 MGD (Megagalons per day) and its reverse osmosis membrane cartridges desalinate 28% of the intake seawater. In this case, it is possible to reduce the power required to drive the high-pressure pump to about 1960 kW per train. When the seawater desalination plant is to desalinate 45% of the intake seawater, it is possible to reduce the power required to drive the high-pressure pump to about 1570 kW. However, if the pump and turbine efficiencies of the power recovery pump turbine 18 drop by 5% due to the narrow choice of the turbine 14 and the booster pump 17, then the power consumption increases by 120 kW for desalinating 28% of the intake seawater and by 160 kW for desalinating 45% of the intake seawater. Since the latter desalinating process requires a Pelton turbine as the turbine, the seawater desalination plant requires ancillary facilities such as pumps for discarding the reject from the discharge line, and the power recovery pump turbine is expected to be operated at a rotational speed of 5000 rpm or higher.

Related Art C:

A power recovery system according to Related art C which employs a power recovery pump turbine as a high-pressure booster pump will be described below with reference to FIG. 28 of the accompanying drawings.

When seawater 1 is pumped into the seawater desalination plant by an intake pump 2, the seawater 1 is processed to have certain water qualities by a pretreatment system 3, and then pressurized and delivered via a high-pressure line 7 to a booster pump 17 of a power recovery pump turbine 18 by a high-pressure pump 5 that is driven by an electric motor 6. The seawater 1 is then delivered from the booster pump 17 via a booster pump outlet line 19 into a reverse osmosis membrane cartridge 8. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a reject from the reverse osmosis membrane cartridge 8 into a concentrated seawater line 13. The high-pressure reject discharged from the reverse osmosis membrane cartridge 8 is introduced into a turbine 14 of the power recovery pump turbine 18 to drive a turbine impeller disposed in a casing of the turbine 14. Thus, a pump impeller in the booster pump 17 that is coupled to the turbine 14 by a rotational shaft 16 is rotated, and the pressure energy possessed by the high-pressure reject is recovered as effective power. The reject from which the pressure energy has been removed by the turbine 14 is discarded as a low-pressure turbine reject 15. The recovered power is consumed to rotate the pump impeller that is coaxially coupled to the turbine impeller, thereby further boosting the seawater supplied from the high-pressure line 7. The power recovery system according to Related art C is theoretically as effective as the power recovery system according to Related art B in reducing the power required to desalinate seawater.

Related Art D:

A power recovery system according to Related art D which comprises a positive-displacement power recovery system will be described below with reference to FIG. 29 of the accompanying drawings. In the power recovery system according to Related art D, the high-pressure energy of the reject from a reverse osmosis membrane cartridge is supplied to actuate the pistons in a pair of power recovery chambers of a positive-displacement piston pump, thereby pumping the intake seawater.

When seawater 1 is pumped into the seawater desalination plant by an intake pump 2, the seawater 1 is processed to have certain water qualities by a pretreatment system 3, and then pressurized and delivered via a high-pressure line 7 into a reverse osmosis membrane cartridge 8 by a high-pressure pump 5 that is driven by an electric motor 6. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a reject from the reverse osmosis membrane cartridge 8 into a concentrated seawater line 13. The high-pressure reject discharged from the reverse osmosis membrane cartridge 8 is introduced through a control valve 20 into a pair of power recovery chambers 21 of a positive-displacement piston pump 23, thereby actuating pistons in the power recovery chambers 21. The reject from which the pressure energy has been removed by actuating the pistons is discarded as a low-pressure turbine reject 15. Part of the seawater in the supply line 4 is pumped by the positive-displacement piston pump 23, and the pumped seawater is discharged to a supply seawater bypass boost line 24, and is finally be added to the high-pressure seawater supplied from the high-pressure pump 5. The pressure of the seawater in the supply seawater bypass boost line 24 is lower than the pressure of the seawater in the high-pressure line 7 because of a pressure loss caused by the reverse osmosis membrane cartridge 8 and the piping, a pressure loss caused by the control valve 20, and a leakage loss caused by leakage of fluid between the power recovery chambers 21 and the pistons disposed therein. In order to combine the seawater in the supply seawater bypass boost line 24 and the seawater in the high-pressure line 7 with each other, a booster pump 17 which is driven by a motor 26 is provided between the supply seawater bypass boost line 24 and a booster pump outlet line 19.

It is assumed that a seawater desalination plant including 16 trains of seawater desalination apparatuses combined with the power recovery system according to Related art D produces about 50 MGD (Megagalons per day) and its reverse osmosis membrane cartridges desalinate 28% of the intake seawater. In this case, it is possible to reduce the power required to drive the high-pressure pump to about 1440 kW per train. When the seawater desalination plant is to desalinate 45% of the intake seawater, it is possible to reduce the power required to drive the high-pressure pump to about 1330 kW. The head required for the booster pump 17 is of a small value equivalent to a pressure loss caused by the piping and the like. However, since the pressure at the inlet of the booster pump 17 is of a high level of about 7 MPa, the booster pump 17 needs to be a special pump having a high-pressure seal structure.

SUMMARY OF THE INVENTION

The present invention has been made in view of the above problems in the art. It is therefore an object of the present invention to provide a power recovery system which is capable of reducing the total energy consumption in a process such as an industrial treating process or a fluid refining process including the delivery of a fluid under a high pressure.

In order to achieve the above object, according to a first aspect of the present invention, there is provided a power recovery system comprising: a high-pressure pump for pressuring raw water; a reverse osmosis membrane cartridge for treating high-pressure water discharged from the high-pressure pump with a reverse osmosis membrane to produce treated water; a positive-displacement piston pump for pressuring raw water under the pressure of concentrated water which is discharged from the reverse osmosis membrane cartridge without being treated by the reverse osmosis membrane; and a power recovery pump turbine for boosting the pressurized raw water discharged from the positive-displacement piston pump and adding the boosted water to the high-pressure water discharged from the high-pressure pump; wherein the power recovery pump turbine is actuated by pressurized water generated in the power recovery system.

The power recovery system according to the present invention recovers energy from an industrial process when a fluid is delivered under a high pressure into the industrial process and at least a portion of the fluid is discharged under the high pressure from the industrial process. The fluid which is boosted by the high-pressure pump, introduced into the industrial process, and then discharged under the high pressure from the industrial process is supplied through a control valve to actuate the pistons of at least two cylinders, which operate as a positive-displacement piston pump to recover most of the energy of the high-pressure fluid. At the same time, a pressure loss caused by the control valve of the positive-displacement piston pump is compensated for by a power recovery pump turbine which comprises a turbine actuated by pressurized water generated in the power recovery system and a booster pump fixed coaxially to the turbine.

The positive-displacement piston pump is capable of operating highly efficiently irrespectively of operating conditions, and can efficiently recover most of the energy of the high-pressure fluid. Because the pressure loss caused by the control valve or the like is compensated for by the power recovery pump turbine, an electric motor and an inverter, i.e., electric devices to be supplied with energy from an external source and their wirings, which would otherwise be required by the booster pump, and special mechanical seals for sealing a high suction pressure can be eliminated. Furthermore, the power recovery pump turbine may be a low-head device for producing a relatively low pressure loss caused by the control valve or the like, and has a very small adverse effect on the energy efficiency of the entire power recovery system even through the power recovery pump turbine is of low performance.

Pumps and turbine devices are difficult to be increased in performance if their heads are large compared with the flow rates. According to the present invention, however, the fluid performance of the power recovery pump turbine can be realized under substantially optimum design conditions.

In a preferred aspect of the present invention, the power recovery system further comprises an intake pump for drawing in the raw water and supplying the raw water to the high-pressure pump and the positive-displacement piston pump.

According to the present invention, the intake pump draws in the raw water, and supplies the raw water to the high-pressure pump, and also supplies the raw water to the positive-displacement piston pump via a bypass line branched from line connected to the high-pressure line.

In a preferred aspect of the present invention, the pressurized water comprises the high-pressure water discharged from the high-pressure pump.

According to the present invention, the pressurized water for actuating the power recovery pump turbine is the high-pressure water pressurized by the high-pressure pump. The high-pressure water from the high-pressure pump is supplied in its entirety to a turbine of the power recovery pump turbine.

In a preferred aspect of the present invention, the pressurized water comprises a portion of the concentrated water which is discharged from the reverse osmosis membrane cartridge.

According to the present invention, the pressurized water for actuating the power recovery pump turbine is a portion of the concentrated water which is discharged from the reverse osmosis membrane cartridge. Specifically, the concentrated water which is discharged from the reverse osmosis membrane cartridge is supplied to the positive-displacement piston pump, and a portion of the concentrated water is branched upstream of the positive-displacement piston pump and supplied to the turbine of the power recovery pump turbine.

In a preferred aspect of the present invention, the power recovery pump turbine comprises a single rotational shaft, a turbine, and a booster pump, the turbine and the booster pump being mounted on the single rotational shaft; the turbine is connected to a high-pressure line interconnecting the high-pressure pump and the turbine; and the booster pump is connected to a supply water bypass boost line interconnecting the positive-displacement piston pump and the high-pressure line.

In a preferred aspect of the present invention, the power recovery pump turbine comprises a single rotational shaft, a turbine, and a booster pump, the turbine and the booster pump being mounted on the single rotational shaft; the turbine is connected to a concentrated water branch line branched from a concentrated water line through which the concentrated water discharged from the reverse osmosis membrane cartridge flows; and the booster pump is connected to a supply water bypass boost line interconnecting the positive-displacement piston pump and the high-pressure line.

In a preferred aspect of the present invention, the power recovery system further comprises a high-pressure pump outlet valve for controlling the flow rate of the high-pressure water discharged from the high-pressure pump; a turbine inlet valve for controlling the flow rate of the concentrated water which flows into the turbine; a booster pump outlet valve for controlling the flow rate of boosted water discharged from the booster pump; and a power recovery output valve for controlling the concentrated valve discharged from a control valve of the positive-displacement piston pump.

In a preferred aspect of the present invention, the power recovery system further comprises a supply water flow meter for measuring the flow rate of the raw water supplied from the intake pump; a treated water flow meter for measuring the flow rate of the treated water discharged from the reverse osmosis membrane cartridge; a concentrated water flow meter for measuring the flow rate of the concentrated water discharged from the reverse osmosis membrane cartridge; a supply water bypass flow meter for measuring the flow rate of a portion of the raw water branched from the intake pump and introduced into a switching valve of the positive-displacement piston pump; and a turbine inlet flow meter for measuring the flow rate of a portion of the concentrated water discharged from the reverse osmosis membrane cartridge.

In a preferred aspect of the present invention, the positive-displacement piston pump comprises: a control valve for introducing the concentrated water and changing flow paths for the concentrated water; a switching valve for selectively drawing and discharging the supplied raw water; and a power recovery chamber for transmitting the energy of the concentrated water supplied from the control valve to the raw water supplied from said switching valve.

According to the present invention, the concentrated water discharged from the reverse osmosis membrane cartridge is introduced through the control valve into the power recovery chamber. The raw water introduced from the switching valve is boosted by the power recovery chamber with the energy of the concentrated water. The boosted raw water is then supplied to the power recovery pump turbine.

According to a second aspect of the present invention, there is provided a power recovery apparatus comprising: a power recovery pump turbine comprising a single rotational shaft, a turbine, and a booster pump, the turbine and the booster pump being mounted on the single rotational shaft; the turbine comprising a turbine for introducing high-pressure water pressurized by a high-pressure pump and converting the pressure of the high-pressure water into rotational power; the booster pump comprising a booster pump for boosting pressurized water pressurized by a positive-displacement piston pump with the rotational power transmitted through the rotational shaft; the turbine comprising a tubular turbine casing having an inlet port and an outlet port, the rotational shaft positioned diametrically centrally in the tubular turbine casing, and a turbine impeller mounted on an end of the rotational shaft; and the booster pump comprising a tubular booster pump casing having an inlet port and an outlet port, the rotational shaft positioned diametrically centrally in the tubular booster pump casing, and a booster pump impeller mounted on an end of the rotational shaft.

According to the present invention, the booster pump is actuated by the pressurized water in the power recovery apparatus, and hence no electric motor is required and the power recovery apparatus is inexpensive to manufacture as its cost includes no electric motor. Since electric motor wiring is not required, the power recovery apparatus is inexpensive to manufacture as its cost includes no electric motor wiring. The maintenance cost for the power recovery apparatus is relatively low as no maintenance is required for electric motor and electric motor wiring.

The power recovery apparatus is highly reliable in operation as a whole as the booster pump suffers no emergency shutdown due to electric trouble.

In a preferred aspect of the present invention, the tubular turbine casing and the tubular booster pump casing are disposed parallel to each other, the rotational shaft extending through the tubular turbine casing and the tubular booster pump casing and being rotatably supported by a support member provided on the tubular turbine casing and the tubular booster pump casing.

In a preferred aspect of the present invention, the turbine impeller comprises an axial-flow impeller and the booster pump impeller comprises an axial-flow impeller.

According to a third aspect of the present invention, there is provided a power recovery apparatus comprising: a power recovery pump turbine comprising a single rotational shaft, a turbine, and a booster pump, the turbine and the booster pump being mounted on the single rotational shaft; the turbine comprising a turbine for introducing a portion of concentrated water discharged from a reverse osmosis membrane cartridge and converting the pressure of the concentrated water into rotational power; the booster pump comprising a booster pump for boosting pressurized water pressurized by a positive-displacement piston pump with the rotational power transmitted through the rotational shaft; the turbine comprising a turbine casing having an inlet port and an outlet port, the rotational shaft positioned in the turbine casing, and a turbine impeller mounted on an end of the rotational shaft; the booster pump comprising a booster pump casing having an inlet port and an outlet port, the rotational shaft positioned in the booster pump casing, and a booster pump impeller mounted on an end of the rotational shaft; and the turbine casing and the booster casing having respective end faces, which are remote from the inlet and outlet ports, held in abutment against and fastened to each other in an axial direction of the rotational shaft, the rotational shaft being rotatably supported by a bearing device disposed between the turbine casing and the booster casing.

According to the present invention, the booster pump is actuated by the pressurized water in the power recovery apparatus, and hence no electric motor is required and the power recovery apparatus is inexpensive to manufacture as its cost includes no electric motor. Since electric motor wiring is not required, the power recovery apparatus is inexpensive to manufacture as its cost includes no electric motor wiring. The maintenance cost for the power recovery apparatus is relatively low as no maintenance is required for electric motor and electric motor wiring.

The power recovery apparatus is highly reliable in operation as a whole as the booster pump suffers no emergency shutdown due to electric trouble.

In a preferred aspect of the present invention, the turbine impeller is rotatably supported by a bearing device in the turbine casing.

In a preferred aspect of the present invention, the turbine impeller comprises a centrifugal impeller and the booster pump impeller comprises a mixed-flow impeller or an axial-flow impeller.

According to a fourth aspect of the present invention, there is provided a method of recovering power comprising: pressurizing raw water with a high-pressure pump, introducing the pressurized high-pressure water into a reverse osmosis membrane cartridge, and treating the high-pressure water with a reverse osmosis membrane to produce treated water; introducing concentrated water which is discharged from the reverse osmosis membrane cartridge without being treated by the reverse osmosis membrane into a positive-displacement piston pump, and pressuring supplied raw water under the pressure of the concentrated water in the positive-displacement piston pump; and actuating a turbine of a power recovery pump turbine under the pressure of the high-pressure water pressurized by the high-pressure pump or a portion of the concentrated water discharged from the reverse osmosis membrane cartridge, boosting the pressurized water pressurized by the positive-displacement piston pump with a booster pump of the power recovery pump turbine, and adding the boosted water to the high-pressure water discharged from the high-pressure pump.

According to the present invention, the fluid which is boosted by the high-pressure pump, introduced into the industrial process, and then discharged under the high pressure from the industrial process is supplied through a control valve to actuate the pistons of at least two cylinders, which operate as a positive-displacement piston pump to recover most of the energy of the high-pressure fluid. At the same time, a pressure loss caused by the control valve and the like of the positive-displacement piston pump is compensated for by a power recovery pump turbine which comprises a turbine actuated by pressurized water generated in the power recovery system and a booster pump fixed coaxially to the turbine.

In a preferred aspect of the present invention, the raw water is drawn in by an intake pump and supplied to the high-pressure pump and the positive-displacement piston pump.

According to the present invention, the intake pump draws in the raw water, and supplies the raw water to the high-pressure pump, and also supplies the raw water to the positive-displacement piston pump via a bypass line branched from line connected to the high-pressure line.

In a preferred aspect of the present invention, the flow rate of the high-pressure water discharged from the high-pressure pump is controlled by a high-pressure pump outlet valve, a valve opening of the high-pressure pump outlet valve being controlled based on measured data from a treated water flow meter for measuring the flow rate of the treated water or measured data from a supply water flow meter for measuring the flow rate of the raw water discharged from the intake pump.

In a preferred aspect of the present invention, the booster pump is controlled by controlling a valve opening of a turbine inlet valve for controlling the flow rate of the concentrated water to be introduced into the turbine so that the flow rate of a concentrated water flow meter for measuring the flow rate of the concentrated water discharged from the reverse osmosis membrane cartridge or the flow rate of a supply water bypass flow meter for measuring the flow rate of the raw water to be introduced into a switching valve of the positive-displacement piston pump reaches a target value.

According to the present invention, the operation of the booster pump is controlled by the branched concentrated water to adjust the flow rate of the supply water bypass flow meter depending on the operational state of the entire system (e.g., the treated water:the concentrated water=4:6). Since there are several different operating characteristics of the booster pump and the turbine, it is difficult to match the operating characteristics of the booster pump and the turbine.

The target values for the flow rates of the concentrated water flow meter and the supply water bypass flow meter are:
  i) the flow rate of the concentrated water flow meter=the treated water:the concentrated water=4:6, for example; and
  ii) the flow rate of the supply water bypass flow meter=the flow rate of the concentrated water–the flow rate of the branched concentrated water.

The branched concentrated water may be:
  i) the deviation of the measured flow rate from the set value for the flow rate of the concentrated water; and
  ii) the required turbine flow rate calculated from the characteristics of the booster pump and the turbine.

In a preferred aspect of the present invention, a valve opening of a turbine inlet valve connected to an inlet port of the turbine is controlled so that the rotational speed of the power recovery pump turbine or the flow rate of a turbine inlet flow meter for measuring the flow rate of the concentrated water to be introduced into the turbine becomes constant; and a valve opening of a booster pump outlet valve for controlling the flow rate of the boosted water pressurized by the booster pump is controlled so that the flow rate of a concentrated water flow meter for measuring the flow rate of the concentrated water or the flow rate of a supply water bypass flow meter for measuring the flow rate of the raw water to be introduced into a switching valve of the positive-displacement piston pump reaches a target value.

According to the present invention, the operation of the booster pump is controlled by the branched concentrated water to adjust the flow rate of the supply water bypass flow meter depending on the operational state of the entire system (e.g., the treated water:the concentrated water=4:6).

Since operating characteristics of the turbine are fixed, it is easy to determine operating characteristics of the booster pump.

In a preferred aspect of the present invention, a valve opening of a booster pump outlet valve for controlling the flow rate of the boosted water pressurized by the booster pump is controlled so that the flow rate of a concentrated water flow meter for measuring the flow rate of the concentrated water discharged from the reverse osmosis membrane cartridge or the flow rate of a supply water bypass flow meter for measuring the flow rate of the raw water to be introduced into a switching valve of the positive-displacement piston pump reaches a target value; and the operation of a turbine inlet valve for controlling the flow rate of the concentrated water to be introduced into the turbine is controlled in synchronism with the operation of the booster pump outlet valve.

According to the present invention, the operation of the booster pump is controlled by the branched concentrated water to adjust the flow rate of the supply water bypass flow meter depending on the operational state of the entire system (e.g., the treated water:the concentrated water=4:6).

Whereas the booster pump outlet valve is controlled at all times so that the flow rate of the concentrated water flow meter or the flow rate of the supply water bypass flow meter becomes a target value, the turbine inlet valve is opened and closed according to the operation of the booster pump outlet valve.

In a preferred aspect of the present invention, when the valve opening of the booster pump outlet valve is reduced, the turbine inlet valve is instructed to reduce the valve opening thereof, and thereafter when the valve opening of the booster pump outlet valve becomes sufficiently large, the valve opening of the turbine inlet valve is maintained.

According to the present invention, the booster pump outlet valve is controlled at all times so that the flow rate of the concentrated water flow meter or the flow rate of the supply water bypass flow meter becomes a target value, and hence the valve opening of the booster pump outlet valve is automatically restored to a sufficiently open setting (set opening 1).

In a preferred aspect of the present invention, when the valve opening of the booster pump outlet valve is increased, the turbine inlet valve is instructed to increase the valve opening thereof, and thereafter when the valve opening of the booster pump outlet valve becomes sufficiently small, the valve opening of the turbine inlet valve is maintained.

According to the present invention, the booster pump outlet valve is controlled at all times so that the flow rate of the concentrated water flow meter or the flow rate of the supply water bypass flow meter becomes a target value, and hence the valve opening of the booster pump outlet valve is automatically restored to a sufficiently closed setting (set opening 1).

Basic concepts of the power recovery system according to the present invention will be described below.

Industrial treating processes or fluid refining process which employ a high-pressure fluid incur a large cost for refining the high-pressure fluid. FIGS. 1 and 2 of the accompanying drawings illustrate the concepts of the present invention as representing typical examples of systems for recovering energy from a processed high-pressure fluid, in comparison with Related art A through D described above with respect to seawater desalination plants using a reverse osmosis membrane process.

As shown in FIG. 1, according to Related art A, B, C, a fluid is pressurized by external energy $\alpha_a$, and a turbo-type apparatus is actuated by the fluid power of the pressurized fluid to recover power. According to the present invention, a fluid is pressurized by external energy $\alpha_b$, and a positive-displacement-type apparatus is actuated by the self-fluid power of the pressurized fluid to recover power. The efficiency of the systems according to Related art A, B, C is low because power is recovered by the turbo-type apparatus. In order to increase the energy efficiency of the entire plant, the positive-displacement-type apparatus is used to recover power according to the present invention.

As shown in FIG. 2, according to Related art D, a fluid is pressurized by external energy (electric energy), and a booster pump which requires external energy is used to allow a positive-displacement-type power recovery apparatus to recover power. According to the present invention, a fluid is pressurized by external energy, and a positive-displacement-type power recovery apparatus is actuated by the self-fluid power of the pressurized fluid to recover power. According to Related art D which employs the positive-displacement-type power recovery apparatus, since a loss-compensating booster pump disposed downstream of a positive-displacement piston pump is actuated by a variable-speed inverter electric motor, the system needs more devices and wirings to be supplied with electric energy from an external source than other systems, and is lower in overall reliability. According to the present invention, electric energy from an external source is applied to pressurize the fluid, and the positive-displacement-type power recovery apparatus is actuated by the fluid power of the pressurized fluid within the system as much as possible to recover power.

According to Related art A, B, C, a fluid is pressurized by external energy, and a turbo-type apparatus is actuated by the fluid power of the pressurized fluid to recover power. According to Related art A, B, C, the energy efficiency of the entire plant is low. According to the present invention, a fluid is pressurized by external energy, and a positive-displacement piston pump is actuated by the self-fluid power of the pressurized fluid to recover power. Therefore, the energy efficiency of the entire plant is high.

According to Related art D, the booster pump has sealed shaft portions and requires expensive seals because the booster pump has special characteristics such as a high pressure and a low pump head. As the booster pump is actuated by an electric motor, the entire system requires many electric wires, has complex equipment, and is difficult to operate because the booster pump needs to be operated in association with the operation of the high-pressure pump. If the system is shut off by an emergency shutdown of the booster bump due to electric trouble, the reverse osmosis membrane suffers an abnormal pressure buildup and is damaged, and the water treated by the reverse osmosis membrane tends to be lowered.

Compared with Related art D, the present invention offers the following advantages:

(1) The present invention can dispense with an electric motor and an inverter, i.e., electric devices to be supplied with energy from an external source and their wirings, and also with a high-pressure seal structure of the booster pump required according to Related art D. The system becomes a simplified structure and is a space saver, and the booster pump is greatly simplified in structure and is reduced in cost. The system is high in overall reliability.

(2) Since a portion of the reject (concentrated water) is discharged from a turbine inlet line, the amount of raw water drawn from a supply line into the positive-displacement piston pump is lowered. As a result, the flow rate of the high-pressure pump in its operation is increased, and it is possible to choose a high-efficiency pump for the high-pressure pump.

(3) According to Related art D, the booster pump is actuated by an electric motor, and needs to be operated and controlled in association with the operation of the high-pressure pump. According to the present invention, the power recovery pump turbine is controlled by controlling the flow rate of the fluid that flows into the turbine. Specifically, the turbine is supplied with a portion of the concentrated water which is produced under constant pressure from the reverse osmosis membrane cartridge when the high-pressure pump is operated. In other words, the power recovery pump turbine is self-regulated under the fluid power within the power recovery system. Therefore, the power recovery pump turbine can be operated and controlled easier than according to Related art D.

(4) According to Related art D, since the booster pump is actuated by an electric motor, the booster pump tends to suffer an emergency shutdown due to electric trouble such as a power supply failure or a control circuit fault, thus shutting off the fluid flow through the concentrated water line. Consequently, the reverse osmosis membrane is liable to suffer an abnormal pressure buildup and be damaged, and the quality of water treated by the reverse osmosis membrane tends to be lowered. According to the present invention, since the booster pump is part of the power recovery pump turbine and actuated by the turbine thereof, the booster pump does not tend to suffer an emergency shutdown and the reverse osmosis membrane is not damaged.

(5) According to Related art D, since the booster pump is actuated by an electric motor, the fluid flow through the concentrated water line tends to be shut off due to trouble of the positive-displacement piston pump as the power recovery apparatus. Consequently, the reverse osmosis membrane is liable to suffer an abnormal pressure buildup and be damaged, and the quality of water treated by the reverse osmosis membrane tends to be lowered. According to the present invention, as the turbine and a turbine reject line are connected to the concentrated water line and the turbine inlet line, the fluid flow does not tend to be shut off due to an emergency shutdown of the booster pump, the reverse osmosis membrane is not liable to suffer an abnormal pressure buildup, and the quality of water treated by the reverse osmosis membrane does not tend to be lowered.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Power recovery systems according to preferred embodiments of the present invention will be described in detail below with reference to the drawings.

Power Recovery System According to First Embodiment

Figure 1:
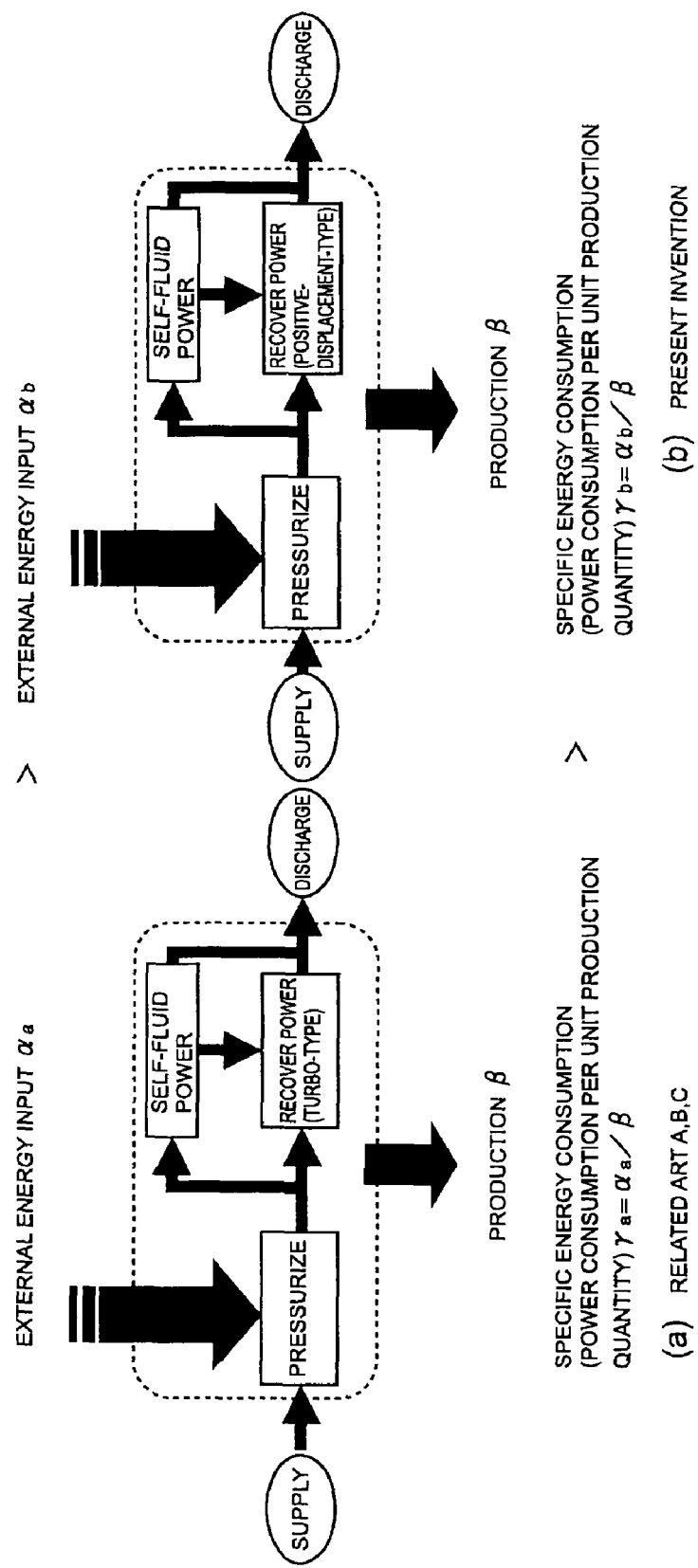
FIG. 1 is a schematic block diagram showing a basic concept of the present invention in comparison with the related art.
Figure 2:
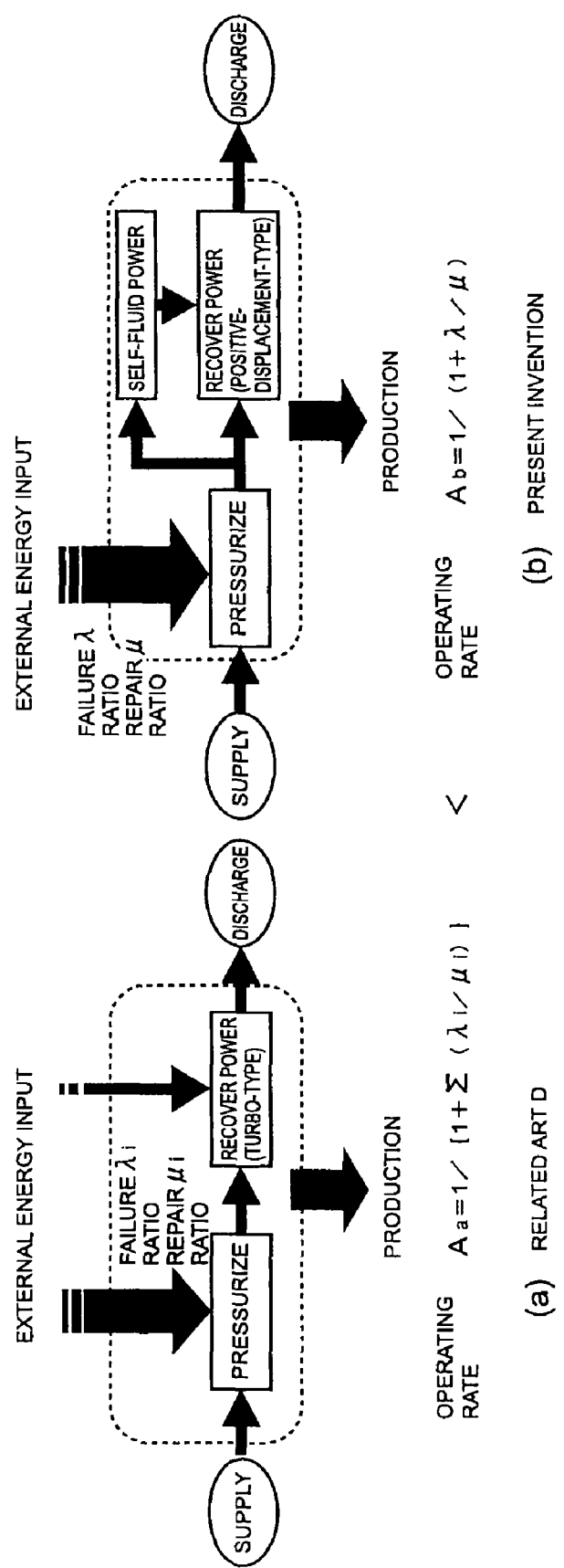
FIG. 2 is a schematic block diagram showing a basic concept of the present invention in comparison with the related art.
Figure 3:
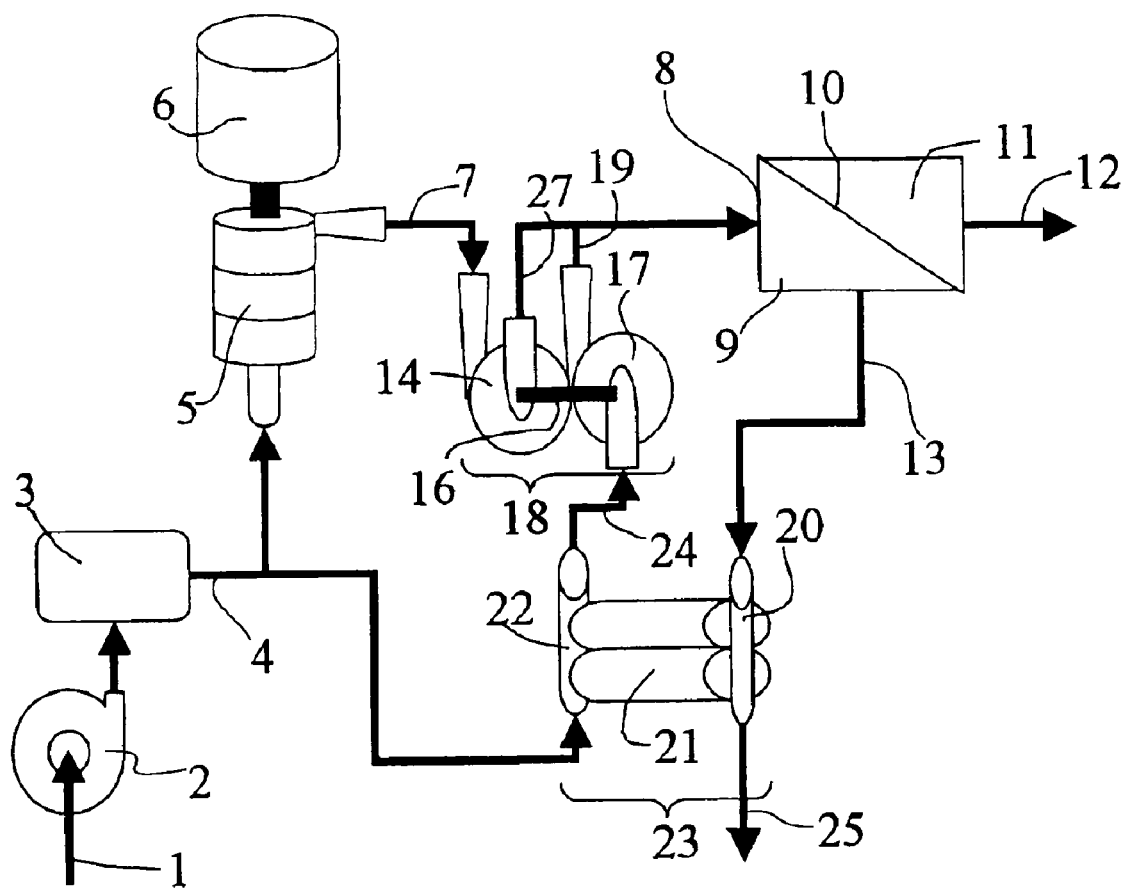
FIG. 3 is a schematic diagram of a power recovery system according to a first embodiment of the present invention.

FIG. 3 is a schematic diagram of a power recovery system according to a first embodiment of the present invention. As shown in FIG. 3, when seawater 1 is pumped into a seawater desalination plant by an intake pump 2, the seawater 1 is processed to have certain water qualities by a pretreatment system 3, and then pressurized and delivered into a high-pressure line 7 by a high-pressure pump 5 that is driven by an electric motor 6. The high-pressure pump 5 may be controlled by a control valve or an inverter for flow rate control. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a reject from the reverse osmosis membrane cartridge 8 into a concentrated seawater line 13. The high-pressure reject discharged from the reverse osmosis membrane cartridge 8 is introduced through a control valve 20 into a pair of power recovery chambers 21 of a positive-displacement piston pump 23, thereby actuating pistons in the power recovery chambers 21. The reject from which the pressure energy has been removed by actuating the pistons is discarded as a low-pressure turbine reject 25. Part of the seawater from the pretreatment system 3 is supplied via a supply line 4 to a switching valve 22 coupled to the power recovery chambers 21. The pistons in the power recovery chambers 21 pump the seawater into a supply seawater bypass boost line 24. The seawater from the supply seawater bypass boost line 24 is finally added to the high-pressure seawater from the high-pressure pump 5.

The pressure of the seawater in the supply seawater bypass boost line 24 is lower than the pressure of the seawater flowing to the reverse osmosis membrane cartridge 8 because of a pressure loss caused by the reverse osmosis membrane cartridge 8 and the piping, a pressure loss caused by the control valve 20, the switching valve 22 and the like, and a leakage loss caused by leakage of fluid between the power recovery chambers 21 and the pistons disposed therein. In order to combine the seawater flowing from the high-pressure pump 5 to the reverse osmosis membrane cartridge 8 and the seawater supplied from the supply seawater bypass boost line 24 with each other, a power recovery pump turbine 18 is provided between the supply seawater bypass boost line 24 and a booster pump outlet line 19 which leads to the reverse osmosis membrane cartridge 8. The power recovery pump turbine 18 includes a turbine 14 having a turbine impeller and a booster pump 17 having a pump impeller. The turbine impeller and the pump impeller are coaxially coupled to each other by a rotational shaft 16. The turbine impeller is driven by a small amount of pressure energy possessed by the high-pressure seawater that is supplied from the high-pressure pump 5 into the high-pressure line 7, thereby rotating the pump impeller of the booster pump 17 to pump the seawater from the supply seawater bypass boost line 24 into the booster pump outlet line 19. The high-pressure seawater discharged from the turbine impeller flows into a turbine outlet line 27 that is connected to the booster pump outlet line 19. The power recovery system thus constructed according to the first embodiment of the present invention can dispense with the electric motor 26 required in Related art D, and also with the high-pressure seal structure of the booster pump 17 which is problematic in Related art D. Therefore, the power recovery system according to the first embodiment of the present invention is relatively simple in structure and relatively inexpensive to manufacture.

It is assumed that a seawater desalination plant including 16 trains of seawater desalination apparatuses combined with the power recovery system according to the first embodiment produces about 50 MGD (Megagalons per day) and its reverse osmosis membrane cartridges desalinate 28% of the intake seawater. In this case, it is possible to reduce the power required to drive the high-pressure pump to about 1470 kW per train. When the seawater desalination plant is to desalinate 45% of the intake seawater, it is possible to reduce the power required to drive the high-pressure pump to about 1340 kW. Since the positive-displacement piston pump 23 and the power recovery pump turbine 18 are combined in a hybrid system, there is a broad choice of the turbine impeller of the turbine 14 of the power recovery pump turbine 18.

Power Recovery System According to Second Embodiment

Figure 4:
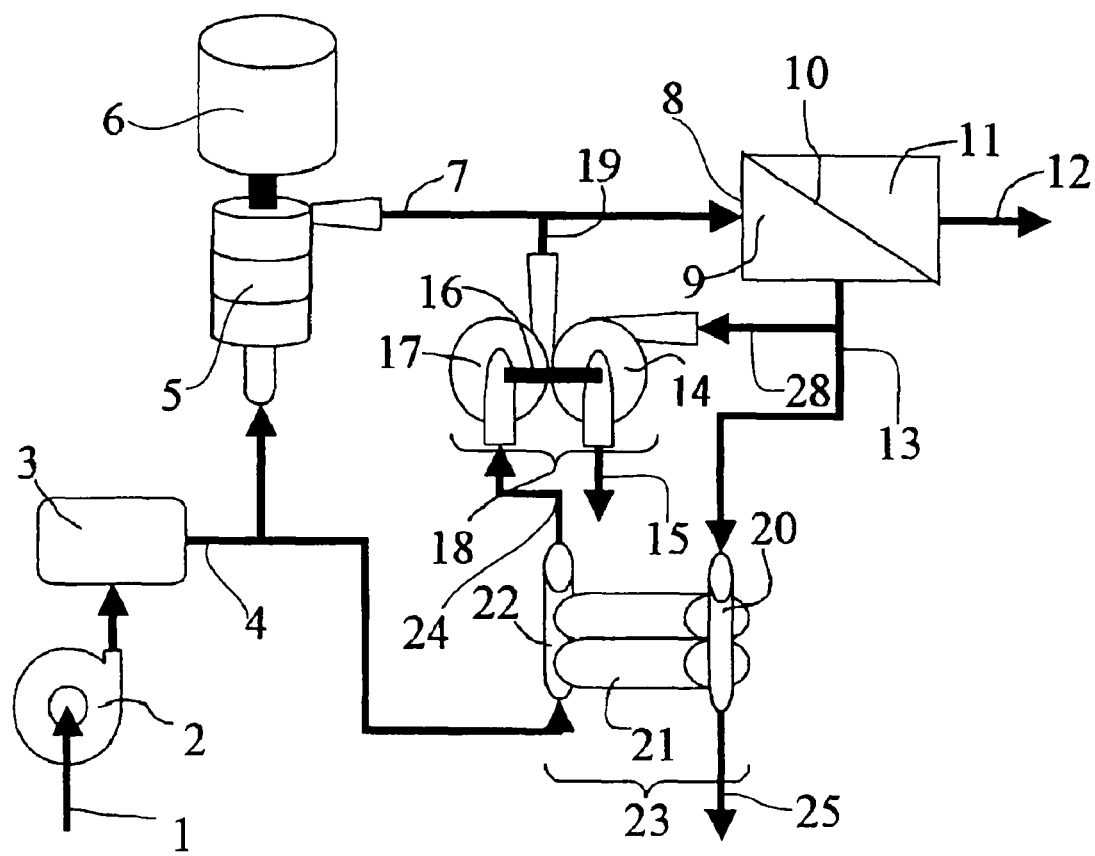
FIG. 4 is a schematic diagram of a power recovery system according to a second embodiment of the present invention.

FIG. 4 is a schematic diagram of a power recovery system according to a second embodiment of the present invention. The power recovery system shown in FIG. 4 includes a positive-displacement piston pump and a power recovery pump turbine that are combined in a hybrid system, the power recovery pump turbine having a turbine impeller actuatable by part of the concentrated seawater from the reverse osmosis membrane cartridge 8.

As shown in FIG. 4, when seawater 1 is pumped into a seawater desalination plant by an intake pump 2, the seawater 1 is processed to have certain water qualities by a pretreatment system 3, and then pressurized and delivered via a high-pressure line 7 into a reverse osmosis membrane cartridge 8 by a high-pressure pump 5 that is driven by an electric motor 6. The high-pressure pump 5 may be controlled by a control valve or an inverter for flow rate control. Part of the seawater in a high-pressure chamber 9 of the reverse osmosis membrane cartridge 8 passes through a reverse osmosis membrane 10 against the reverse osmosis pressure and is desalinated, and then desalinated water 12 is taken out from the reverse osmosis membrane cartridge 8. The remaining concentrated seawater with a high salt content is discharged under pressure as a reject from the reverse osmosis membrane cartridge 8 into a concentrated seawater line 13. Most of the high-pressure reject discharged from the reverse osmosis membrane cartridge 8 is introduced through a control valve 20 into a pair of power recovery chambers 21 of a positive-displacement piston pump 23, thereby actuating pistons in the power recovery chambers 21. The reject from which the pressure energy has been removed by actuating the pistons is discarded as a low-pressure turbine reject 25.

Part of the seawater from the pretreatment system 3 is supplied via a supply line 4 to a switching valve 22 coupled to the power recovery chambers 21. The pistons in the power recovery chambers 21 pump the seawater into a supply seawater bypass boost line 24. The seawater from the supply seawater bypass boost line 24 is finally added to the high-pressure seawater in the high-pressure line 7. The pressure of the seawater in the supply seawater bypass boost line 24 is lower than the pressure of the seawater in the high-pressure line 7 because of a pressure loss caused by the reverse osmosis membrane cartridge 8 and the piping, a pressure loss caused by the control valve 20, the switching valve 22 and the like, and a leakage loss caused by leakage of fluid between the power recovery chambers 21 and the pistons disposed therein. In order to combine the seawater in the high-pressure line 7 and the seawater supplied from the supply seawater bypass boost line 24 with each other, a power recovery pump turbine 18 is provided between the supplied supply seawater bypass boost line 24 and the high-pressure line 7. The power recovery pump turbine 18 includes a turbine 14 having a turbine impeller and a booster pump 17 having a pump impeller. The turbine impeller and the pump impeller are coaxially coupled to each other by a rotational shaft 16. The turbine impeller is driven by small portion of concentrated seawater flowing in the concentrated seawater line 13 via a turbine inlet line 28, thereby rotating the pump impeller of the booster pump 17 to pump the seawater from the supply seawater bypass boost line 24 through the booster pump outlet line 19 into the high-pressure line 7.

The turbine impeller of the power recovery pump turbine 18 may be driven by an amount of seawater supplied from the high-pressure line 7 between the high-pressure pump 5 and the reverse osmosis membrane cartridge 8, rather than from the concentrated seawater line 13. According to such a modification, however, since part of the seawater to be converted into the desalinated water 12 is consumed to drive the turbine impeller, the modified power recovery system may possibly be slightly less efficient than the power recovery system according to the second embodiment shown in FIG. 4.

The power recovery system according to the second embodiment can dispense with the electric motor 26 and an inverter, i.e., electric devices to be supplied with energy from an external source and their wirings, required in Related art D, and also with the high-pressure seal structure of the booster pump 17 which is problematic in Related art D. Therefore, the power recovery system according to the second embodiment of the present invention is relatively simple in structure and relatively inexpensive to manufacture. As a result, the power recovery system is highly reliable as a whole. Furthermore, because part of the reject is discharged from the concentrated seawater line 13 via the turbine inlet line 28, the amount of seawater that is drawn from the supply line 4 into the positive-displacement piston pump 23 is reduced, resulting in an increase in the operating flow rate of the high-pressure pump 5. Consequently, it is possible to select a highly efficient pump as the high-pressure pump 5. According to the first embodiment, the head required for the high-pressure pump 5 needs to be increased by the energy required to drive the turbine impeller of the power recovery pump turbine 18. According to the second embodiment, however, there is no such need to increase the head of the high-pressure pump 5.

The power recovery pump turbine 18 is controlled by the flow rate of the seawater that flows into the turbine 14. Specifically, the turbine 14 is supplied with the concentrated high-pressure seawater which is discharged from the reverse osmosis membrane cartridge 8. The concentrated high-pressure seawater serves as an energy source and a constant pressure source, and is produced by the high-pressure pump 5. In other words, the power recovery pump turbine 18 is self-regulated under the fluid pressure within the power recovery system. Therefore, the power recovery pump turbine 18 according to the second embodiment has higher operability and controllability than the system in Related art D in which the booster pump 17 is driven by the electric motor 26.

It is assumed that a seawater desalination plant including 16 trains of seawater desalination apparatuses combined with the power recovery system according to the second embodiment produces about 50 MGD (Megagalons per day) and its reverse osmosis membrane cartridges desalinate 28% of the intake seawater. In this case, it is possible to reduce the power required to drive the high-pressure pump to about 1450 kW per train. When the seawater desalination plant is to desalinate 45% of the intake seawater, it is possible to reduce the power required to drive the high-pressure pump to about 1320 kW.

The power recovery system which employs the positive-displacement piston pump spends much less electric expenses, i.e., consumes much less electric power, than the power recovery system according to the related art which employs the Pelton turbine or the power recovery pump turbine. According to the present invention, the hybrid system of the positive-displacement piston pump and the power recovery pump turbine can dispense with the electric motor for actuating the booster pump required in Related art D, and also with a mechanical seal because such hybrid system has a sealless structure. Thus, the power recovery system having high controllability can be constructed. As a result, the overall power recovery system is highly reliable, has a high operating rate, and can reduce more electric power consumption than with Related art D by operating over a long period of time.

Table 1 shown below is a table of data for comparison between Related art A through D and the first and second embodiments of the present invention. Table 1 shows electric power consumption values (kW) and electric expense reductions at desalinated water conversion rates of 28% and 45%. The electric power consumption values and the electric expense reductions shown in Table 1 represent estimated values for a typical plant, equipment performance, and electric power cost. Actual electric power consumption values need to be evaluated for each of plants involved. It is assumed that the electric power cost is 0.08 US dollars/kWh=about 9.2 yen/kWh.

TABLE 1

| | Desalinated water conversion rate: 28% | | Desalinated water conversion rate: 45% | |
| --- | --- | --- | --- | --- |
| | Power consumption (kW) | Electric expense reduction over Related art A (10 thousand yen/year) | Power consumption (kW) | Electric expense reduction over Related art A (10 thousand yen/year) |
| Related art A | 2086 | | 1633 | |
| Related art B | 1958 | 1000 | 1572 | 492 |
| Related art C | 1958 | 1000 | 1572 | 492 |
| Related art D | 1445 | 5200 | 1328 | 2457 |

TABLE 1-continued

|  | Desalinated water conversion rate: 28% | | Desalinated water conversion rate: 45% | |
|---|---|---|---|---|
|  | Power consumption (kW) | Electric expense reduction over Related art A (10 thousand yen/year) | Power consumption (kW) | Electric expense reduction over Related art A (10 thousand yen/year) |
| First embodiment of the present invention | 1475 | 4900 | 1343 | 2342 |
| Second embodiment of the present invention | 1453 | 5101 | 1325 | 2483 |

Power Recovery Pump Turbine According to the Present Invention:

The power recovery pump turbine 18 in the power recovery systems according to the first and second embodiments of the present invention will be described in detail below.

The power recovery pump turbine 18 comprises the turbine 14, the rotational shaft 16, and the booster pump 17. The power recovery pump turbine 18 functions to introduce the seawater from the switching valve 22 of the positive-displacement piston pump 23 via the supply seawater bypass boost line 24 into the booster pump 17, rotate the rotational shaft 16 by utilizing the rotational energy of the turbine 14 to drive the booster pump 17 for boosting the pressure of the seawater, and supply the boosted seawater via the booster pump output line 19 to the high-pressure chamber 9 of the reverse osmosis membrane cartridge 8.

In the power recovery system according to the first embodiment of the present invention, the turbine 14 is rotated by the seawater supplied from the high-pressure pump 5 via the high-pressure line 7. In the power recovery system according to the second embodiment of the present invention, the turbine 14 is rotated by the reject supplied from the high-pressure chamber 9 of the reverse osmosis membrane cartridge 8 via the turbine inlet line or reject bypass line 28.

Advantages achieved by the use of the power recovery pump turbine will be described below.

Since the seawater in the power recovery system is used as an energy source for driving the pump, the power recovery system requires no electric motor and is thus less costly to manufacture. Further, since electric motor wiring is not required, the power recovery system is inexpensive to manufacture as its cost includes no electric motor wiring. The cost of maintenance of the power recovery system after it is installed is relatively low because no electric motor and no electric wiring need to be serviced for maintenance.

In the power recovery system, the intake pressure of the booster pump 17, i.e., the pressure in the supply seawater bypass boost line 24, is much higher than the intake pressure of general pumps. If the booster pump is driven by an electric motor, then a special shaft seal device, e.g., a mechanical seal, is required to seal the rotational shaft projecting externally from the booster pump because the high pressure is applied to the sealing portion. As a result, the manufacturing cost and the maintenance cost of the booster pump increase greatly. However, since the power recovery pump turbine according to the present invention is not driven by any electric motor, the rotational shaft does not project externally from the booster pump. Thus, no shaft seal device is required, and the manufacturing cost and the maintenance cost of the booster pump become inexpensive.

If the booster pump is driven by an electric motor, then the booster pump and the electric motor need to be manufactured separately and a coupling is required to interconnect the shafts of the booster pump and the electric motor. In the power recovery pump turbine according to the present invention, however, since the turbine impeller and the pump impeller are interconnected by the single rotational shaft, no coupling is required, and hence the power recovery pump turbine is less costly to manufacture.

Because the turbine impeller and the pump impeller are interconnected by the single rotational shaft, the shaft bearings may not be disposed outside of the booster pump and the turbine, but may comprise submerged bearings disposed in the power recovery pump turbine. Inasmuch as the submerged bearings are lubricated only by the seawater in the power recovery system, they do not need any fats and fatty oils such as grease and lubricating oil which would otherwise be required to lubricate bearings disposed outside of the booster pump and the turbine. Since grease and lubricating oil do not need to be replaced upon maintenance, the cost of maintenance for the power recovery pump turbine is relatively low. The power recovery pump turbine is environmentally friendly because fats and fatty oils are not discarded upon maintenance.

Next, the structure of the power recovery pump turbine will be described in detail below.

As described above, the power recovery pump turbine 18 comprises the turbine 14, the rotational shaft 16, and the booster pump 17.

The components of the power recovery pump turbine 18 are made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The high-polymer material may be in the form of a coating or a bulk including at least one of polyamide (PA), polyacetal (POM), polybutylene terephthalate (PBT), polyethylene terephthalate (PET), polyphenylene ether (PPE), polycarbonate (PC), ultra-high molecular weight polyethylene (UHMW-PE), polytetrafluoroethylene (PTFE), polyphenylene sulfide (PPS), polyimide (PI), polyetheretherketone (PEEK), polyarylate (PAR), phosphorus sulfur fluorine (PSF), polyetherimide (PEI), polyamide-imide (PAI), and polyether sulfone (PES). These high-polymer materials may be mixed with carbon fibers, glass fibers, ceramics fibers, or a solid lubricant.

Of the components of the power recovery pump turbine 18, sliding parts such as bearings, casing rings, impeller rings, etc. are made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The coating may be a sprayed ceramics coating made of oxide ceramics (chromium oxides ($Cr_2O_3$), $Al_2O_3$) or carbide cermets (tungsten carbide-nickel chromium (WC—NiCr), tungsten carbide-cobalt chrome (WC—CoCr), chromium carbide-nickel chromium ($Cr_3C_2$—NiCr)). A layer of nickel (Ni), nickel-chromium (Ni—Cr), nickel-chromium-molybdenum (Ni—Cr—Mo) or the like may be interposed between the ceramics coating and the base material to prevent the seawater from seeping into the base material for thereby preventing crevice corrosion of the base material. The coating may alternatively be a physical vapor deposition (PVD) or chemical vapor deposition (CVD) ceramics coating made of diamond-like carbon coating (DLC), titanium nitride coating (TiN), titanium carbon nitride coating (TiCN), titanium aluminium nitride coating (TiAlN), chromium nitride coating (CrN), cubic boron nitride coating (cBN), polycrystalline diamond coating (PCD), or silicon carbide coating (SiC). The high-polymer material may be in the form of a coating or a bulk including at least one of PA, POM, PBT, PET, PPE, PC, UHMW-PE, PTFE, PPS, PI, PEEK, PAR, PSF, PEI, PAI, and PES. These high-polymer materials may be mixed with carbon fibers, ceramics fibers, lath fibers or a solid lubricant.

Next, structural details of the power recovery pump turbine 18 will be described below with reference to FIGS. 5 through 8.

Figure 5:
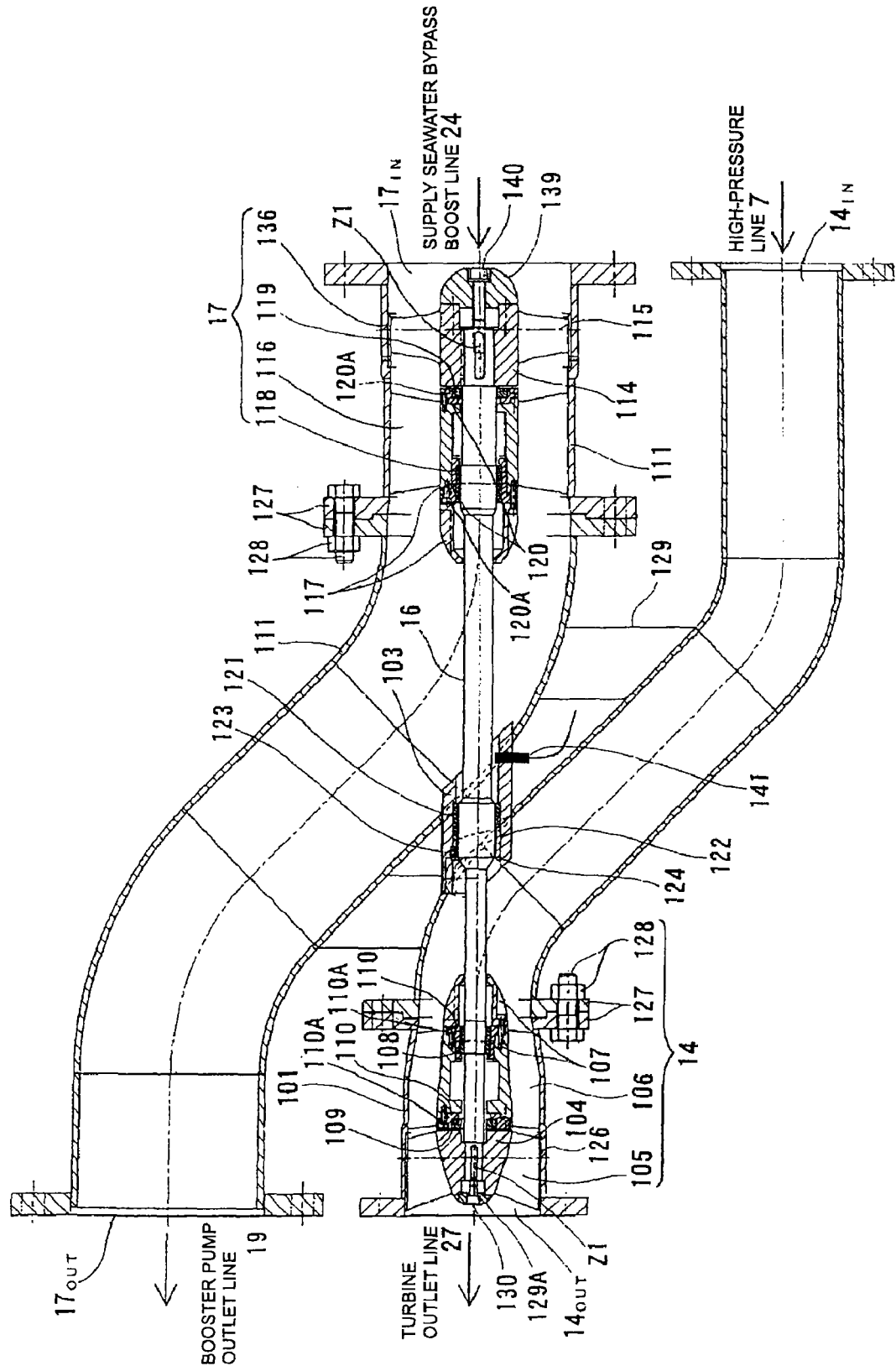
FIG. 5 is a cross-sectional view of a power recovery pump turbine incorporated in the power recovery system according to the first embodiment of the present invention.

FIG. 5 is a cross-sectional view of the power recovery pump turbine incorporated in the power recovery system according to the first embodiment of the present invention.

As shown in FIG. 5, the power recovery pump turbine 18 comprises the turbine 14 and the booster pump 17 which are disposed on the opposite ends of the single rotational shaft 16. The turbine 14 includes a turbine casing 101 in the form of a pipe having an inlet port and an outlet port, and a rotational shaft 16 positioned diametrically centrally in the turbine casing 101. A turbine impeller 104 is mounted on an end of the rotational shaft 16. The rotational shaft 16 and the turbine casing 101 are fixedly supported by a support member. The booster pump 17 includes a booster pump casing 111 in the form of a pipe having an inlet port and an outlet port, and the rotational shaft 16 positioned diametrically centrally in the booster pump casing 111. A booster pump impeller 114 is mounted on the opposite end of the rotational shaft 16. The rotational shaft 16 and the booster pump casing 111 are fixedly supported by a support member. The pipe-shaped turbine casing 101 and the pipe-shaped booster pump casing 111 are disposed adjacent to each other. The support member for fixing the rotational shaft 16 and the turbine casing 101 and the support member for fixing the rotational shaft 16 and the booster pump casing 111 constitute a single common support member 103.

The power recovery pump turbine 18 shown in FIG. 5 operates as follows: High-pressure seawater supplied from the high-pressure line 7 into the turbine casing 101 flows into the turbine impeller 104, thereby applying its pressure to turbine impeller vanes 105 to impart a rotary energy to the turbine impeller 104. Then, the seawater is discharged from the outlet port of the turbine casing 101 to the turbine outlet line 27. Thus, the turbine impeller 104 is rotated to transmit the rotary energy to the rotational shaft 16, thereby rotating the booster pump impeller 114. When the booster pump impeller 114 is rotated, pump impeller vanes 115 impart an energy to the seawater supplied from the supply seawater bypass boost line 24 into the booster pump casing 111. The seawater flowing in the booster pump casing 111 is now boosted and flows into the booster pump outlet line 19.

Type of the Turbine Impeller 104 of the Turbine 14:

In the present power recovery system, the turbine 14 is driven by a fluid (seawater) which has a relatively low pressure difference and which flows at a relatively high rate. Therefore, the turbine impeller 104 comprises an axial-flow impeller (as shown in FIG. 5) having a high impeller specific speed Ns. If the fluid handled by the power recovery system has a different pressure and flow rate, then the turbine impeller may comprise a mixed-flow impeller having a medium impeller specific speed Ns which corresponds to a relatively medium pressure difference and a relatively medium flow rate, or a centrifugal impeller having a low impeller specific speed Ns which corresponds to a relatively high pressure difference and a relatively low flow rate. The impeller specific speeds Ns of the centrifugal, mixed-flow, and axial-flow impellers generally have numerical values in overlapping ranges and are not strictly classified by clearly separate numerical ranges.

Type of the Booster Pump Impeller 114 of the Booster Pump 14:

In the present power recovery system, the booster pump 17 boosts and delivers a fluid (seawater) which has a relatively low pressure difference and flows at a relatively high rate. Therefore, the booster pump impeller 114 comprises an axial-flow impeller (as shown in FIG. 5) having a high impeller specific speed Ns. If the fluid handled by the power recovery system has a different pressure and flow rate, then the booster pump impeller 114 may comprise a mixed-flow impeller having a medium impeller specific speed Ns which corresponds to a relatively medium pressure difference and a relatively medium flow rate, or a centrifugal impeller having a low impeller specific speed Ns which corresponds to a relatively high pressure difference and a relatively low flow rate. The impeller specific speeds Ns of the centrifugal, mixed-flow, and axial-flow impellers generally have numerical values in overlapping ranges and are not strictly classified by clearly separate numerical ranges.

Directions of the Inlet and Outlet Ports of the Turbine 14 and the Booster Pump 17:

The direction of the inlet port of the turbine 14 and the direction of the outlet port of the turbine 14 are illustrated as being opposite to each other. However, these directions may be perpendicular to each other, identical to each other, or oblique to each other depending on the directions of external pipes that are actually joined to these inlet and outlet ports. This holds true for the direction of the inlet port of the booster pump 17 and the direction of the outlet port of the booster pump 17. The directions of the inlet and outlet ports of the turbine 14 and the directions of the inlet and outlet ports of the booster pump 17 may be varied in any combinations.

Turbine Guide Vanes and Pump Guide Vanes;

The turbine 14 has turbine guide vanes 106 for rectifying the fluid flow in a certain direction and introducing the rectified fluid flow into the turbine impeller 104 in order to efficiently transmit the energy of the fluid supplied into the turbine casing 101 to the turbine impeller 104. The booster pump 17 has pump guide vanes 116 for rectifying the fluid flow in a certain direction and delivering the rectified fluid flow into the booster pump casing 111 in order to efficiently deliver the fluid boosted by the booster pump impeller 114. The turbine guide vanes 106 and the pump guide vanes 116 also serve to secure a turbine inner casing 107 of the turbine 14 and a pump inner casing 117 of the booster pump 17, respectively.

Turbine Inner Casing 107 and Pump Inner Casing 117:

The turbine inner casing 107 is installed for the purpose of smoothly introducing the fluid into the turbine impeller 104. The pump inner casing 117 is installed for the purpose of smoothly delivering the fluid from the booster pump impeller 114 to the booster pump casing 111. The turbine inner casing 107 and the pump inner casing 117 are secured in place by the turbine guide vanes 106 and the pump guide vanes 116, respectively. The turbine inner casing 107 and the pump inner casing 117 also serve to secure radial and thrust bearings for rotatably supporting rotor assemblies of the turbine 14 and the booster pump 17. Although each of the turbine inner casing 107 and the pump inner casing 117 is composed of divided members that are fastened together by bolts, the turbine inner casing 107 and the pump inner casing 117 may be in the form of integral unitary casings, respectively.

Turbine Radial Bearing:

The turbine 14 includes a turbine radial bearing 108 for bearing radial loads applied from the rotational shaft 16 to allow the rotary assembly made up of the turbine impeller 104, the rotational shaft 16, the booster pump impeller 114, and the like to rotate smoothly. The radial loads include a load based on the weight of the rotary assembly, a radial load caused by whirling motion of the rotary assembly, and a radial load caused by the fluid acting on the turbine impeller 104 and the booster pump impeller 114.

Pump Radial Bearing:

The turbine pump 17 includes a pump radial bearing 118 for bearing radial loads applied from the rotational shaft 16 to allow the rotary assembly made up of the turbine impeller 104, the rotational shaft 16, the booster pump impeller 114, and the like to rotate smoothly. The radial loads include a load based on the weight of the rotary assembly, a radial load caused by whirling motion of the rotary assembly, and a radial load caused by the fluid acting on the turbine impeller 104 and the booster pump impeller 114.

Turbine Thrust Bearing:

The turbine 14 includes a turbine thrust bearing 109 for bearing thrust loads applied from the turbine impeller 104 to allow the rotary assembly made up of the turbine impeller 104, the rotational shaft 16, the booster pump impeller 114, and the like to rotate smoothly. The thrust loads include loads caused by the fluid acting on the turbine impeller 104 and the booster pump impeller 114.

Pump Thrust Bearing:

The booster pump 17 includes a pump thrust bearing 119 for bearing thrust loads applied from the booster pump impeller 114 to allow the rotary assembly made up of the turbine impeller 104, the rotational shaft 16, the booster pump impeller 114, and the like to rotate smoothly. The thrust loads include loads caused by the fluid acting on the turbine impeller 104 and the booster pump impeller 114.

Fixing of the Bearings of the Turbine 14:

The turbine radial bearing 108 and the turbine thrust bearing 109 have their outer circumferential portions fixed to respective bearing shells 110 by shrink fitting, press-fitting, and/or threaded engagement, and/or have their outer circumferential portions and side portions fixed to the bearing shells 110 by adhesive bonding. The bearing shells 110 are fastened to the turbine inner casing 107 by bearing shell fastening bolts 110A. Although the turbine radial bearing 108 and the turbine thrust bearing 109 are fastened separately to the bearing shells 110, the turbine radial bearing 108 and the turbine thrust bearing 109 may be combined into a single bearing fastened to a single bearing shell, so that the single bearing can bear both radial and thrust loads.

Fixing of the Bearings of the Booster Pump 17:

The pump radial bearing 118 and the pump thrust bearing 119 have their outer circumferential portions fixed to respective bearing shells 120 by shrink fitting, press-fitting, and/or threaded engagement, and/or have their outer circumferential portions and side portions fixed to the bearing shells 120 by adhesive bonding. The bearing shells 120 are fastened to the pump inner casing 117 by bearing shell fastening bolts 120A. Although the pump radial bearing 118 and the pump thrust bearing 119 are fastened separately to the bearing shells 120, the pump radial bearing 118 and the pump thrust bearing 119 may be combined into a single bearing fastened to a single bearing shell, so that the single bearing can bear both radial and thrust loads.

Bush:

A bush 121 is disposed in the support member (communicating portion) 103 through which the rotational shaft 16 extends between the turbine casing 101 and the booster pump casing 111. An appropriate clearance is provided between the bush 121 and the rotational shaft 16 to minimize the flow of the fluid between the turbine casing 101 and the booster pump casing 111 for retaining the flow rate and pressure of the fluid supplied to the turbine 14 and the flow rate and pressure of the fluid supplied from the booster pump 17, thereby keeping the operating efficiency of the power recovery pump turbine 18 high.

Fixing of the Bush 121:

The bush 121 has an end having a vertical flat surface and an opposite end having a slanted flat surface. The vertical flat surface of the bush 121 is inserted in the support member 103, and the outer circumferential surface of the bush 121 is fitted in an inner circumferential surface of the support member 103. If the bush 121 is rotated with respect to the support member 103 under rotational fluid forces caused by the rotating rotational shaft 16, then the outer circumferential surface of the bush 121 and the inner circumferential surface of the support member 103 are brought in sliding contact with each other and are thus worn, resulting in wobbling movement of the bush 121. When the bush 121 wobbles, the rotational shaft 16 and the inner circumferential surface of the bush 121 tend to be brought into contact with each other, and cause noise and damage to the contacting areas. In order to prevent the bush 121 from being rotated with respect to the support member 103, a bush holder sleeve 122 having a slanted end shaped complementarily to the slanted flat surface of the bush 121 is fastened to the support member 103 by a setscrew pin 123 against rotation. Since the slanted flat surface of the bush 121 is engaged by the slanted end of the bush holder sleeve 122, the bush 121 is locked against rotation in the support member 103. The bush holder sleeve 122 thus fastened in position by the setscrew pin 123 is effective if the bush 121 is made of a fragile material such as ceramics because the bush 121 is not easy to form a groove for receiving the setscrew pin. If the bush 121 is made of a material which is strong enough to allow a groove for receiving the setscrew pin to be easily formed therein, then the bush holder sleeve 122 may be eliminated, and the bush 121 may directly be locked in place against rotation by the setscrew pin 123. Although the single setscrew pin 123 is illustrated, there may be a plurality of setscrew pins 123 mounted on the bush holder sleeve 122 at circumferentially spaced intervals. The bush holder sleeve 122 is locked against axial movement by a fixing ring 124 which is mounted on the support member 103 and projects radially inwardly. If the bush holder sleeve 122 is not used, the bush 121 may be directly locked against axial movement by the projection of the fixing ring 124. Although the bush 121 is secured in place by a structure that is inserted and accessible from the side of the turbine 14 in the illustrated embodiment, the bush 121 may be secured in place by a structure that is inserted and accessible from the side of the booster pump 17.

Casing Rings:

The turbine 14 and the booster pump 17 have a turbine casing ring 126 and a pump casing ring 136, respectively. The turbine casing ring 126 and the pump casing ring 136 are coupled respectively to the turbine casing 101 and the booster pump casing 111 for providing appropriate clearances around the outer circumferential portions of the turbine impeller 104 and the booster pump impeller, thereby minimizing a water leakage due to a differential pressure and transmitting the fluid energy efficiently to the turbine impeller 104 and the booster pump impeller 114. However, the turbine casing ring 126 and the pump casing ring 136 may be eliminated, and the turbine casing 101 and the booster pump casing 111 may provide appropriate clearances around the outer circumferential portions of the turbine impeller 104 and the booster pump impeller 114. However, when the turbine casing 101 and the booster pump casing 111 are worn due to coaction with the turbine impeller 104 and the booster pump impeller 114 after a long period of operating time, the turbine casing 101 and the booster pump casing 111 need to be replaced in their entirety to increase in cost. The turbine casing ring 126 and the pump casing ring 136 are advantageous in that it is much less costly to replace them. The turbine casing ring 126 and the pump casing ring 136 are secured to the turbine casing 101 and the booster pump casing 111, respectively, by shrink fitting, adhesive bonding, fitting, threaded engagement, and/or setscrew pins.

Structures of the Turbine Casing 101 and the Booster Pump Casing 111:

If each of the turbine casing 101 and the booster pump casing 111 is made up of a plurality of pipes joined together, the turbine casing 101 and the booster pump casing 111 are assembled together by flanges 127 and bolt-and-nut fasteners 128. The bolts are disposed at circumferentially spaced intervals on the flanges 127. In the illustrated embodiment, the turbine casing 101 and the booster pump casing 111 are composed of four pipes that are assembled together by two types of bolts and nuts. However, the turbine casing 101 and the booster pump casing 111 may be made up of more or less pipes that are assembled together by more or less types of bolts and nuts. The turbine casing 101 and the booster pump casing 111 are connected to each other by casing joint ribs 129 and the support member (communicating portion) 103 which may be joined to the turbine casing 101 and the booster pump casing 111 by welding or bolts.

Inlet and Outlet Port Flange Configurations:

In the illustrated embodiment, although all of a turbine outlet port $14_{OUT}$, a turbine inlet port $14_{IN}$, a pump outlet port $17_{OUT}$, and a pump inlet port $17_{IN}$ have a flanged structure, they may have butt-welding or threaded connection structure. Alternatively, the turbine outlet port, the turbine inlet port, the pump outlet port, and the pump inlet port may have a combination of a flanged structure, a butt-welding connection structure, and a threaded connection structure.

Fixing of the Turbine Impeller 104 and the Booster Pump Impeller 114 to the Rotational Shaft 16:

The turbine impeller 104 and the booster pump impeller 114 are mounted on the rotational shaft 16 by keys Z1 fitted in respective key slots that are formed in the rotational shaft 16, the turbine impeller 104 and the booster pump impeller 114. The turbine impeller 104 and the booster pump impeller 114 are locked on the rotational shaft 16 against removal respectively by a turbine impeller cap 129A and a pump impeller cap 139 which are attached to the rotational shaft 16. A turbine impeller bolt 130 and a pump impeller bolt 140 are then screwed into the rotational shaft 16 through respective holes that are formed in the turbine impeller cap 129A and the pump impeller cap 139, respectively, thereby fixing the turbine impeller cap 129A and the pump impeller cap 139 to the rotational shaft 16. The turbine impeller cap 129A and the pump impeller cap 139 are prevented from being loosened by setscrew pins (not shown) inserted through the turbine impeller cap 129A and the pump impeller cap 139 into the turbine impeller 104 and the booster pump impeller 114, respectively. Although not shown, tongued or toothed washers may be used and tongues or teeth of the washers may be bent into the key slots in the rotational shaft 16 and recesses in the turbine impeller cap 129A and the pump impeller cap 139 respectively to prevent the turbine impeller cap 129A and the pump impeller cap 139 from being loosened.

Rotational Speed Meter:

A rotational speed meter 141 for measuring the rotational speed of the rotational shaft 16 is mounted on the support member 103. The rotational speed of the rotational shaft 16 that is measured by the rotational speed meter 141 is monitored to control the operation of the power recovery pump turbine 18. The rotational speed meter may be mounted on the turbine casing 101 or the booster pump casing 111. Rather than the rotational shaft 16, the booster pump impeller 114, the turbine impeller 104, the pump impeller cap 139, the turbine impeller cap 129A, the pump impeller bolt 140, or the turbine impeller bolt 130 may be measured for its rotational speed. In the illustrated embodiment, the rotational speed meter 141 is held out of contact with the rotational shaft 16. However, the rotational speed meter 141 is not limited to the non-contact type.

Structure of the Turbine Outlet Line 27 and the Booster Pump Outlet Line 19:

The turbine outlet line 27 and the booster pump outlet line 19 which extend from the power recovery pump turbine 18 are kept in the same pressure level. Since the turbine outlet line 27 and the booster pump outlet line 19 are joined together at a position spaced from the power recovery pump turbine 18, they are illustrated as having separate flanged outlet ports in FIG. 5. However, the pump outlet port $17_{OUT}$ and the turbine outlet port $14_{OUT}$ may be combined as a single outlet port from the power recovery pump turbine 18.

Figure 6:
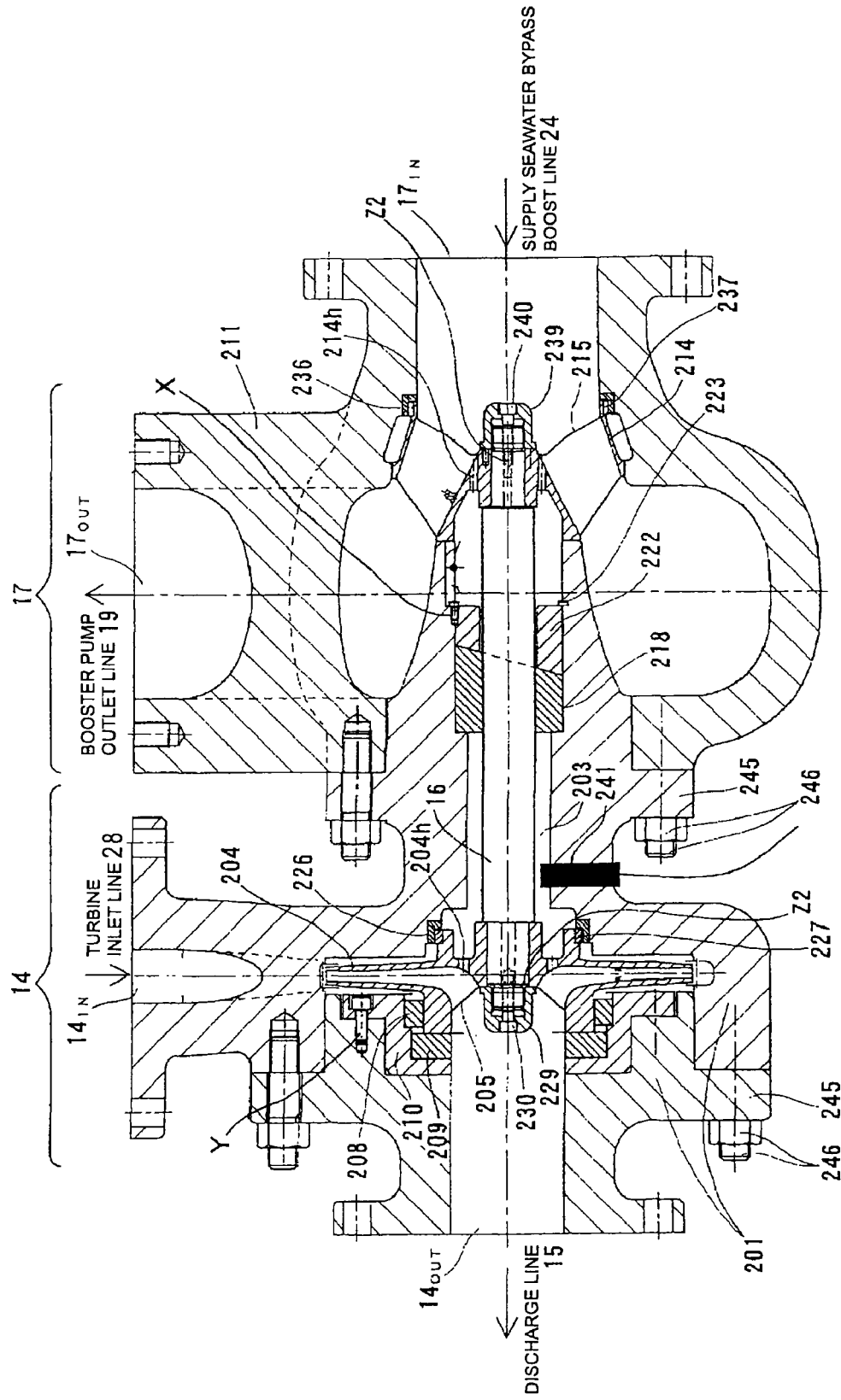
FIG. 6 is a cross-sectional view of a power recovery pump turbine incorporated in the power recovery system according to the second embodiment of the present invention.

FIG. 6 is a cross-sectional view of the power recovery pump turbine incorporated in the power recovery system according to the second embodiment of the present invention.

As shown in FIG. 6, the power recovery pump turbine 18 comprises the turbine 14 and the booster pump 17 which are disposed respectively on the opposite ends of the single rotational shaft 16 that extends through a through hole 203. The turbine 14 includes a turbine casing 201 having an inlet port and an outlet port, and a turbine impeller 204 mounted on an end of the rotational shaft 16 and disposed in the turbine casing 201. The booster pump 17 includes a booster pump casing 211 having an inlet port and an outlet port, and a booster pump impeller 214 mounted on the opposite end of the rotational shaft 16 and disposed in the booster pump casing 211. The turbine casing 201 of the turbine 14 and the booster pump casing 211 of the booster pump 17 have end faces, which are opposite to their outlet and inlet ports, held against and fastened to each other in the axial direction of the rotational shaft 16.

The power recovery pump turbine 18 shown in FIG. 6 operates as follows: High-pressure seawater supplied from the turbine inlet line or reject bypass line 28 flows into the turbine impeller 204 from the outer circumferential portion of the turbine impeller 204, thereby applying its pressure to turbine impeller vanes 205 to impart a rotary energy to the turbine impeller 204, and then flows out into the discharge line 15. Thus, the turbine impeller 204 is rotated to transmit the rotary energy through the rotational shaft 16, thereby rotating the booster pump impeller 214. When the booster pump impeller 214 is rotated, pump impeller vanes 215 impart an energy to the seawater supplied from the supply seawater bypass boost line 24 into the booster pump casing 211. The seawater flowing in the booster pump casing 211 is now boosted and flows into the booster pump outlet line 19.

Type of the Turbine Impeller 204 of the Turbine 14:

In the present power recovery system, the turbine 14 is driven by a fluid (seawater) which has a relatively high pressure difference and which flows at a relatively low rate. Therefore, the turbine impeller 204 comprises a centrifugal impeller (as shown in FIG. 6) having a low impeller specific speed Ns. If the fluid handled by the power recovery system has a different pressure and flow rate, then the turbine impeller may comprise a mixed-flow impeller having a medium impeller specific speed Ns which corresponds to a relatively medium pressure difference and a relatively medium flow rate, or an axial-flow impeller having a high impeller specific speed Ns which corresponds to a relatively low pressure difference and a relatively high flow rate. The impeller specific speeds Ns of the centrifugal, mixed-flow, and axial-flow impellers generally have numerical values in overlapping ranges and are not strictly classified by clearly separate numerical ranges.

Type of the Booster Pump Impeller 214 of the Booster Pump 17:

In the present power recovery system, the booster pump 17 is actuated by a fluid (seawater) which has a relatively medium pressure difference and flows at a relatively medium rate. Therefore, the booster pump impeller 214 comprises a mixed-flow impeller (as shown in FIG. 6) having a medium impeller specific speed Ns. If the fluid handled by the power recovery system has a different pressure and flow rate, then the booster pump impeller 214 may comprise a centrifugal impeller having a low impeller specific speed Ns which corresponds to a relatively high pressure difference and a relatively low flow rate, or an axial-flow impeller having a high impeller specific speed Ns which corresponds to a relatively low pressure difference and a relatively high flow rate. The impeller specific speeds Ns of the centrifugal, mixed-flow, and axial-flow impellers generally have numerical values in overlapping ranges and are not strictly classified by clearly separate numerical ranges.

Directions of the Inlet and Outlet Ports of the Turbine 14 and the Booster Pump 17:

The direction of the inlet port of the turbine 14 and the direction of the outlet port of the turbine 14 are illustrated as being perpendicular to each other. However, these directions may be identical to each other, opposite to each other, or oblique to each other depending on the directions of external pipes that are actually joined to these inlet and outlet ports. This holds true for the direction of the inlet port of the booster pump 17 and the direction of the outlet port of the booster pump 17. The directions of the inlet and outlet ports of the turbine 14 and the directions of the inlet and outlet ports of the booster pump 17 may be varied in any combinations.

Turbine Radial Bearing:

The turbine 14 includes a turbine radial bearing 208 for bearing radial loads applied from the turbine impeller 204 to allow the rotary assembly made up of the turbine impeller 204, the rotational shaft 16, the booster pump impeller 214, and the like to rotate smoothly. The radial loads include a load based on the weight of the rotary assembly, a radial load caused by whirling motion of the rotary assembly, and a radial load caused by the fluid acting on the turbine impeller 204 and the booster pump impeller 214.

Turbine Thrust Bearing:

The turbine 14 includes a turbine thrust bearing 209 for bearing thrust loads applied from the turbine impeller 204 to allow the rotary assembly made up of the turbine impeller 204, the rotational shaft 16, the booster pump impeller 214, and the like to rotate smoothly. The thrust loads include loads caused by the fluid acting from the booster pump impeller 214 through the through hole 203 on the surface of the turbine impeller 204 which faces the through hole 203, and pushing the turbine impeller 204 toward the turbine outlet port. In order to reduce the thrust loads as much as possible, the pressure of the seawater in the supply seawater bypass boost line 24, which is lower than the pressure of the seawater in the booster pump outlet line 19, may be reduced by being introduced into holes 214h defined in the booster pump impeller 214, and the pressure of the seawater in the through hole 203 may be released through holes 204h defined in the turbine impeller 204 toward the discharge line 15.

Fixing of the Bearings of the Turbine 14:

The turbine radial bearing 208 and the turbine thrust bearing 209 have their outer circumferential portions fixed to a bearing shell 210 by shrink fitting, press-fitting, and/or threaded engagement, and/or have their outer circumferential portions and side portions fixed to the bearing shell 210 by adhesive bonding. The bearing shell 210 is fastened to the turbine inner casing 201 by bolts Y. The turbine radial bearing 208 and the turbine thrust bearing 209 are secured separately to the bearing shell 210 for the following reasons: If the turbine radial bearing 208 and the turbine thrust bearing 209 are combined into a single unitary bearing, such unitary bearing has an angle-shaped cross section. When the inner corner of the surfaces of the single unitary bearing which are held against the turbine impeller 204 is locally worn in the radial or thrust direction, the bearing develops a stepped surface which tends to minimize an area for bearing radial or thrust loads. When the bearing with the stepped surface is operated under a pressure in excess of an allowable surface pressure thereof, then the bearing is likely to be unduly damaged or worn. The turbine radial bearing 208 and the turbine thrust bearing 209 are secured separately to the bearing shell 210 to prevent such a problem.

Pump Radial Bearing:

The turbine pump 17 includes a pump radial bearing 218 for bearing radial loads applied from the rotational shaft 16 to allow the rotary assembly made up of the booster pump impeller 214, the rotational shaft 16, the turbine impeller 204, and the like to rotate smoothly. The radial loads include a load based on the weight of the rotary assembly, a radial load caused by whirling movement of the rotary assembly, and a radial load caused by the fluid acting on the turbine impeller 204 and the booster pump impeller 214.

Fixing of the Pump Radial Bearing:

The pump radial bearing 218 has an end having a vertical flat surface and an opposite end having a slanted flat surface. The vertical flat surface of the pump radial bearing 218 is inserted in the turbine casing 201 remotely from the axial inlet and outlet ports of the turbine casing 201, and the outer circumferential surface of the pump radial bearing 218 is fitted in the turbine casing 201. If the pump radial bearing 218 is rotated with respect to the turbine casing 201 due to rotational friction under radial loads from the rotational shaft 16, then the outer circumferential surface of the pump radial bearing 218 and the inner circumferential surface of the turbine casing 201 will be worn to form a clearance therebetween, resulting in wobbling movement of the pump radial bearing 218. When the pump radial bearing 218 wobbles, the rotational shaft 16 tends to unduly oscillate, and cause noise and damage to the related components. In order to prevent the pump radial bearing 218 from being rotated with respect to the turbine casing 201, a bearing holder sleeve 222 having a slanted end shaped complementarily to the slanted flat surface of the pump radial bearing 218 is fastened to the turbine casing 201 by a setscrew pin X against rotation. Since the slanted flat surface of the pump radial bearing 218 is engaged by the slanted end of the bearing holder sleeve 222, the pump radial bearing 218 is locked against rotation in the turbine casing 201. The bearing holder sleeve 222 thus fastened in position by the setscrew pin X is effective if the pump radial bearing 218 is made of a fragile material such as ceramics because the pump radial bearing 218 is not easy to form a groove for receiving the setscrew pin. If the pump radial bearing 218 is made of a material which is strong enough to allow a groove for receiving the setscrew pin to be easily formed therein, then the bearing holder sleeve 222 may be eliminated, and the pump radial bearing 218 may directly be locked in place against rotation by the setscrew pin. Although the single setscrew pin is illustrated, there may be a plurality of setscrew pins mounted on the bearing holder sleeve 222 at circumferentially spaced intervals. The bearing holder sleeve 222 is locked against axial movement by a fixing ring 223 which is mounted in the turbine casing 201 and projects radially inwardly. If the bearing holder sleeve 222 is not used, the pump radial bearing 218 may be directly locked against axial movement by the projection of the fixing ring 223.

Casing Rings and Impeller Rings:

The turbine 14 and the booster pump 17 have a turbine casing ring 226 and a pump casing ring 236, respectively, and the turbine casing ring 226 and the pump casing ring 236 are coupled respectively to the turbine casing 201 and the booster pump casing 211 for providing appropriate clearances around a turbine impeller ring 227 and a pump impeller ring 237, respectively, thereby minimizing a water leakage due to a differential pressure and transmitting the fluid energy efficiently to the turbine impeller 204 and the booster pump impeller 214. However, the impeller rings and the casing rings may be eliminated, and the turbine casing 201 and the booster pump casing 211 may provide appropriate clearances around the turbine impeller 204 and the booster pump impeller 214. However, when the casings and the impellers are worn due to coaction with each other after a long period of operating time, the casings and the impellers need to be replaced in their entirety to increase in cost. The casing rings and the impeller rings are advantageous in that it is much less costly to replace them. In view of the cost advantage, impeller rings may also be mounted on the portions of the turbine impeller 204 which are held against the bearings. The casing rings and the impeller rings are secured to the casings and the impellers, respectively, by shrink fitting, adhesive bonding, fitting, threaded engagement, and/or setscrew pins.

Structures of the Turbine Casing 201 and the Booster Pump Casing 211:

If each of the turbine casing 201 and the booster pump casing 211 is made up of a plurality of casing members joined together, the turbine casing 201 and the booster pump casing 211 are assembled together by flanges 245 and bolt-and-nut fasteners 246. The bolts are disposed at circumferentially spaced intervals on the flanges 245. In the illustrated embodiment, the turbine casing 201 and the booster pump casing 211 are composed of three casing members that are assembled together by two types of bolts and nuts. However, the turbine casing 201 and the booster pump casing 211 may be made up of more or less casing members that are assembled together by more or less types of bolts and nuts.

Inlet and Outlet Port Flange Configurations:

In the illustrated embodiment, although all of a turbine outlet port $14_{OUT}$, a turbine inlet port $14_{IN}$, a pump outlet port $17_{OUT}$, and a pump inlet port $17_{IN}$ have a flanged structure, they may have butt-welding or threaded connection structure. Alternatively, the turbine outlet port, the turbine inlet port, the pump outlet port, and the pump inlet port may have a combination of a flanged structure, a butt-welding connection structure, and a threaded connection structure.

Fixing of the Turbine Impeller 204 and the Booster Pump Impeller 214 to the Rotational Shaft 16:

The turbine impeller 204 and the booster pump impeller 214 are mounted on the rotational shaft 16 by keys Z2 fitted in respective key slots that are formed in the rotational shaft 16, the turbine impeller 204 and the booster pump impeller 214. The turbine impeller 204 and the booster pump impeller 214 are locked on the rotational shaft 16 against removal respectively by a turbine impeller cap 229 and a pump impeller cap 239 which are attached to the rotational shaft 16. A turbine impeller bolt 230 and a pump impeller bolt 240 are then screwed into the rotational shaft 16 through respective holes that are formed in the turbine impeller cap 229 and the pump impeller cap 239, respectively, thereby fixing the turbine impeller cap 229 and the pump impeller cap 239 to the rotational shaft 16. The turbine impeller cap 229 and the pump impeller cap 239 are prevented from being loosened by setscrew pins (not shown) inserted through the turbine impeller cap 229 and the pump impeller cap 239 into the turbine impeller 204 and the booster pump impeller 214. Although not shown, tongued or toothed washers may be used and tongues or teeth of the washers may be bent into the key slots in the rotational shaft 16 and recesses in the turbine impeller cap 229 and the pump impeller cap 239 to prevent the turbine impeller cap 229 and the pump impeller cap 239 from being loosened.

Rotational Speed Meter:

A rotational speed meter 241 for measuring the rotational speed of the rotational shaft 16 is mounted on the turbine casing 201. The rotational speed of the rotational shaft 16 that is measured by the rotational speed meter 241 is monitored to control the operation of the power recovery pump turbine 18. The rotational speed meter may be mounted on the pump casing. Rather than the rotational shaft 16, the booster pump impeller 214, the turbine impeller 204, the turbine impeller ring 227, the pump impeller ring 237, the pump impeller cap 239, the turbine impeller cap 229, the pump impeller bolt 240, or the turbine impeller bolt 230 may be measured for its rotational speed. In the illustrated embodiment, the rotational speed meter 241 is held out of contact with the rotational shaft 16. However, the rotational speed meter 241 is not limited to the non-contact type.

Figure 7:
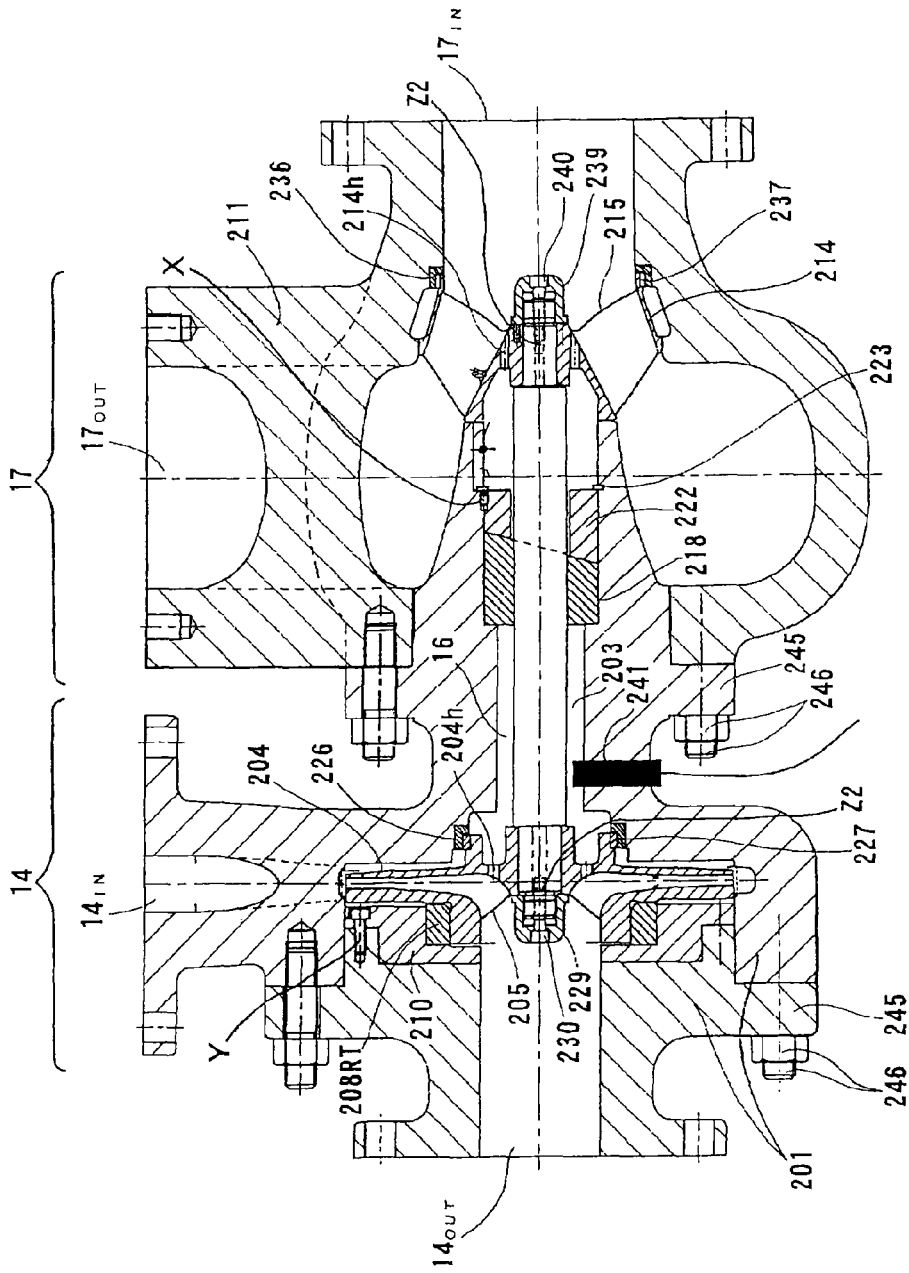
FIG. 7 is a cross-sectional view of a turbine-side radial thrust bearing according to an embodiment of the present invention, for use in the power recovery pump turbine.

FIG. 7 is a cross-sectional view of a turbine-side radial thrust bearing according to an embodiment of the present invention, for use in the power recovery pump turbine. As shown in FIG. 7, a turbine-side radial thrust bearing 208RT having a rectangular cross section for bearing radial and thrust loads is used instead of the turbine radial bearing 208 and the turbine thrust bearing 209 shown in FIG. 6. Since only one bearing is used in combination with the turbine 14, the turbine 14 can be manufactured less costly and can be assembled more easily. If a single unitary bearing has an angle-shaped cross section, then the inner corner of the surfaces of the bearing which are held against the turbine impeller 204 tends to suffer a wear problem as described above with reference to FIG. 6. However, the turbine-side radial thrust bearing 208RT shown in FIG. 7, which has the rectangular cross section, is uniformly worn in the radial and thrust directions. Therefore, the turbine-side radial thrust bearing 208RT does not develop a stepped surface due to wear, and hence is not operated under a pressure in excess of an allowable surface pressure thereof, unlike the bearing shown in FIG. 6. Thus, the turbine-side radial thrust bearing 208RT can bear radial and thrust loads stably.

Figure 8:
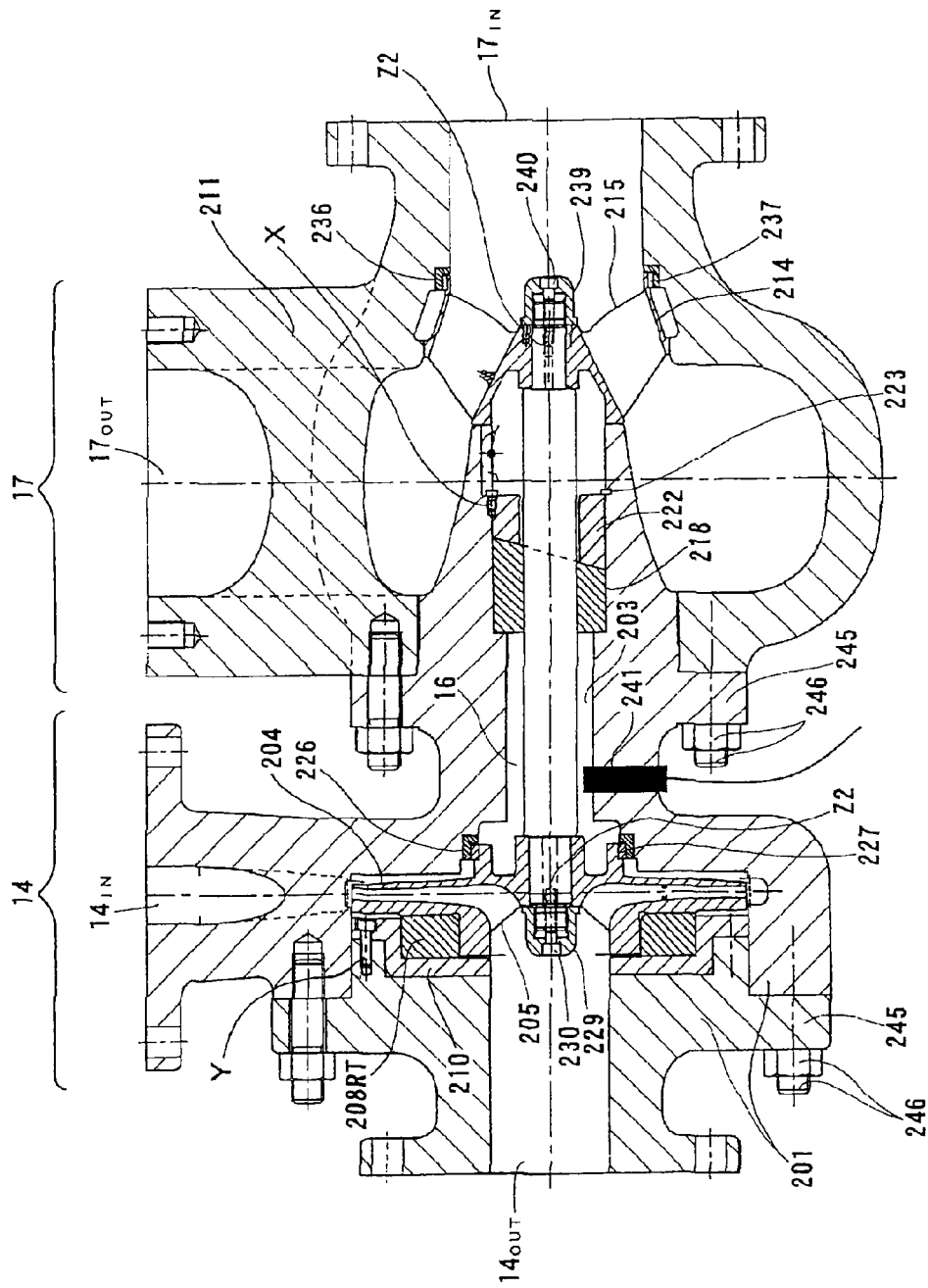
FIG. 8 is a cross-sectional view of a turbine-side radial thrust bearing according to another embodiment of the present invention, for use in the power recovery pump turbine.

FIG. 8 is a cross-sectional view of a turbine-side radial thrust bearing according to another embodiment of the present invention, for use in the power recovery pump turbine. The turbine-side radial thrust bearing 208 RT shown in FIG. 8 has a greater area for bearing thrust loads than the turbine-side radial thrust bearing 208RT shown in FIG. 7. Accordingly, the turbine-side radial thrust bearing 208RT shown in FIG. 8 can bear greater thrust loads than the turbine-side radial thrust bearing 208RT shown in FIG. 7. Therefore, the power recovery pump turbine can operate without the need for the turbine impeller holes 204h and the pump impeller holes 214h (see FIG. 6) that are provided for reducing thrust loads. Thus, the turbine impeller 204 and the booster pump impeller 214 have a greater energy transmission efficiency because of no fluid leakage through the turbine impeller hole and the pump impeller hole.

Positive-Displacement Piston Pump 23 According to the Present Invention:

The positive-displacement piston pump 23 in the power recovery systems according to the first and second embodiments of the present invention will be described below.

Figure 9:
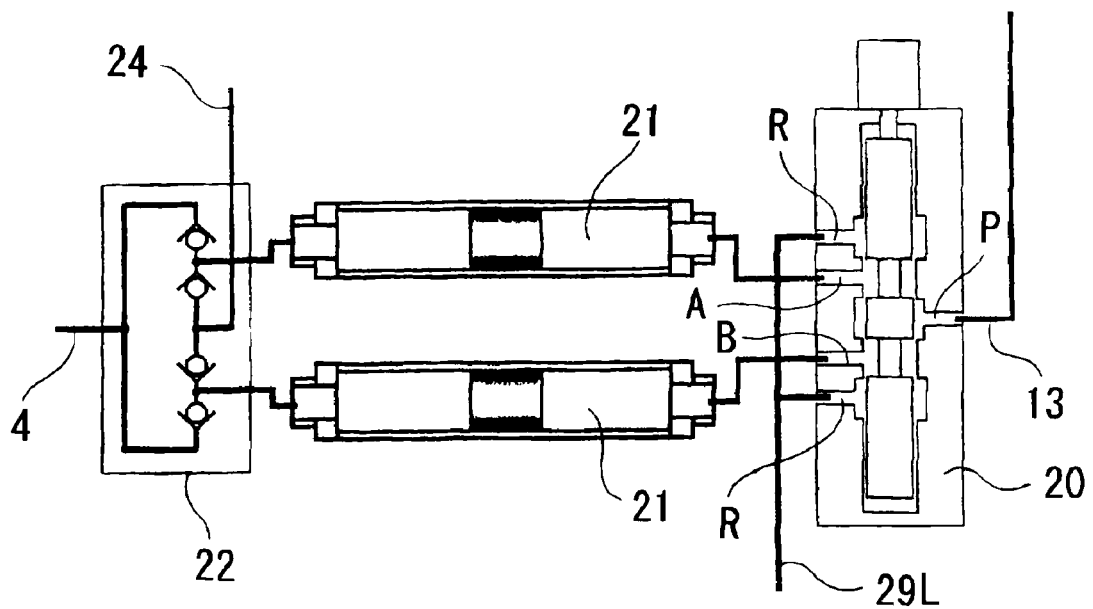
FIG. 9 is a schematic cross-sectional view of a positive-displacement piston pump in the power recovery system.

FIG. 9 is a schematic cross-sectional view of the positive-displacement piston pump 23. As shown in FIG. 9, the positive-displacement piston pump 23 comprises the control valve 20, the two power recovery chambers 21, and the switching valve 22.

The positive-displacement piston pump 23 functions to introduce the reject from the reverse osmosis membrane 10 into the control valve 20, boost the seawater introduced from the supply line 4 through the switching valve 22 into the power recovery chamber 21 by the energy of the reject, and supply the boosted seawater through the discharge line or supply seawater bypass boost line 24 to the power recovery pump turbine 18.

Figure 10:
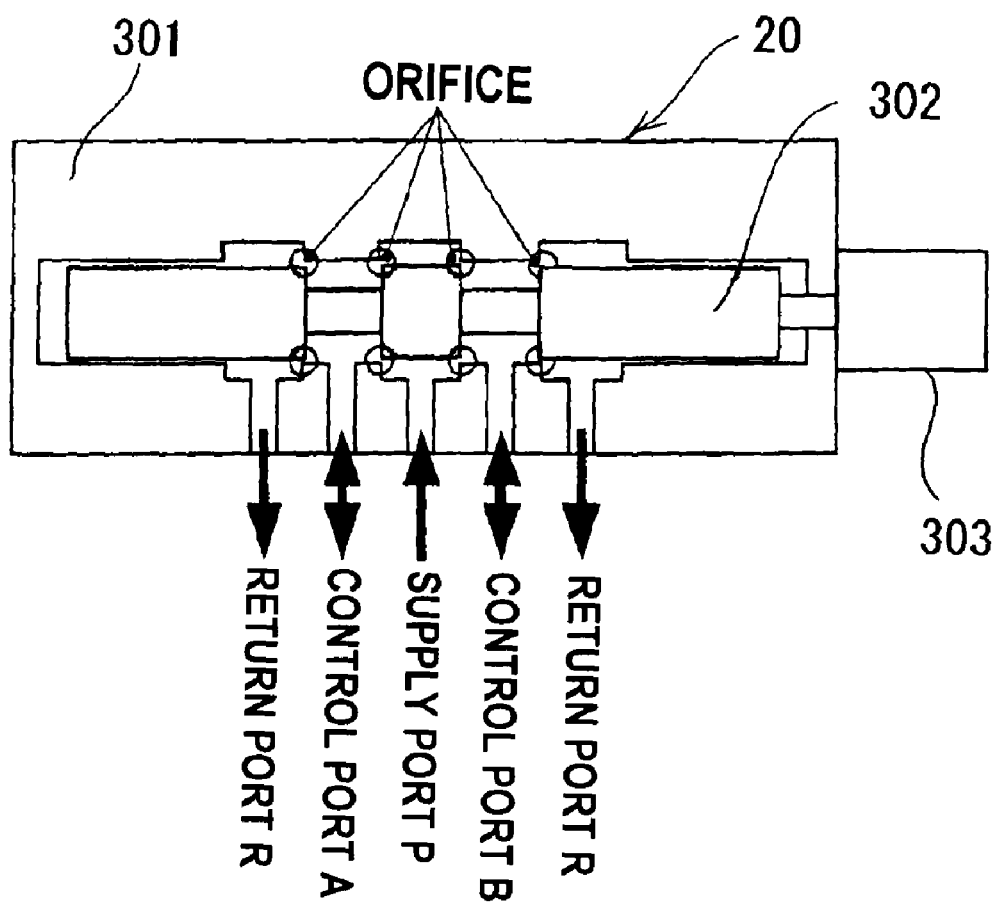
FIG. 10 is a schematic cross-sectional view showing the basic structure of a control valve of the positive-displacement piston pump.

Basic Structure of the Control Valve 20:

FIG. 10 is a schematic cross-sectional view showing the basic structure of the control valve 20.

As shown in FIG. 10, the control valve 20 comprises a housing 301, a spool 302, and an actuator 303. The spool 302, which is fitted in the housing 301, is actuated by the actuator 303 to switch the flow paths.

The control valve 20 has at least one supply port P, two control ports A, B, and two or more return ports R.

As shown in FIG. 9, the supply port P is connected to the concentrated seawater line 13, the control ports A, B are connected to the respective power recovery chambers 21, and the return ports R are connected to a discharge line 29.

Functions of the Control Valve 20:

(1) The control valve 20 introduces the high-pressure reject supplied thereto selectively into the two power recovery chambers 21 in response to operation of the spool 302.

(2) The control valve 20 discharges the fluid in the power recovery chambers 21 to the outside of the positive-displacement piston pump 23.

Structural Details of the Control Valve 20:

The spool 302 of the control valve 20 shown in FIG. 10 has three lands. However, the spool 302 may be a rotary spool or any of other spools insofar as the control valve has its basic functions, and has at least one supply port P, two control ports A, B, and at least two return ports R, and the spool 302 is operated to bring the supply port into fluid communication with one of the control ports and also to bring the other control port into fluid communication with the return port.

The lands of the spool 302 and associated lands of the housing 301 may be set to different lapping degrees at metering orifices indicated by circles, including an underlap, an overlap, and a zero-lap depending on the operating requirements of the object to be controlled, i.e., the piston in the power recovery chamber 21.

The portions of the control valve 20 which are held in contact with the fluid, i.e., the seawater, are made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The high-polymer material may be in the form of a coating or a bulk including at least one of PA, POM, PBT, PET, PPE, PC, UHMW-PE, PTFE, PPS, PI, PEEK, PAR, PSF, PEI, PAI, and PES. These high-polymer materials may be mixed with carbon fibers, glass fibers, or a solid lubricant.

Particularly, sliding portions of the spool 302 and the housing 301 are required to meet low-friction wearing conditions under conditions of lubrication by the seawater or the concentrated seawater. The sliding portions are made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The coating may be a sprayed ceramics coating made of oxide ceramics ($Cr_2O_3$, $Al_2O_3$) or carbide cermets (WC—NiCr, WC—CoCr, $Cr_3C_2$—NiCr). A layer of Ni, Ni—Cr, Ni—Cr—Mo or the like may be interposed between the ceramics coating and the base material to prevent the seawater from seeping into the base material for thereby preventing crevice corrosion of the base material.

The coating may alternatively be a PVD or CVD ceramics coating made of DLC, TiN, TICN, TiAlN, CrN, cBN, polycrystalline diamond, or SiC.

The high-polymer material may be in the form of a coating or a bulk including at least one of PA, POM, PBT, PET, PPE, PC, UHMW-PE, PTFE, PPS, PI, PEEK, PAR, PSF, PEI, PAI, and PES. These high-polymer materials may be mixed with carbon fibers, lath fibers, or a solid lubricant.

The actuator 303 for actuating the spool 302 may comprise an electromagnetic solenoid, a worm gear, a motor-operated ball screw, an electric motor, a piezoelectric device, a hydraulic cylinder, a pneumatic cylinder, or the like. If the spool 302 is a sliding spool, then it may be actuated by a pilot pressure, i.e., a reject pressure, as with general nozzle flapper servovalves. In other words, the spool 302 may be actuated by any actuators or means insofar as they can actuate the spool 302 in response to an input signal applied thereto.

The spool 302 may be supported by hydrostatic bearings.

Figure 11:
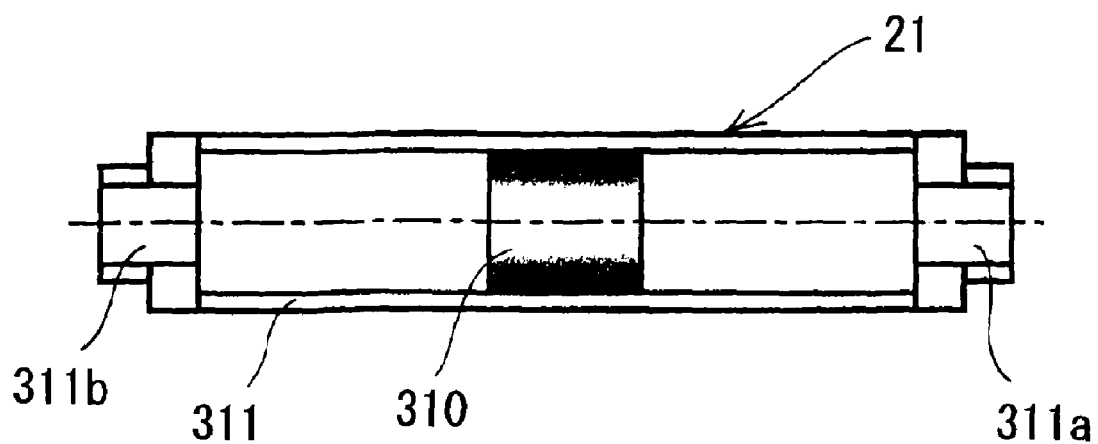
FIG. 11 is a schematic cross-sectional view of a power recovery chamber of the positive-displacement piston pump.

Summary of the Power Recovery Chambers 21:

FIG. 11 is a schematic cross-sectional view of the power recovery chamber 21. As shown in FIG. 11, the power recovery chamber 21 comprises a piston 310 and a cylinder 311 having inlet and outlet ports 311a, 311b. The piston 310 is axially movably disposed in the cylinder 311.

The positive-displacement piston pump 23 includes the two power recovery chambers 21 each having the inlet and outlet ports 311a, 311b. One of the inlet and outlet ports 311a, 311b of each of the power recovery chambers 21 is connected to one of the control ports A, B of the control valve 20, and the other of the inlet and outlet ports 311a, 311b is connected to the switching valve 22.

Piston seals (not shown) are disposed around the pistons 310 of the power recovery chambers 21 for preventing the fluid in one of the fluid compartments divided by the piston from being mixed with the fluid in the other of the fluid compartments.

Functions of the Power Recovery Chambers 21:

(1) Under the pressure of the reject introduced through the control valve 20 into one of the fluid compartments in the power recovery chamber 21, the piston 310 is moved to increase the pressure of the seawater that is introduced into the other fluid compartment by the intake pump.

(2) The power recovery chamber 21 introduces the reject, which has been introduced into one of the fluid compartments, into the control valve 20 under the pressure of the seawater that is introduced into the other fluid compartment by the intake pump 2.

Structural Details of the Power Recovery Chambers 21:

The power recovery chambers 21 are made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The high-polymer material may be in the form of a coating or a bulk including at least one of PA, POM, PBT, PET, PPE, PC, UHMW-PE, PTFE, PPS, PI, PEEK, PAR, PSF, PEI, PAI, and PES. These high-polymer materials may be mixed with carbon fibers, glass fibers, or a solid lubricant.

Particularly, sliding portions of the piston 310 and the cylinder 311 are required to meet low-friction wearing conditions under conditions of lubrication by the seawater or the concentrated seawater. The sliding portions are made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The coating may be a sprayed ceramics coating made of oxide ceramics ($Cr_2O_3$, $Al_2O_3$) or carbide cermets (WC—NiCr, WC—CoCr, $Cr_3C_2$—NiCr). A layer of Ni, Ni—Cr, Ni—Cr—Mo or the like may be interposed between the ceramics coating and the base material to prevent the seawater from seeping into the base material for thereby preventing crevice corrosion of the base material.

The coating may alternatively be a PVD or CVD ceramics coating made of DLC, TiN, TICN, TiAlN, CrN, cBN, polycrystalline diamond, or SiC.

The high-polymer material may be in the form of a coating or a bulk including at least one of PA, POM, PBT, PET, PPE, PC, UHMW-PE, PTFE, PPS, PI, PEEK, PAR, PSF, PEI, PAI, and PES. These high-polymer materials may be mixed with carbon fibers, lath fibers, or a solid lubricant.

The pistons 310 and the cylinders 311 of the power recovery chambers 21 may have a circular cross section, a square cross section, a hexagonal cross section, or any of various other cross sections.

The pistons 310 may have lubricating grooves formed in outer circumferential surfaces thereof for forming a lubricating film on the outer circumferential surfaces, thereby increasing slidability of the outer circumferential surfaces of the pistons 310 and the inner circumferential surfaces of the cylinders 311. The lubricating grooves may comprise circumferentially annular grooves, helical grooves, axial rectangular grooves, or any of variously shaped grooves.

Figure 12:
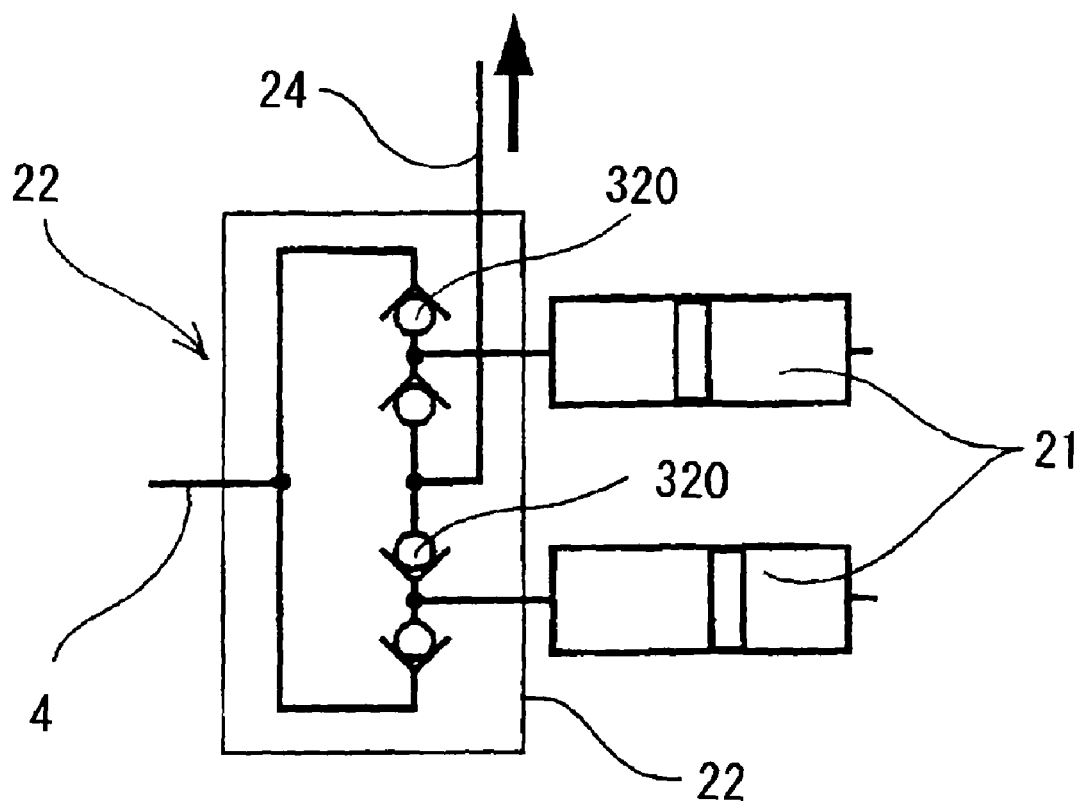
FIG. 12 is a schematic cross-sectional view of a switching valve of the positive-displacement piston pump.

Summary of the Switching Valve 22:

FIG. 12 is a schematic cross-sectional view of the switching valve 22. As shown in FIG. 12, the switching valve 22 comprises four check valves 320 which are oriented and connected to the power recovery chambers 21 as illustrated.

Functions of the Switching Valve 22:

The switching valve 22 introduces (stores) the seawater from the supply line 4 into the power recovery chambers 21 and introduces the boosted seawater into the booster pump 17 through the supply seawater bypass boost line 24, in response to operation of the pistons 310 of the power recovery chambers 21.

Figure 13:
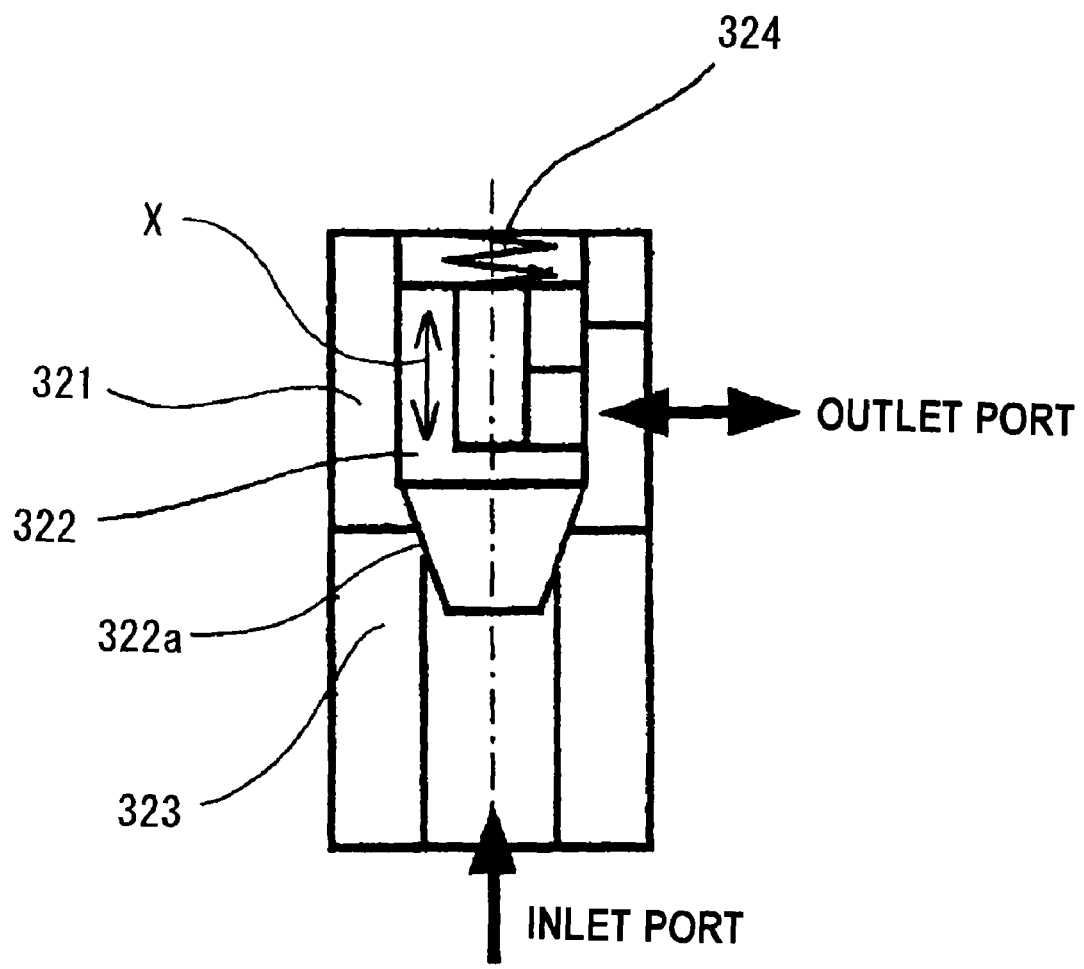
FIG. 13 is a schematic cross-sectional view of a check valve of the switching valve of the positive-displacement piston pump.

Structural Details of the Switching Valve 22:

FIG. 13 is a schematic cross-sectional view of a check valve of the switching valve 22. As shown in FIG. 13, a check valve 320 comprises a casing 321, a poppet 322 movably housed in the casing 321 for movement in the directions indicated by arrow X, a seat 323 for seating thereon a conical end 322a of the poppet 322, and a compression helical spring 324 for normally urging the poppet 322 toward the seat 323. However, the check valve may be of any of various other structures insofar as they can prevent the fluid from flowing back.

Operation of the check valve 320 will be described below with reference to FIG. 13. The fluid under pressure which has entered an inlet port of the check valve 320 lifts the poppet 322 off the seat 323, and flows out of the check valve 320 through an outlet port thereof. When the fluid pressure in the outlet port becomes higher than the fluid pressure in the inlet port, the poppet 322 is seated on the seat 323, thereby preventing the fluid from flowing back into the check valve 320.

The check valve is made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The high-polymer material may be in the form of a coating or a bulk including at least one of PA, POM, PBT, PET, PPE, PC, UHMW-PE, PTFE, PPS, PI, PEEK, PAR, PSF, PEI, PAI, and PES. These high-polymer materials may be mixed with carbon fibers, glass fibers, or a solid lubricant.

Particularly, sliding portions of the poppet 322 and the casing 321 are required to meet low-friction wearing conditions under conditions of lubrication by the seawater or the concentrated seawater. The sliding portions are made of a metal, ceramics, or a high-polymer material. The metal may be stainless steel, duplex stainless steel, superduplex stainless steel, or aluminum bronze. The ceramics may be in the form of a coating or a bulk including at least one of alumina ($Al_2O_3$), silicon nitride ($Si_3N_4$), silicon carbide (SiC), and sialon (SiAlON). The coating may be a sprayed ceramics coating made of oxide ceramics ($Cr_2C_3$, $Al_2O_3$) or carbide cermets (WC—NiCr, WC—CoCr, $Cr_3C_2$—NiCr). A layer of Ni, Ni—Cr, Ni—Cr—Mo or the like may be interposed between the ceramics coating and the base material to prevent the seawater from seeping into the base material for thereby preventing crevice corrosion of the base material.

The coating may alternatively be a PVD or CVD ceramics coating made of DLC, TiN, TICN, TiAlN, CrN, cBN, polycrystalline diamond, or SiC.

The high-polymer material may be in the form of a coating or a bulk including at least one of PA, POM, PBT, PET, PPE, PC, UHMW-PE, PTFE, PPS, PI, PEEK, PAR, PSF, PEI, PAI, and PES. These high-polymer materials may be mixed with carbon fibers, lath fibers, or a solid lubricant.

Summary of Operation of the Positive-displacement Piston Pump 23:

Operation of the positive-displacement piston pump 23 will be described below with reference to FIGS. 12, 14, and 15.

(1) The reject is supplied from the concentrated seawater line 13 to the supply port P of the control valve 20.

(2) The intake seawater is introduced through the supply line 4 into the switching valve 22.

(3) The spool 302 of the control valve 20 is moved to move the pistons 310 in the power recovery chambers 21.

Figure 14:
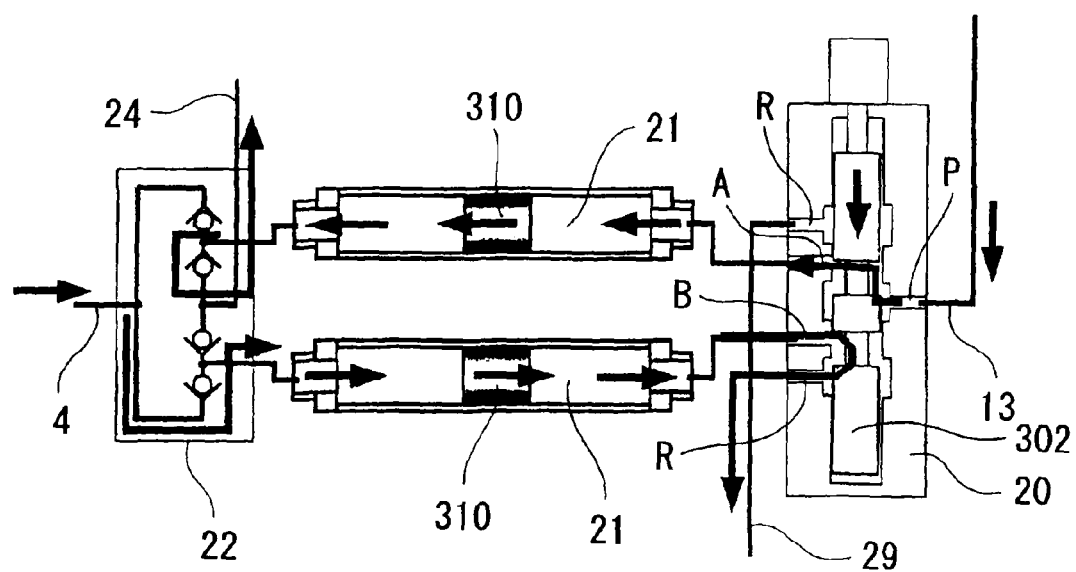
FIG. 14 is a schematic cross-sectional view showing the manner in which a spool of the control valve of the positive-displacement piston pump is moved in a direction to bring a supply port and a control port into fluid communication with each other.

Examples of Operation:

(A) FIG. 14 is a schematic cross-sectional view showing the manner in which the spool 320 is moved in a direction to bring the supply port P and the control port A into fluid communication with each other.

The pressure of the reject acts on the right surface, facing the control valve 20, of the piston 310 of the upper power recovery chamber 21 through the supply port P and the control port A of the control valve 20.

The piston 310 of the upper power recovery chamber 21 is moved to the left.

The seawater which has been introduced into the upper power recovery chamber 21 through the switching valve 22 is boosted by the piston 310 thus moved, and is introduced through the switching valve 22 into the booster pump 17.

At the same time, the control port B and the return port R of the control valve 20 are brought into fluid communication with each other. The pressure of the seawater which has been introduced into the lower power recovery chamber 21 through the switching valve 22 acts on the left surface, facing the switching valve 22, of the piston 310 of the lower power recovery chamber 21, thereby moving the piston 310 to the right.

The speed at which the pistons 310 are moved is determined dependent on the difference between the pressure of the seawater that has passed through the switching valve 22 and the pressure of the seawater in the supply seawater bypass boost line 24. The pistons 310 are moved when the pressure of the seawater that has passed through the switching valve 22 is higher than the pressure of the seawater in the supply seawater bypass boost line 24.

The speed at which the pistons 310 are moved is set to a desired value by adjusting the opening of a valve (not shown) provided in the supply seawater bypass boost line 24.

Then, the fluid compartment that is defined by the piston 310 of the lower power recovery chamber 21 and brought in fluid communication with the switching valve 22 is filled with the seawater from the switching valve 22.

Figure 15:
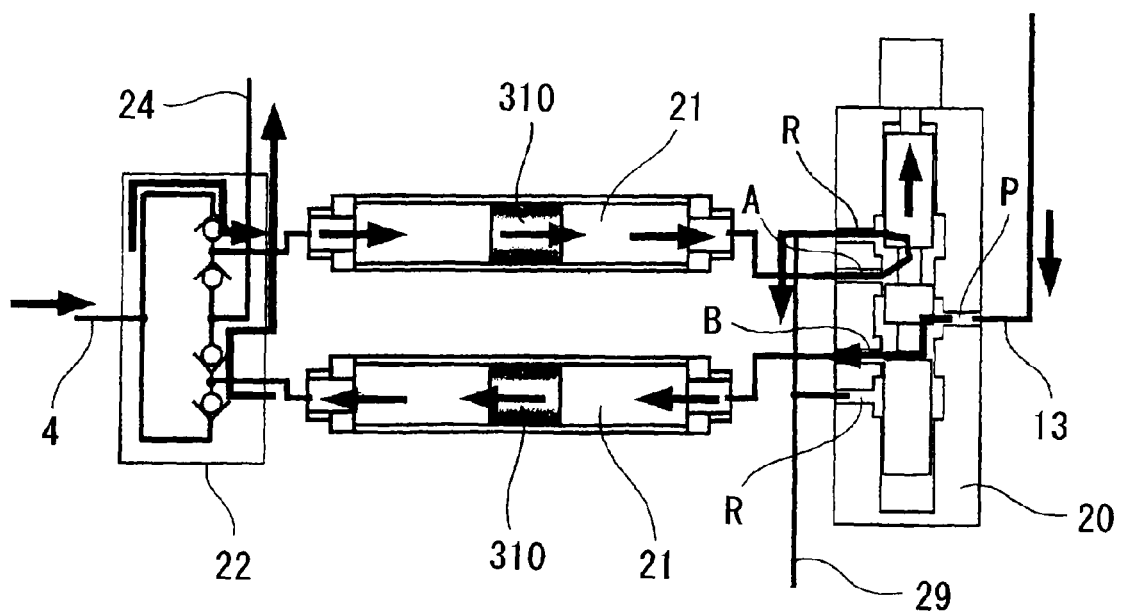
FIG. 15 is a schematic cross-sectional view showing the manner in which a spool of the control valve of the positive-displacement piston pump is moved in a direction to bring a supply port and a control port into fluid communication with each other.

(B) FIG. 15 is a schematic cross-sectional view showing the manner in which the spool 320 is moved in a direction to bring the supply port P and the control port B into fluid communication with each other.

The pressure of the reject acts on the right surface, facing the control valve 20, of the piston 310 of the lower power recovery chamber 21 through the supply port P and the control port B of the control valve 20.

The piston 310 of the lower power recovery chamber 21 is moved to the left.

The seawater which has been introduced into the lower power recovery chamber 21 through the switching valve 22 is boosted by the piston 310 thus moved, and is introduced through the switching valve 22 into the booster pump 17.

At the same time, the control port A and the return port R of the control valve 20 are brought into fluid communication with each other. The pressure of the seawater which has been introduced into the upper power recovery chamber 21 through the switching valve 22 acts on the left surface, facing the switching valve 22, of the piston 310 of the upper power recovery chamber 21, thereby moving the piston 310 to the right.

The speed at which the pistons 310 are moved is determined dependent on the difference between the pressure of the seawater that has passed through the switching valve 22 and the pressure of the seawater in the supply seawater bypass boost line 24. The pistons 310 are moved when the pressure of the seawater that has passed through the switching valve 22 is higher than the pressure of the seawater in the supply seawater bypass boost line 24.

The speed at which the pistons 310 are moved is set to a desired value by adjusting the opening of a valve (not shown) provided in the supply seawater bypass boost line 24.

Then, the fluid compartment that is defined by the piston 310 of the upper power recovery chamber 21 and brought in fluid communication with the switching valve 22 is filled with the seawater from the switching valve 22.

The control valve 20 of the positive-displacement piston pump 23 is thus operated alternately according to operations (A) and (B) to increase the pressure of the intake seawater by utilizing the reject.

Control of the Positive-Displacement Piston Pump 23:

The reverse osmosis membrane 10 is vulnerable to pressure pulsations of the fluid supplied thereto. Such pressure pulsations are responsible for damage to the reverse osmosis membrane 10. The booster pump 17 is also liable to decrease in performance and its components are liable to be damaged due to pressure pulsations of the fluid in the supplied supply seawater bypass boost line 24.

Solutions Based on Control Valve Configurations:

One way of reducing pressure pulsations of the boosted seawater that is supplied from the positive-displacement piston pump 23 to the booster pump 17 is to control the lapping degree of the lands of the control valve 20 in the metering orifices as described above with reference to FIG. 10.

Usually, in the positive-displacement piston pump 23, a pressure pulsation occurs when the control valve 20 switches because when the spool 302 passes through its neutral position, the flow rate of the fluid in the control valve 20, i.e., the flow rate of the fluid flowing from the support port P to the control ports A, B, becomes essentially nil.

In order to prevent the flow rate of the fluid from becoming nil at the time the spool 302 passes through its neutral position, the lands of the control valve 20 are set to an underlap at the metering orifices between the supply port P and the control ports A, B. When the spool 302 passes through its neutral position, therefore, the fluid flows from the control valve 20 to the power recovery chambers 21 at a certain rate which is not nil.

At the other metering orifices between the control ports A, B and the return ports R, the lands of the control valve 20 should preferably be set to an overlap or a zero-lap to prevent an internal fluid leakage in the control valve 20.

The lands of the control valve 20 may be set to an underlap by selecting axial dimensions of the lands or by rounding or chamfering corners of the spool edges. Of course, the lands of the control valve 20 may be set to an underlap by any of various means.

Solutions Based on Control Valve Operation:

Another way of reducing pressure pulsations of the boosted seawater that is supplied from the positive-displacement piston pump 23 to the booster pump 17 is to control a switching signal applied to the control valve 20.

Normally, a step signal is applied as the switching signal to the control valve 20. When a step signal is applied to the control valve 20, the control valve 20 is switched instantaneously, tending to produce a pressure pulsation in the fluid flow from the support port P through the control ports A, B to the power recovery chambers 21.

Various processes may be used to reduce pressure pulsations of the boosted seawater that is supplied from the positive-displacement piston pump 23 to the booster pump 17, without using a step signal as a switching signal applied to the control valve 20. According to one process, a signal having a gradient up to a target value, such as a trapezoidal signal, is applied as a switching signal applied to the control valve 20. According to another process, a signal having a gradient within a preset range up to a target value is applied as a switching signal applied to the control valve 20. According to still another process, a PID control signal wherein PID control constants are varied within a preset range up to a target value is applied as a switching signal applied to the control valve 20.

Control System of the Power Recovery System According to the Present Invention:

A control system of the power recovery system for reducing the total energy consumption in a process such as an industrial treating process or a fluid refining process including the delivery of a fluid under a high pressure will be described below.

The present invention is particularly suitable for a power recovery system that serves as an energy consumption reducing means in a seawater desalination system which employs a reverse osmosis membrane method for desalinating seawater. The present invention realizes operation of the reverse osmosis seawater desalination system including the high-pressure pump 5, the positive-displacement piston pump 23, and the power recovery pump turbine 18. The present invention is also concerned with a control system for controlling a power recovery system and a method of operating a power recovery system at a maximum efficiency point while minimizing an electric power consumption for seawater desalination.

Figure 16:
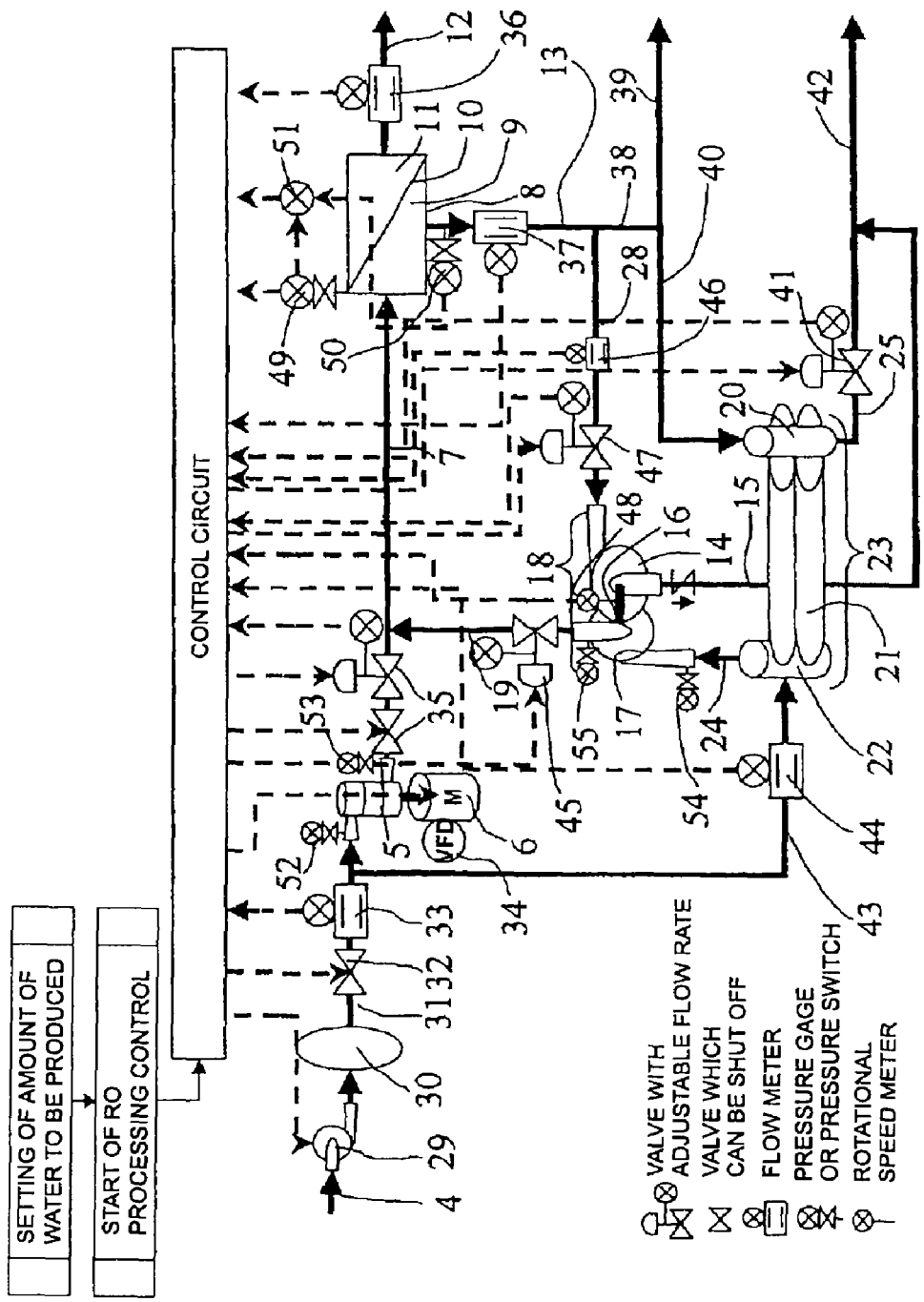
FIG. 16 is a diagram showing a control system of the power recovery system.

Arrangement of the Control System:

FIG. 16 is a diagram showing a control system of the power recovery system.

Components of the control system of the power recovery system according to the second embodiment of the present invention and their functions will be described below in the sequence of a flow of seawater with reference to FIG. 16.

The control system shown in FIG. 16 has a control circuit for controlling a high-pressure pump outlet valve (control valve) 35, a power recovery outlet valve (control valve) 41, a booster pump outlet valve (control valve) 45, and a turbine inlet valve (control valve) 47 based on flow rates measured by a supply seawater flow meter 33, a desalinated water flow meter 36, a concentrated seawater flow meter 37, a seawater bypass flow meter 44, and a turbine inlet flow meter 46.

Each of the flow meters may preferably comprise a turbine flow meter, an ultrasonic flow meter, or an orifice flow meter. The flow meter is not limited to the above types insofar as flow measurement can be made.

In FIG. 16, when the high-pressure pump 5 is operated after its suction pressure has reached an operational level due to the boost pressure from a supply pump 29 and the high-pressure pump outlet valve (control valve) 35 is opened to a certain degree, the pressure acting on the reverse osmosis membrane 10 in the reverse osmosis membrane cartridge 8 exceeds the osmosis pressure, thus forcing desalinated water through the reverse osmosis membrane 10. A supply seawater line 31 extending from the supply pump 29 has a safety filter 30 and a high-pressure pump inlet valve 32.

The high-pressure reject discharged from the reverse osmosis membrane cartridge 8 flows through and is branched by the concentrated seawater line 13 into the turbine inlet line 28 and a power recovery and discharge line 38. The reject flowing into the turbine inlet line 28 is introduced into the turbine 14 which is coupled to the booster pump 17 by the rotational shaft 16. The reject flowing into the power recovery and discharge line 38 is introduced through a power recovery line 40 into the control valve 20 of the positive-displacement piston pump 23.

Under the pressure of the high-pressure reject supplied from the control valve 20 into the power recovery chambers 21, the power recovery chambers 21 boost the seawater supplied from a seawater bypass line 43 connected to the supply seawater line 31 in coaction with the switching valve 22. The boosted seawater is supplied through the supply seawater bypass boost line 24 to the booster pump 17, and the seawater is further boosted by the booster pump 17. The boosted seawater from the booster pump 17 is introduced into the high-pressure line 7 and added to the seawater that is supplied from the high-pressure pump 5 to the reverse osmosis membrane cartridge 8. Accordingly, the flow rate of the seawater supplied from the high-pressure pump 5 is reduced, i.e., the energy of the reject from the reverse osmosis membrane cartridge 8 is recovered.

The booster pump 17 is driven by the turbine 14 that is coupled thereto by the rotational shaft 16. The turbine 14 is actuated by the high-pressure reject branched from the concentrated seawater line 13 into the turbine inlet line 28.

The turbine inlet valve 47 is connected to the turbine inlet line 28 for controlling the flow rate of the seawater that flows into the turbine 14. The low-pressure turbine reject 15 from the turbine 14 is discharged into a concentrated seawater drain line 42 downstream of the power recovery outlet valve 41. The concentrated seawater drain line 42 is connected to discharge the low-pressure turbine reject 25 from the positive-displacement piston pump 23 through the power recovery outlet valve 41. If the low-pressure turbine reject 15 is discharged into the concentrated seawater drain line 42 upstream of the power recovery outlet valve 41, then the pressure of the low-pressure turbine reject 15 may possibly be increased when the opening of the power recovery outlet valve 41 is small. If the pressure of the low-pressure turbine reject 15 is increased, then the output power of the turbine 14 is lowered, failing to achieve a desired rotational speed of the booster pump 17.

The power recovery pump turbine 18, comprising the booster pump 17 and the turbine 14 that are coupled to each other by the rotational shaft 16, is required to control the flow rate of the fluid flowing from the seawater bypass line 43. For controlling the flow rate of the fluid flowing from the seawater bypass line 43, only the turbine 14 may be controlled by the turbine inlet valve 47, or the booster pump 17 may be controlled by the booster pump outlet valve 45 in combination with the controlling of the turbine 14.

The various control valves referred to above will be described below.

High-pressure Pump Outlet Valve (Control Valve) 35:

The high-pressure pump outlet valve (control valve) 35 serves to control the flow rate of the fluid flowing into the reverse osmosis membrane 10, and may be of any of various valve structures insofar as they can regulate the flow rate of the fluid. The CV value of the high-pressure pump outlet valve 35 should preferably be of equal percentage characteristics where the flow rate varies linearly with respect to the valve opening.

The opening of the high-pressure pump outlet valve 35 is controlled based on the measured data from either one of the desalinated water flow meter 36 and the high-pressure pump inlet flow meter 33.

If it is necessary to achieve safety, prevent cavitation, and shut off the line completely with a dual restriction valve assembly for the protection of the reverse osmosis membrane 10, then two valves may be provided as the high-pressure pump outlet valve 35, one for cutting off the fluid when the power recovery system is activated or shut down and one for controlling the flow rate of the fluid while the power recovery system is in operation.

Turbine Inlet Valve 47:

The turbine inlet valve 47 functions to control the flow rate of the fluid flowing into the turbine 14, and may be of any of various valve structures insofar as they can regulate the flow rate of the fluid. The CV value of the turbine inlet valve 47 should preferably be of equal percentage characteristics.

The opening of the turbine inlet valve 47 is controlled based on the measured data from either one of the concentrated seawater flow meter 37 and the seawater bypass flow meter 44, or based on the measured data from either one of the turbine inlet flow meter 46 and a power recovery pump turbine rotational speed meter 48.

Booster Pump Outlet Valve 45:

The booster pump outlet valve 45 functions to disconnect the power recovery pump turbine 18 from the high-pressure line 7 and to control the flow rate of the fluid discharged from the booster pump 17, and may be of any of various valve structures insofar as they can regulate the flow rate of the fluid. The CV value of the booster pump outlet valve 45 should preferably be of equal percentage characteristics.

The opening of the booster pump outlet valve 45 is controlled based on the measured data from either one of the concentrated seawater flow meter 37 and the seawater bypass flow meter 44. If only the turbine 14 is controlled by the turbine inlet valve 47, then the booster pump outlet valve 45 may be eliminated.

Power Recovery Outlet Valve 41:

In order to set the operational speed of the pistons of the power recovery chambers 21 in their stroke for drawing in the seawater, the power recovery outlet valve 41 may be provided in the discharge line of the control valve 20. The opening of the power recovery outlet valve 41 is adjusted to control the flow rate of the fluid as the fluid flows into and out of the power recovery chambers 21, thereby determining the operational speed of the pistons of the power recovery chambers 21.

If the high-pressure pump outlet valve 35, the turbine inlet valve 47, the booster pump outlet valve 45, and the power recovery outlet valve 41 comprise motor-operated valves whose opening can be remotely controlled electrically, then the control circuit can automatically control the opening of these valves based on various sensor signals. Even if the amount of seawater processed by the reverse osmosis membrane 10 undergoes seasonal variations, the flow rate of the fluid supplied to the power recovery system is automatically controlled by the booster pump 17 for the seawater desalination system to produce a desired amount of desalinated water with maximum efficiency at all times.

The control system shown in FIG. 16 also includes a membrane inlet pressure gage 49, a concentrated seawater membrane outlet pressure gage 50, a membrane differential pressure gage 51, a high-pressure pump suction pressure gage 52, a high-pressure pump discharge pressure gage 53, a booster pump suction pressure gage 54, and a booster pump discharge pressure gage 55.

Method of Operating the Power Recovery System:

A method of operating the power recovery system from shutdown until desalinated water production will be described below. The method of operating the power recovery system includes (1) a supply seawater circulating process in preparation for desalinated water production, (2) a storage liquid expelling process in preparation for desalinated water production, (3) a high-pressure pump activating process in preparation for desalinated water production, (4) a control starting process in preparation for desalinated water production, and (5) a desalinated water production starting process, which will successively be described below.

Figure 17:
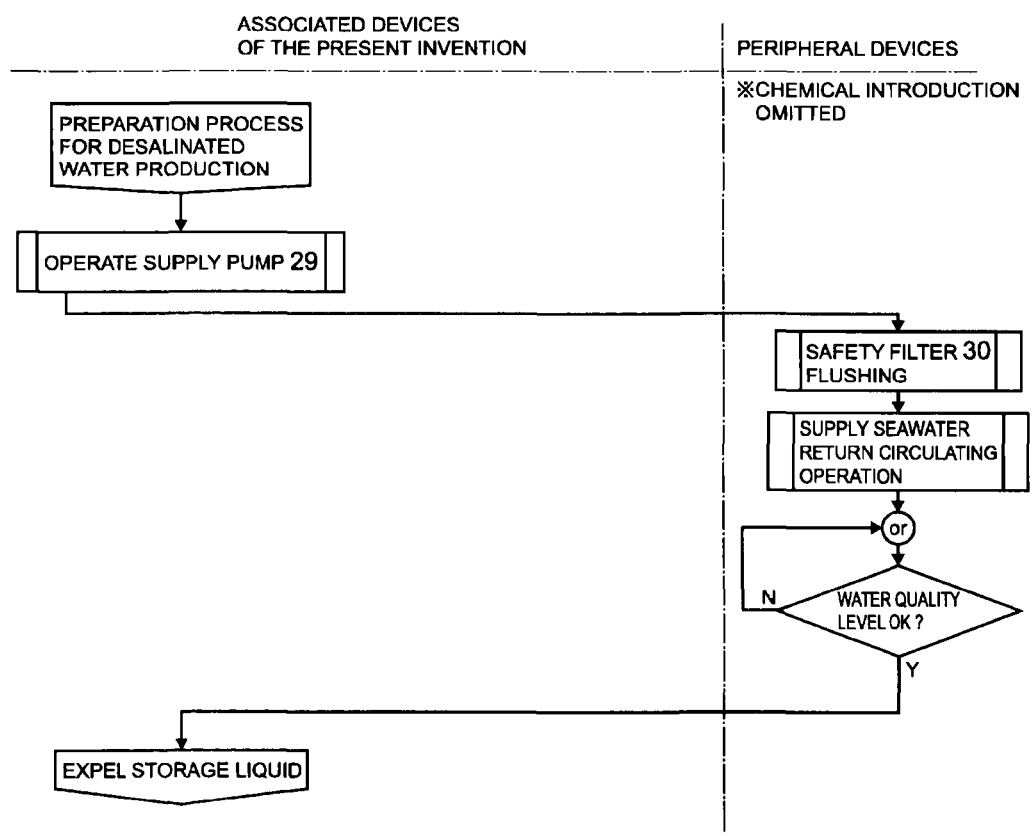
FIG. 17 is a flowchart of a supply seawater circulating process of the power recovery system in preparation for desalinated water production.

(1) Supply Seawater Circulating Process in Preparation for Desalinated Water Production:

FIG. 17 is a flowchart of a supply seawater circulating process in preparation for desalinated water production.

For keeping the reverse osmosis membrane 10 in a good condition for high operational efficiency, it is necessary to perform an operational process for purifying the intake seawater to a sufficiently high water quality level before the high-pressure pump 5 forces the seawater to pass through the reverse osmosis membrane 10. In this operational process, the supply pump 29 forces the intake seawater under a low pressure through the safety filter 30 to finally filter out scales, and the descaled seawater is returned to a suction tank of the supply pump 29. When the seawater is supplied through the safety filter 30 to the high-pressure pump 5, it suffers a pressure loss caused by the safety filter 30. Therefore, the supply pump 29 serves to provide a suitable suction pressure required for the high-pressure pump 5 to operate.

Figure 18:
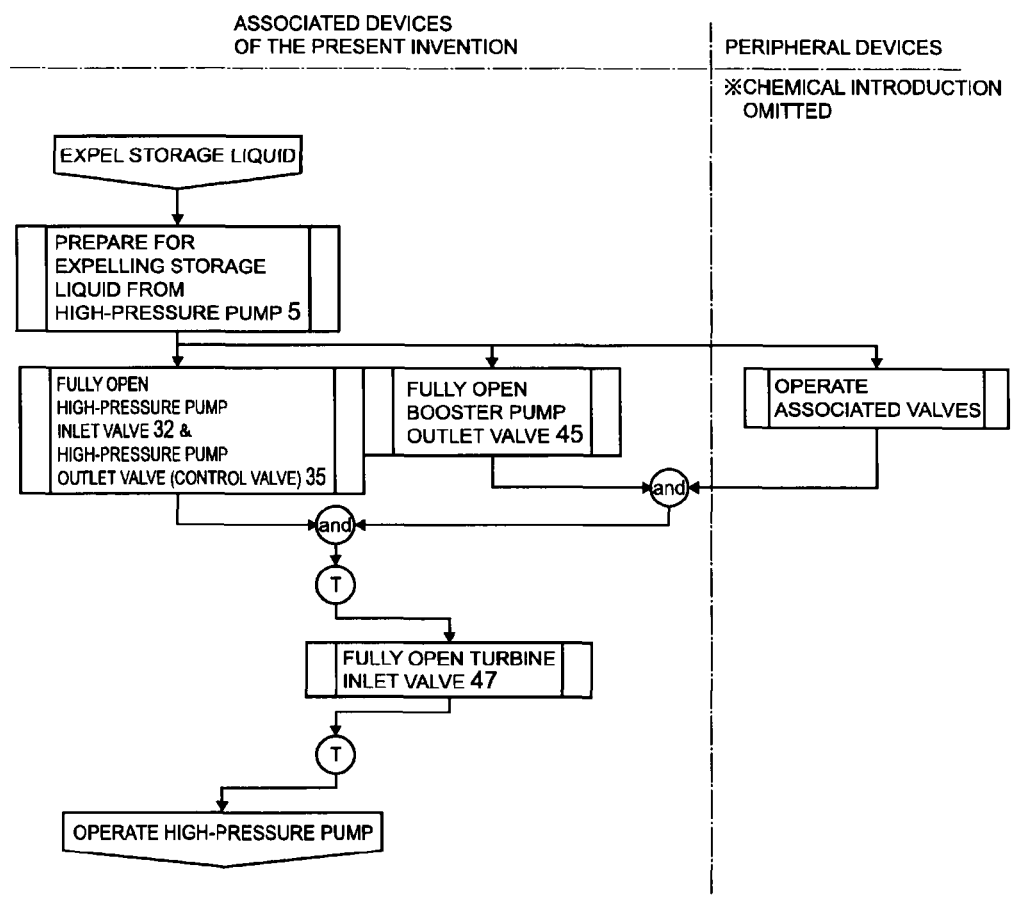
FIG. 18 is a flowchart of a storage liquid expelling process of the power recovery system in preparation for desalinated water production.

(2) Storage Liquid Expelling Process in Preparation for Desalinated Water Production:

FIG. 18 is a flowchart of a storage liquid expelling process in preparation for desalinated water production.

When the reverse osmosis membrane 10 has stopped producing desalinated water, the reverse osmosis membrane 10 is impregnated with a dedicated storage liquid to store itself in a good condition. In addition, the reverse osmosis membrane 10 may be cleaned periodically or when its condition becomes poor.

When the reverse osmosis membrane 10 is to start producing desalinated water, it is necessary to perform a storage liquid expelling process for expelling the storage liquid from the reverse osmosis membrane 10 and replacing the storage liquid with the seawater. In the storage liquid expelling process, it is necessary to operate an entire fluid transport system, i.e., the high-pressure pump outlet valve (control valve) 35, the power recovery outlet valve 41, the booster pump outlet valve 45, and the turbine inlet valve 47 and also associated valves for forcing the seawater to seep into the reverse osmosis membrane 10 and to pass through the high-pressure pump 5, the positive-displacement piston pump 23, and the power recovery pump turbine 18 while expelling the storage liquid. The associated valves serve as various peripheral devices required to operate the seawater desalination plant, i.e., to discharge unwanted water when the power recovery system is activated or shut down, circulate the seawater until it reaches a certain water quality level, and clean the reverse osmosis membrane 10. For example, the associated valves include a concentrated seawater drain valve, a desalinated water return valve, a storage liquid discharge valve, a storage liquid shock treatment/concentrated seawater discharge valve.

When the storage liquid is expelled from the high-pressure pump 5, the positive-displacement piston pump 23, and the power recovery pump turbine 18, they cause large pressure losses. For replacing the storage liquid with the seawater solely under the discharge pressure from the supply pump 29, it is necessary to set a sufficient period of time for efficiently changing fluid passages and replacing the storage liquid in view of the pressure losses caused by the high-pressure pump 5, the positive-displacement piston pump 23, and the power recovery pump turbine 18. Before the storage liquid starts to be expelled, accessories for the pressure pump 5 need to be operated in a preparatory action to protect the bearings of the high-pressure pump 5 because the bearings tend to rotate when the seawater passes through the high-pressure pump 5.

Since the high-pressure pump 5 itself is not operated in the storage liquid expelling process, the pressure in the reverse osmosis membrane cartridge 8 is lower than the reverse osmosis pressure, and no seawater passes through the reverse osmosis membrane 10.

Figure 19:
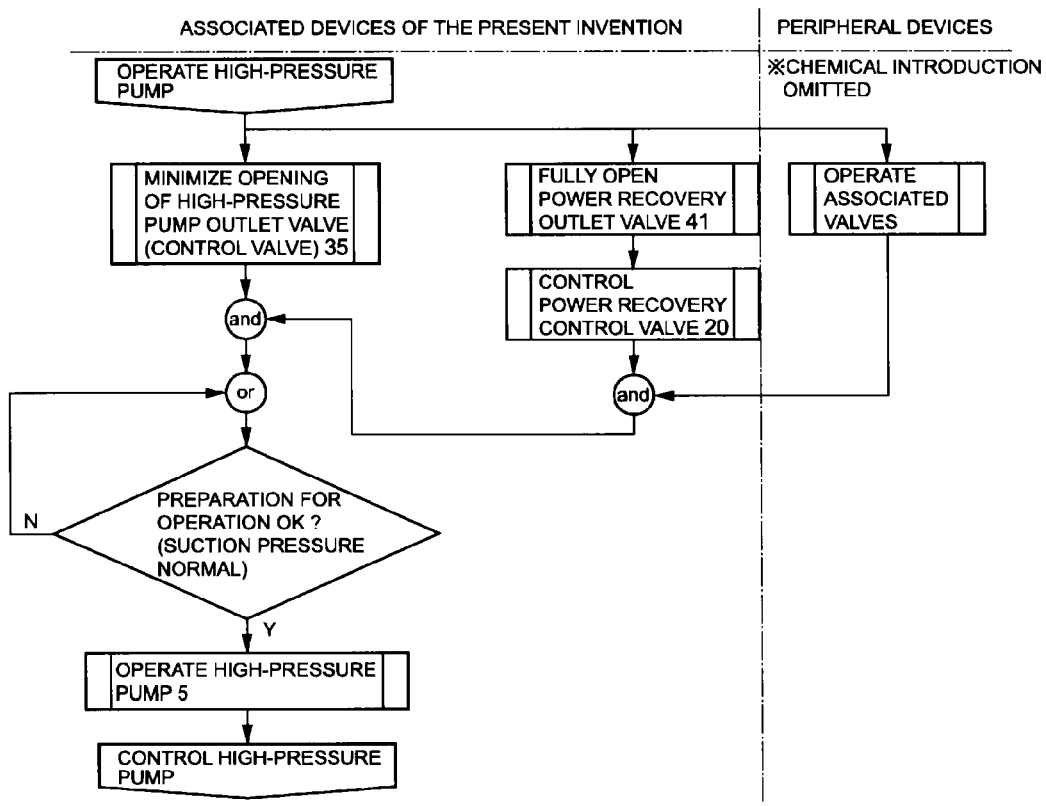
FIG. 19 is a flowchart of a high-pressure pump activating process of the power recovery system in preparation for desalinated water production.

(3) High-pressure Pump Activating Process in Preparation for Desalinated Water Production:

FIG. 19 is a flowchart of a high-pressure pump activating process in preparation for desalinated water production.

After the storage liquid expelling process is finished, the high-pressure pump 5 starts to operate. Generally, when a pump is operated in a no-discharge mode with its outlet passage closed, all the energy loss is converted into a temperature rise of the fluid in the pump. Therefore, the no-discharge mode of the pump should be allowed only for a short period of time. However, since the high-pressure pump 5 has a high pump head, its temperature rise is high, and thus the high-pressure pump 5 should not be allowed to operate in the no-discharge mode basically. The high-pressure pump 5 has to be activated with its outlet passage remaining open at a pressure loss of the fluid transport system which can achieve a minimum required flow rate for the high-pressure pump 5. A minimum opening (intermediate opening 1) of the high-pressure pump outlet valve 35 is set to cause the above-mentioned pressure loss or higher, and the high-pressure pump 5 is activated with the high-pressure pump outlet valve 35 being of the minimum opening. If the control valve 20, which is an actuating device for transmitting the fluid power in the positive-displacement piston pump 23, has to be operated under a certain pressure for lubrication, then the power recovery chambers 21 cannot be operated at a pressure lower than the certain pressure. When the high-pressure pump 5 is activated, the turbine inlet valve 47 is fully closed to prevent the turbine 14 from actuating the booster pump 17.

If the suction pressure of the high-pressure pump 5 is a pressure required for its operation, then the high-pressure pump 5 is activated. When the high-pressure pump 5 is activated, the supply seawater whose pressure is lowered by the high-pressure pump outlet valve (control valve) 35 having a prescribed opening (intermediate opening 2) slightly passes through the reverse osmosis membrane 10 and flows out as the desalinated water 12. Until the desired water quality level is reached, the seawater is returned to the suction tank of the supply pump 29. If it is necessary to achieve safety, prevent cavitation, and shut off the line completely with a dual restriction valve assembly for the protection of the reverse osmosis membrane 10, then two control valves may be provided, one for cutting off the seawater when the power recovery system is activated or shut down and one for controlling the flow rate of the seawater while the power recovery system is in operation.

Figure 20:
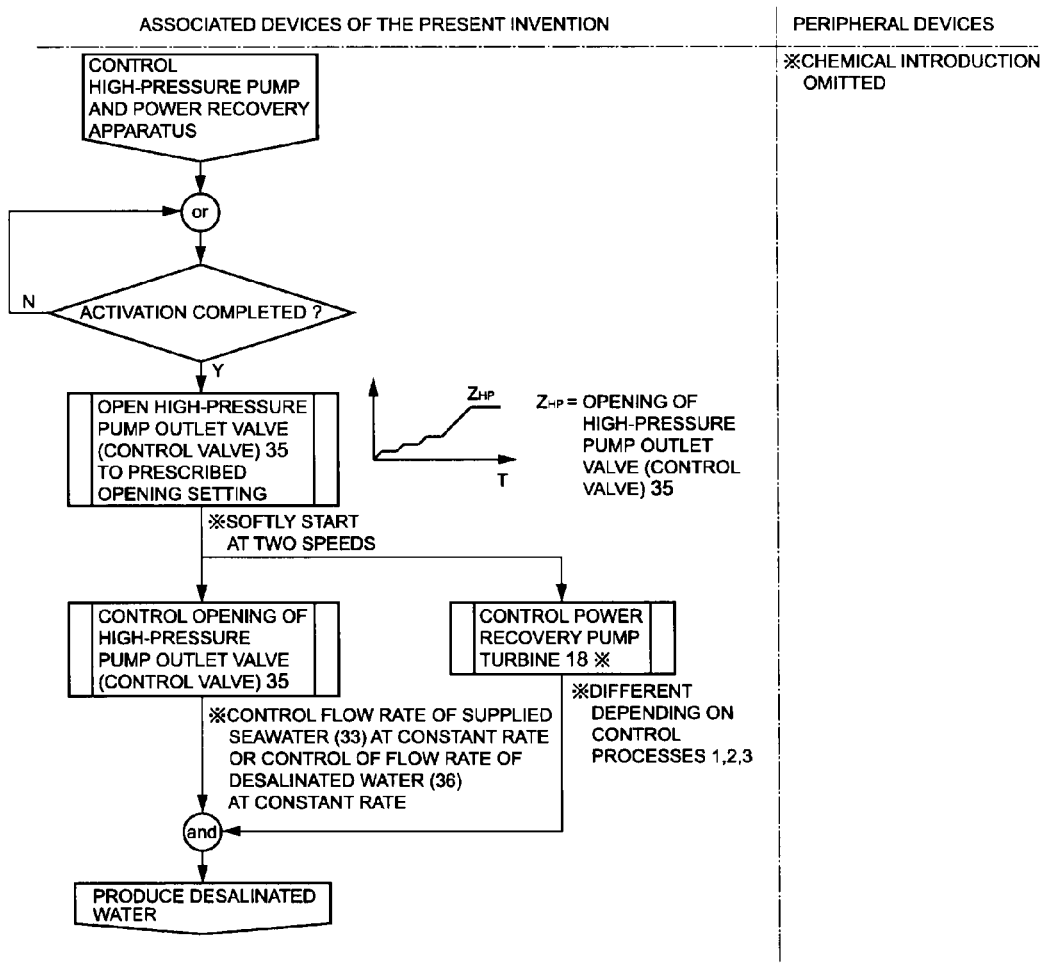
FIG. 20 is a flowchart of a control starting process of the power recovery system in preparation for desalinated water production.

(4) Control Starting Process in Preparation for Desalinated Water Production:

FIG. 20 is a flowchart of a control starting process in preparation for desalinated water production.

After the high-pressure pump 5 is activated, the high-pressure pump outlet valve (control valve) 35 is opened stepwise until it is fully opened (2-speed operation) in order to gradually supply the seawater so that the reverse osmosis membrane 10 is subject to no abrupt pressure variations. If the control valve 20, which is an actuating device for transmitting the fluid power in the positive-displacement piston pump 23, has to be operated under a certain pressure for lubrication, then the power recovery chambers 21 cannot be operated at a pressure lower than the certain pressure. In this case, when the high-pressure pump 5 is activated, the turbine inlet valve 47 is fully closed to prevent the turbine 14 from actuating the booster pump 17. The pressure of the concentrated seawater in the concentrated seawater line 13 gradually increases to a pressure level required to activate the control valve 20 of the positive-displacement piston pump 23. The concentrated seawater line 13 remains closed, thereby allowing the supply seawater to pass in its entirety through the reverse osmosis membrane 10 and flow out as the desalinated water 12. The high-pressure pump outlet valve 35 is kept at a certain prescribed opening to prevent an excessive pressure from being applied to the reverse osmosis membrane 10.

Instead of controlling the flow rate of the high-pressure pump 5 by controlling the opening of the high-pressure pump outlet valve 35, the flow rate of the high-pressure pump 5 may be controlled by controlling the rotational speed of the electric motor 6 with a high-pressure pump rotational speed controller 34.

If the flow rate of the high-pressure pump 5 is controlled by not only the high-pressure pump outlet valve 35, but also the high-pressure pump rotational speed controller 34 for varying the flow rate under the same temperature condition (and also for varying the water recovery rate), then the power recovery system is capable of efficiently operating with reduced operational power and is also capable of starting the high-pressure pump 5 softly (i.e. soft start) with the high-pressure pump rotational speed controller 34 for reducing damage to the reverse osmosis membrane 10.

At the same time that the high-pressure pump 5 starts to be controlled, the positive-displacement piston pump 23 starts to be controlled. If the control valve 20, which is an actuating device for transmitting the fluid power in the positive-displacement piston pump 23, has to be operated under a certain pressure for lubrication, then the power recovery chambers 21 cannot be operated at a pressure lower than the certain pressure. In this case, the control valve 20 of the positive-displacement piston pump 23 starts being activated after the pressure required to activate the control valve 20 of the positive-displacement piston pump 23 is reached. When the control valve 20 is actuated, the pressure in the supply seawater bypass boost line 24 is increased by the power recovery chambers 21. Simultaneously, the power recovery pump turbine 18 starts being controlled to gradually increase the flow rate through the concentrated seawater line 13 until the concentrated seawater flows at a predetermined flow rate, and the flow rate of the high-pressure pump 5 starts being controlled to achieve a predetermined supply seawater flow rate measured by the supply seawater flow meter 33 and a predetermined desalinated water flow rate measured by the desalinated water flow meter 36.

Figure 21:
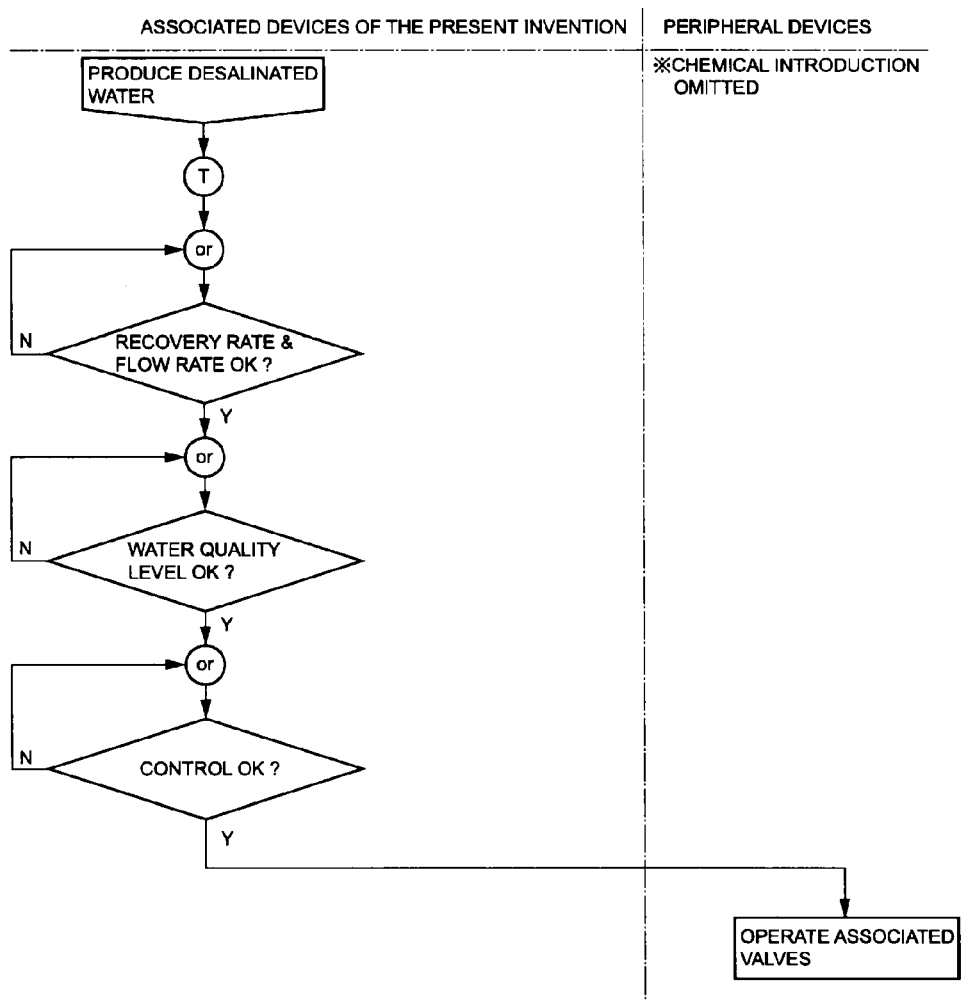
FIG. 21 is a flowchart of a desalinated water production starting process of the power recovery system.

(5) Desalinated Water Production Starting Process:

FIG. 21 is a flowchart of a desalinated water production starting process.

When the desired water quality level is reached after the seawater is circulated to the suction tank of the supply pump 29, the associated valves are operated to deliver desalinated water 12 from the reverse osmosis membrane cartridge 8 to a desalinated water tank. The high-pressure pump 5 can be controlled for its flow rate by the supply seawater flow meter 33 or the desalinated water flow meter 36.

Power Recovery Control Processes:

Three power recovery control processes for controlling the power recovery system will be described below.

1) Control Process 1:

According to control process 1, only the turbine 14 is controlled.

Figure 22:
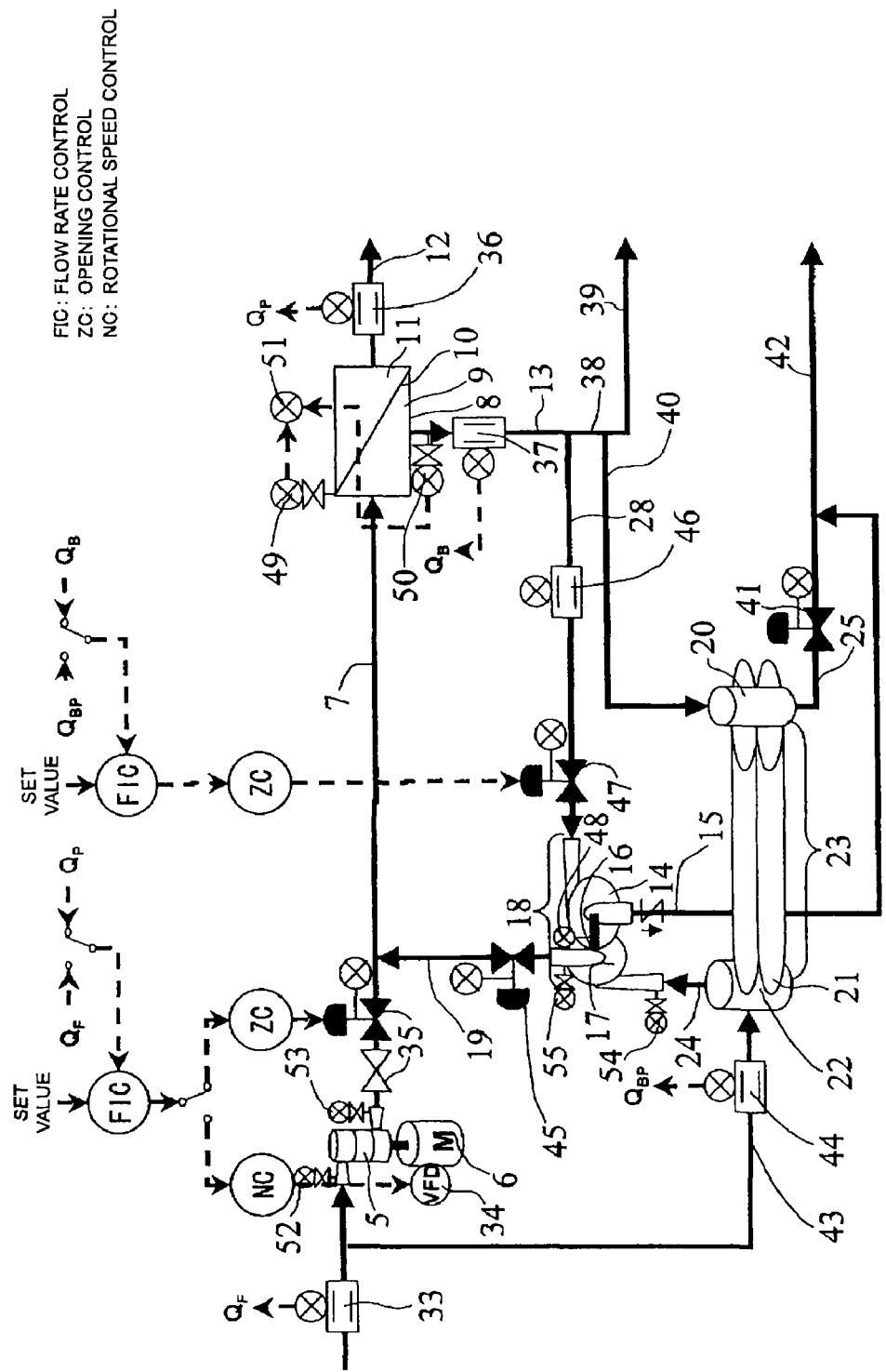
FIG. 22 is a diagram illustrative of a process of controlling only a turbine of the power recovery system.

FIG. 22 is a diagram illustrative of a process of controlling only the turbine 14. FIG. 22 shows primary components of the power recovery system. According to the control process 1, the turbine 14 is controlled for its flow rate by the turbine inlet valve 47 based on its opening adjustment to control the flow rate through the supply seawater bypass line 43, thereby providing the axial power of an operating point of the booster pump 17.

Specific details of control process 1 will be described below.

(1) The turbine inlet valve 47 controls the flow rate based on the flow rates measured by the concentrated seawater flow meter 37 or the supply seawater bypass flow meter 44.

(2) If the turbine inlet valve 47 controls the flow rate based on the flow rate measured by the concentrated seawater flow meter 37, then a flow rate control target value for the flow rate of the concentrated seawater can clearly be set by setting a flow rate of the desalinated water and a water recovery rate.

(3) If the turbine inlet valve 47 controls the flow rate based on the flow rate measured by the supply seawater bypass flow meter 44, then since the flow rate measured by the supply seawater bypass flow meter 44 is substantially the same as the power recovery flow rate which is calculated by subtracting the flow rate measured by the turbine inlet flow meter 46 from the flow rate measured by the concentrated seawater flow meter 37, and a target value for the turbine flow rate necessary for keeping a required output level is indefinite according to the operating point of the booster pump 17, a target value for the flow rate measured by the supply seawater bypass flow meter 44 cannot be determined. However, because the turbine flow rate is very small compared with the flow rate measured by the supply seawater bypass flow meter 44, which is substantially the same as the power recovery flow rate, the flow rate target value is determined by providing a deviation of the measured flow rate from the set value for the concentrated seawater flow meter 37.

(4) If the turbine inlet valve 47 controls the flow rate based on the flow rate measured by the supply seawater bypass flow meter 44, then a clear target value for the flow rate based on the flow rate measured by the supply seawater bypass flow meter 44 may be determined by calculating a required turbine flow rate from the characteristics of the booster pump 17 and the characteristics of the turbine 14.

(5) In addition to softly starting the high-pressure pump 5 with the high-pressure pump rotational speed controller 34 and controlling the flow rate through the high-pressure pump 5 with the high-pressure pump outlet valve 35, the high-pressure pump 5 is controlled for the flow rate by the high-pressure pump rotational speed controller 34.

(6) If only the turbine inlet valve 47 is controlled, then the booster pump outlet valve 45 may be eliminated. If the booster pump outlet valve 45 is installed, then the flow rate through the turbine inlet valve 47 starts being controlled and is gradually increased after the booster pump outlet valve 45 is opened in order to avoid operation of the turbine inlet valve 47 to an excessive opening under turbine control while no water is being delivered through the supply seawater bypass line 43.

2) Control Process 2:

According to control process 2, both the booster pump 17 and the turbine 14 are controlled.

Figure 23:
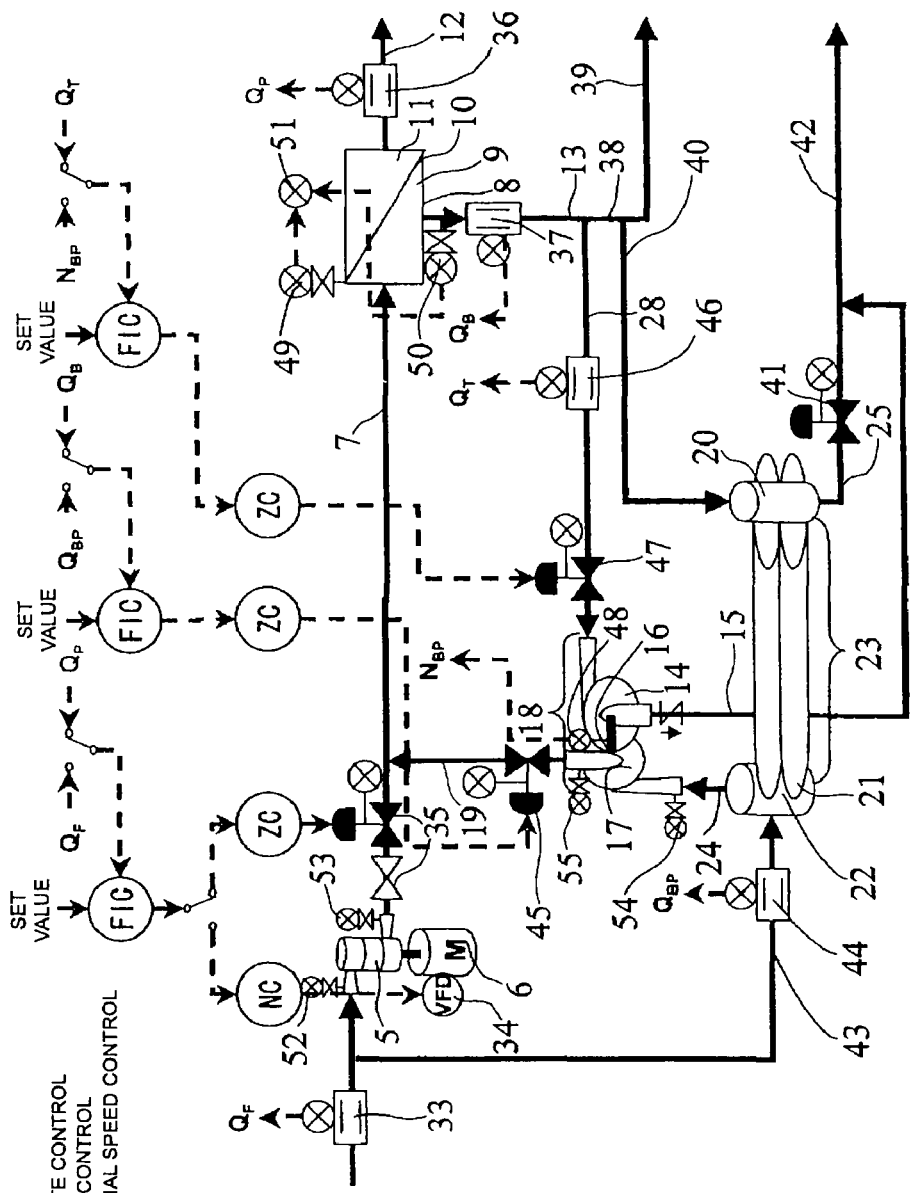
FIG. 23 is a diagram illustrative of a process of controlling both a booster pump and a turbine of the power recovery system.

FIG. 23 is a diagram illustrative of a process of controlling both the booster pump 17 and the turbine 14. FIG. 23 shows primary components of the power recovery system.

According to the control process 2, the power recovery pump turbine 18 is operated efficiently in a limited performance range. In order to suppress the Q (quantity)-H (head) characteristics of the booster pump 17, the booster pump 17 is operated (a) at a fixed rotational speed (constant turbine rotational speed control), or (b) in a certain characteristic range at a fixed flow rate of the turbine 14 (constant turbine flow rate control).

Specific details of control process 2 will be described below.

(1) Before the booster pump 17 is controlled, the turbine 14 starts being controlled to make itself ready for load variations of the booster pump 17. The booster pump outlet valve 45 of the booster pump 17 adjusts its opening to control the flow rate through the supply seawater bypass line 43 based on the flow rate measured by the supply seawater bypass flow meter 44 or the concentrated seawater flow meter 37.

(2) If the booster pump outlet valve 45 controls the flow rate based on the flow rate measured by the supply seawater bypass flow meter 44, then since the flow rate measured by the supply seawater bypass flow meter 44 is substantially the same as the power recovery flow rate which is calculated by subtracting the flow rate measured by the turbine inlet flow meter 46 from the flow rate measured by the concentrated seawater flow meter 37, the flow rate measured by the supply seawater bypass flow meter 44, which is substantially the same as the power recovery flow rate, is controlled so as to be equal to a flow rate which is calculated by subtracting the flow rate measured by the turbine inlet flow meter 46 from a target value of the concentrated seawater flow rate.

(3) The turbine inlet valve 47 may be controlled by a governor control method in which the rotational speed of the power recovery pump turbine 18 is controlled so as to be essentially constant based on the rotational speed measured by the rotational speed meter 48, or a method in which the flow rate of the turbine 14 is controlled so as to be essentially constant based on the flow rate measured by the turbine inlet flow meter 46.

(4) In addition to softly starting the high-pressure pump 5 with the high-pressure pump rotational speed controller 34 and controlling the flow rate of the high-pressure pump 5 with the high-pressure pump outlet valve (control value) 35, the high-pressure pump 5 is controlled for the flow rate by the high-pressure pump rotational speed controller 34.

3) Control Process 3:

According to control process 3, both the booster pump 17 and the turbine 14 are controlled.

Figure 24:
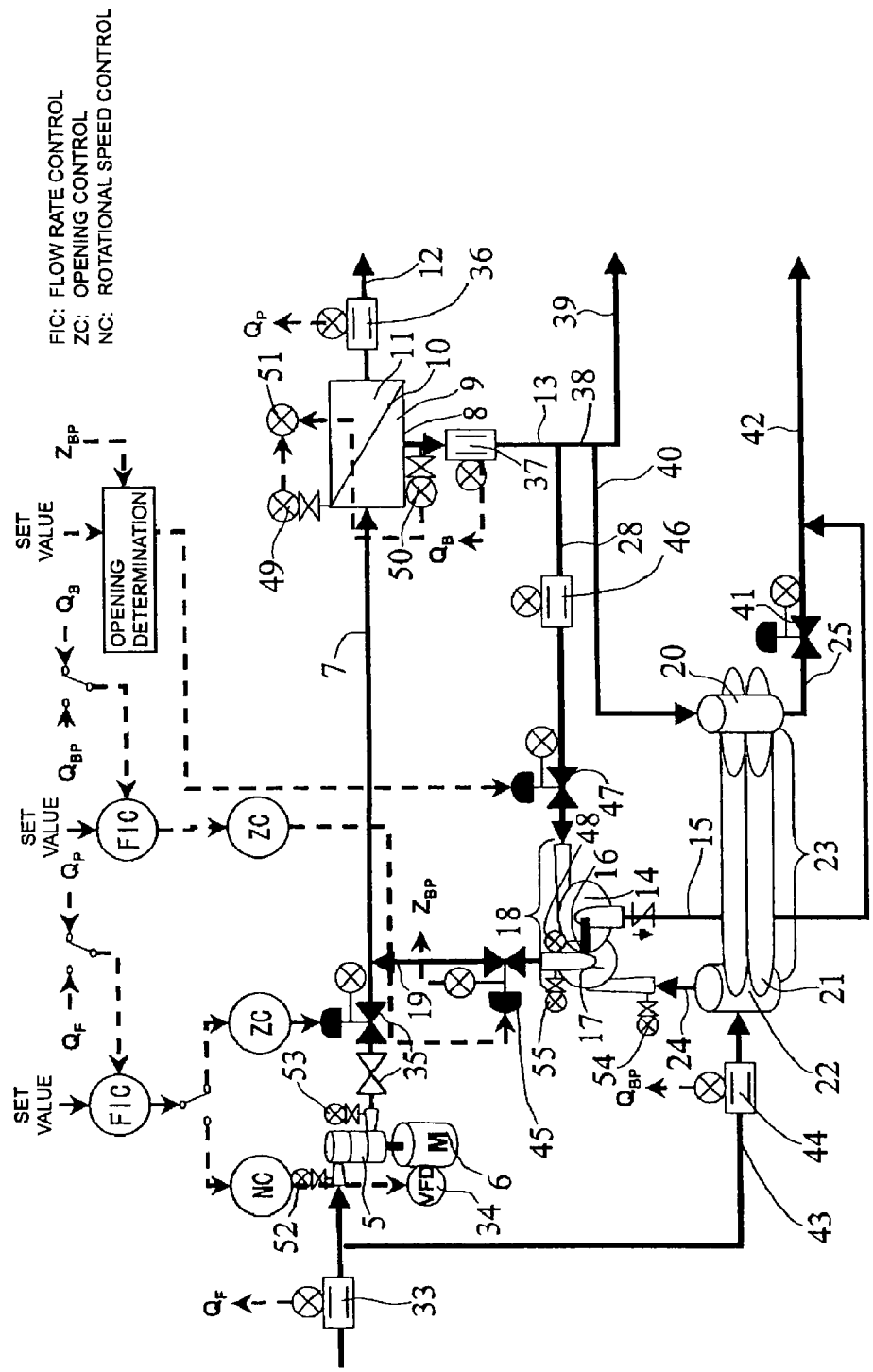
FIG. 24 is a diagram illustrative of a process of controlling both a booster pump and a turbine of the power recovery system.
Figure 25:
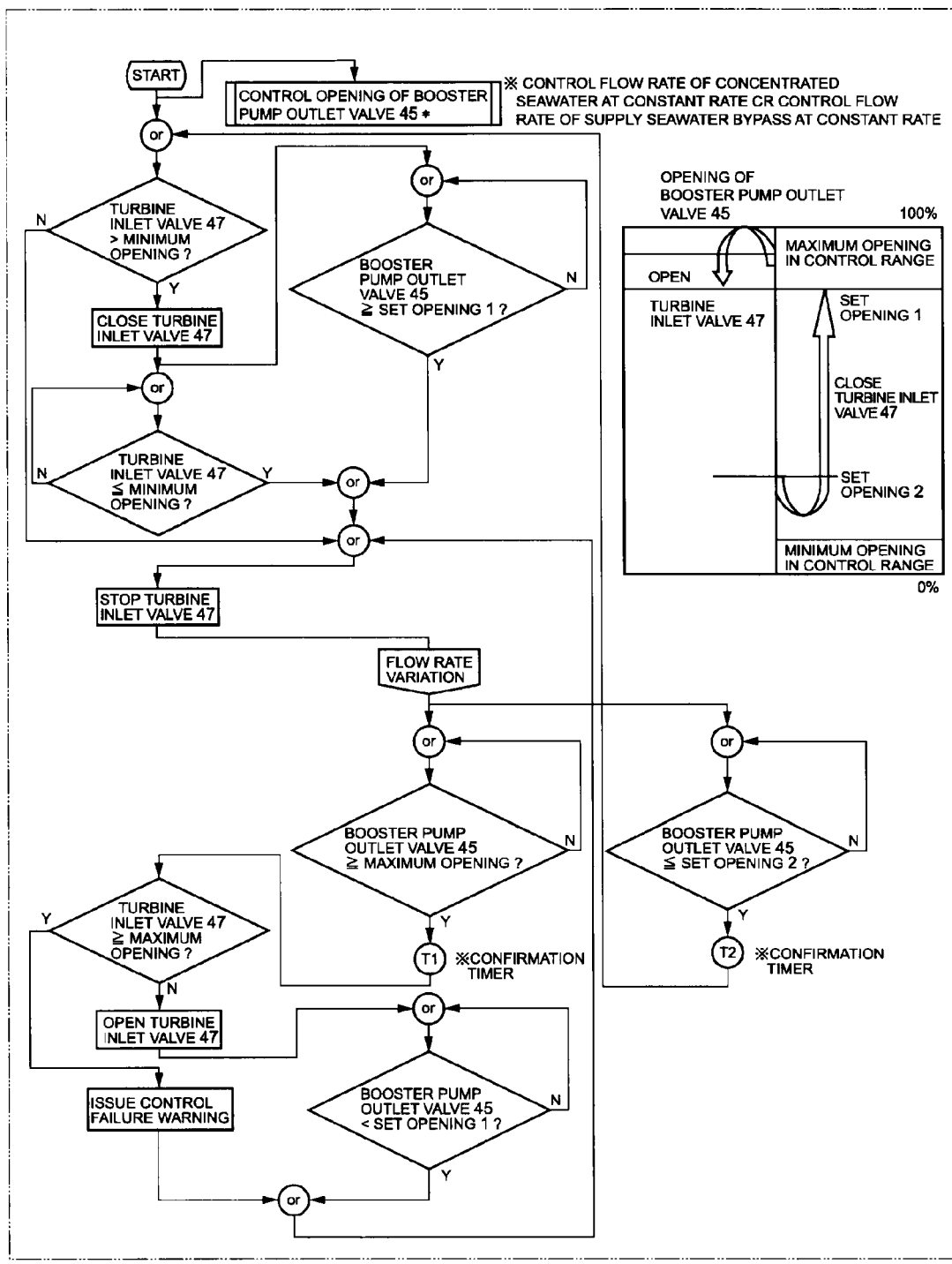
FIG. 25 is a flowchart of the process of controlling both a booster pump and a turbine of the power recovery system.
Figure 26:
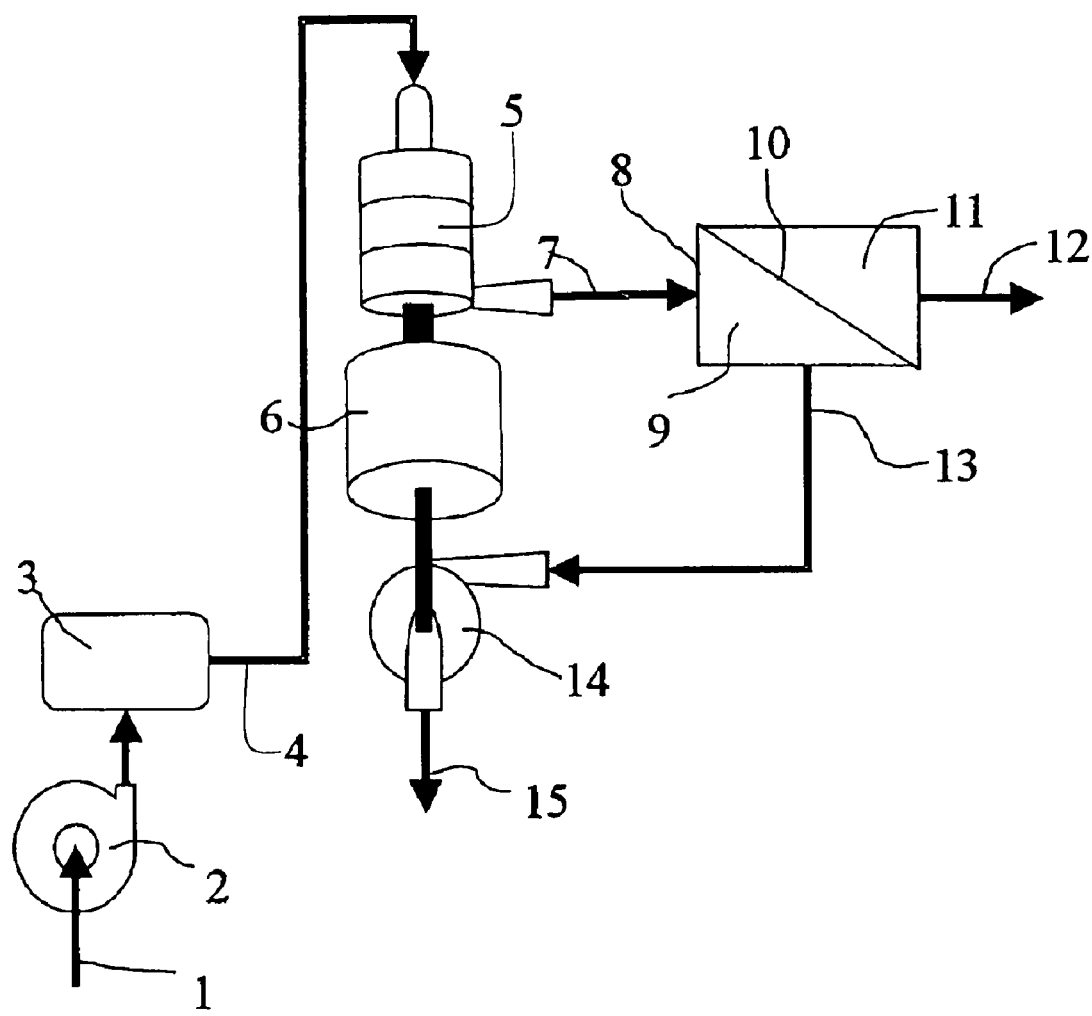
FIG. 26 is a schematic diagram of a power recovery system according to Related art A.
Figure 27:
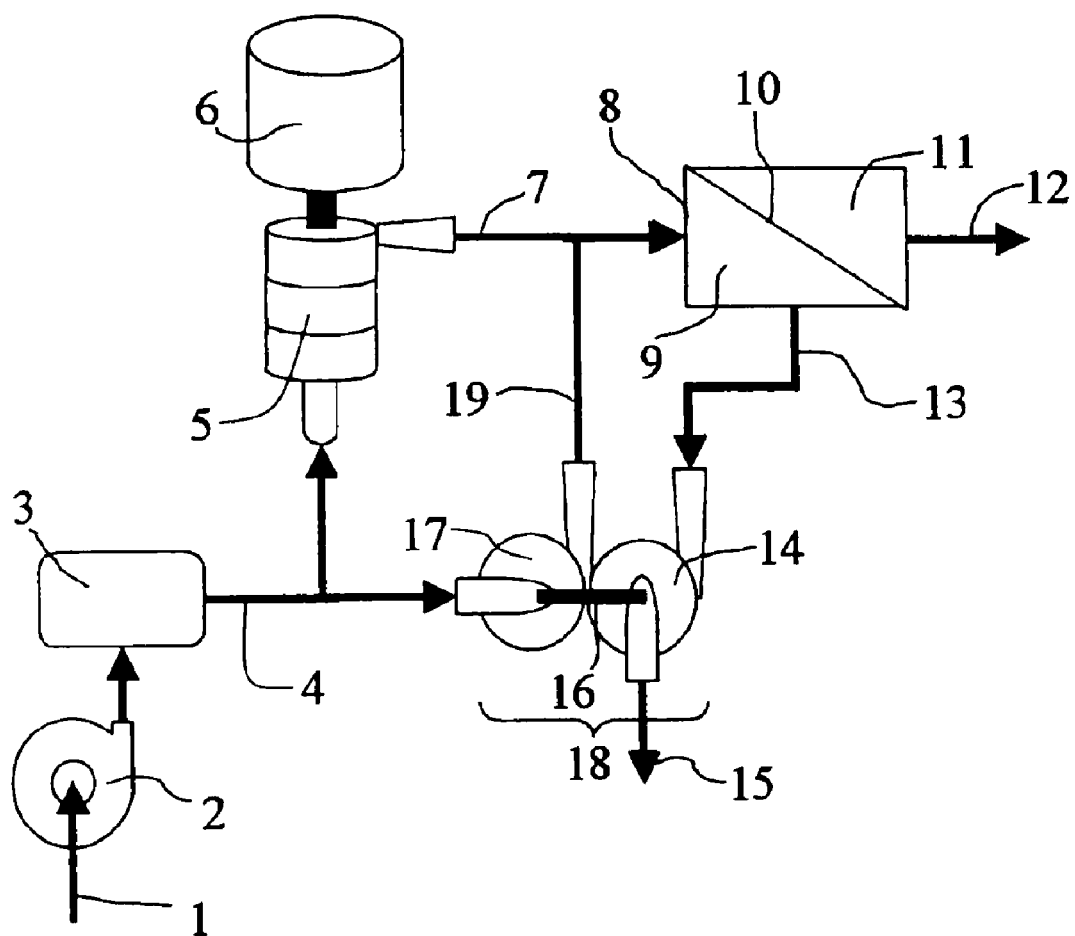
FIG. 27 is a schematic diagram of a power recovery system according to Related art B.
Figure 28:
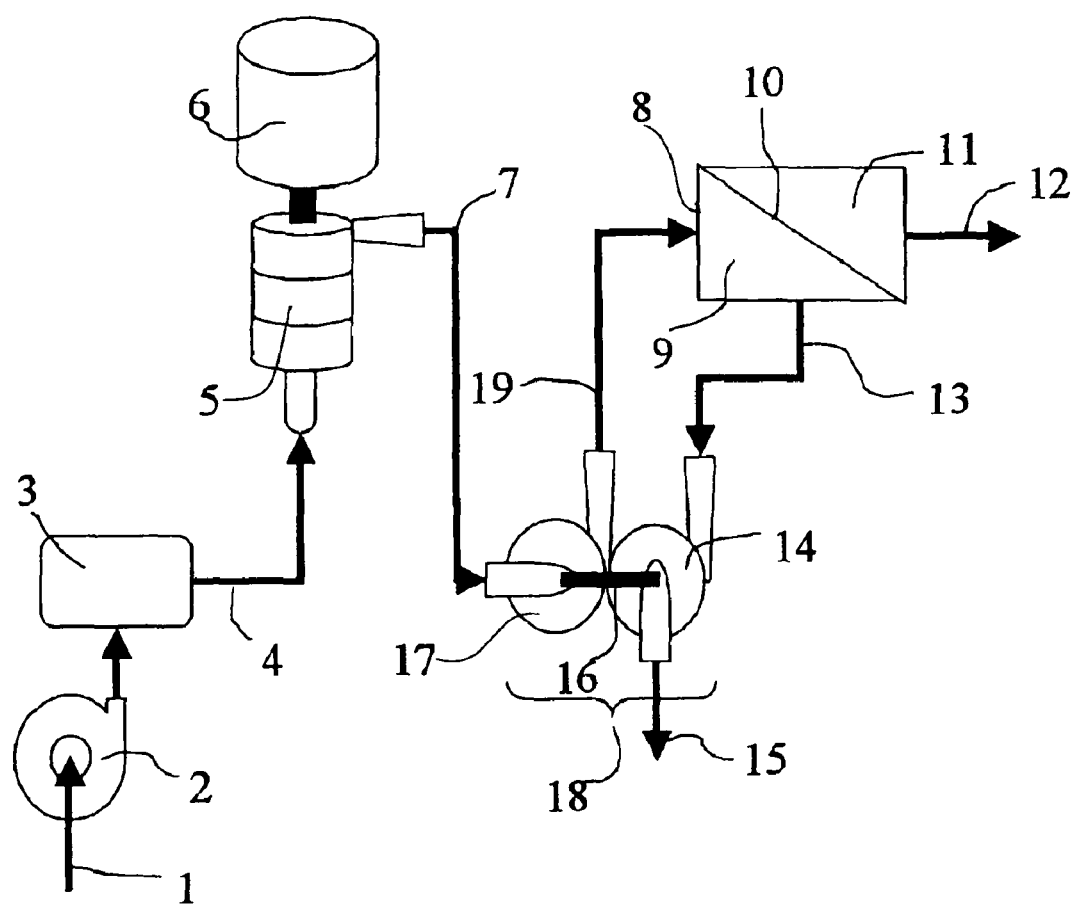
FIG. 28 is a schematic diagram of a power recovery system according to Related art C.
Figure 29:
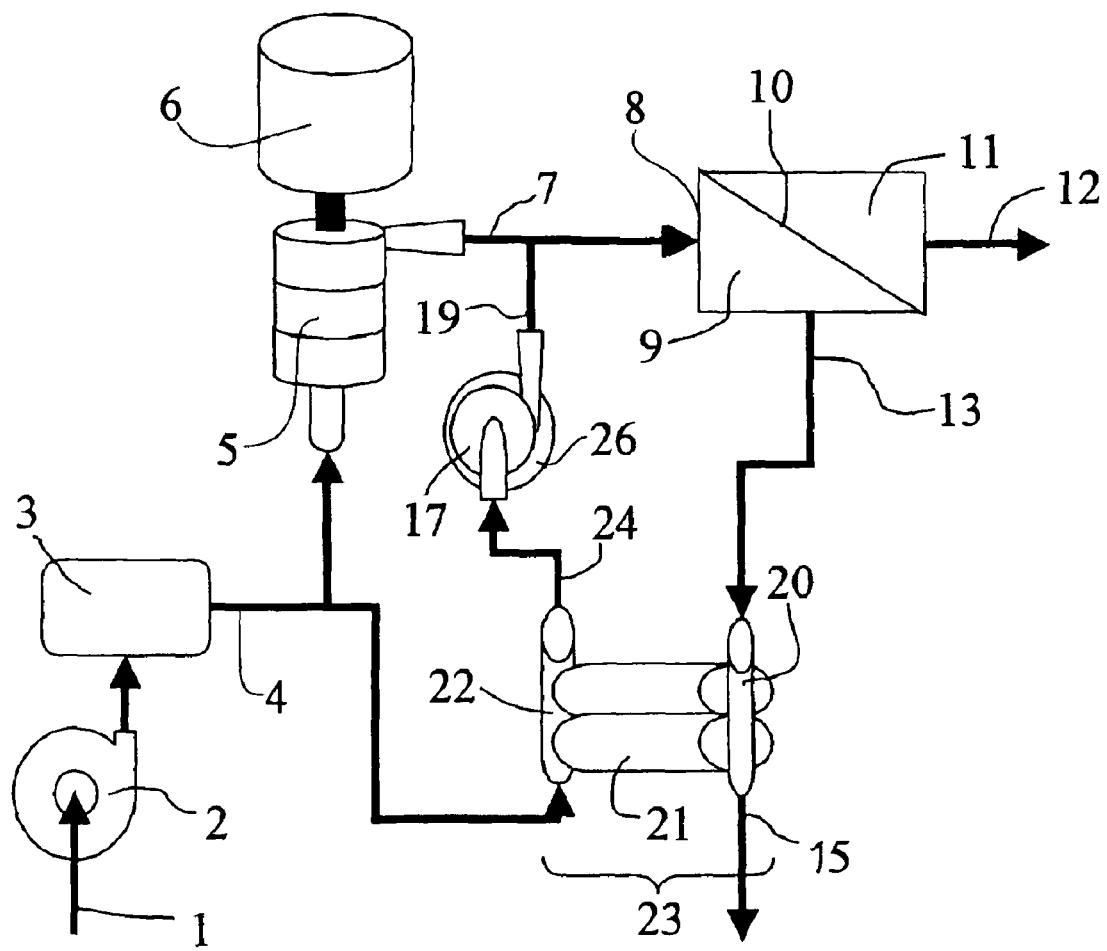
FIG. 29 is a schematic diagram of a power recovery system according to Related art D.

FIG. 24 is a diagram illustrative of a process of controlling both the booster pump 17 and the turbine 14. FIG. 25 is a flowchart of the process of controlling both the booster pump 17 and the turbine 14.

According to the control process 3, only the booster pump outlet valve 45 is controlled based on the process situation, i.e., the measured flow rate, and the turbine inlet valve 47 is controlled based on the opening of the booster pump outlet valve 45 in order to minimize the turbine flow rate.

Specific details of control process 3 will be described below.

(1) The booster pump outlet valve 45 of the booster pump 17 adjusts its opening to control the flow rate through the supply seawater bypass line 43 based on the flow rate measured by the supply seawater bypass flow meter 44 or the concentrated seawater flow meter 37.

(2) If the turbine inlet valve 47 controls the flow rate based on the flow rate measured by the supply seawater bypass flow meter 44, then since the flow rate measured by the supply seawater bypass flow meter 44 is substantially the same as the power recovery flow rate which is calculated by subtracting the flow rate measured by the turbine inlet flow meter 46 from the flow rate measured by the concentrated seawater flow meter 37, and a target value for the turbine flow rate necessary for keeping a required output level is indefinite according to the operating point of the booster pump 17, a target value for the flow rate measured by the supply seawater bypass flow meter 44 cannot be determined. However, because the turbine flow rate is very small compared with the flow rate measured by the supply seawater bypass flow meter 44, which is substantially the same as the power recovery flow rate, the flow rate target value is determined by providing a deviation of the measured flow rate from the set value for the concentrated seawater flow meter 37.

(3) If the turbine inlet valve 47 controls the flow rate based on the flow rate measured by the supply seawater bypass flow meter 44, then a clear target value for the flow rate based on the flow rate measured by the supply seawater bypass flow meter 44 may be determined by calculating a required turbine flow rate from the characteristics of the booster pump 17 and the characteristics of the turbine 14.

(4) When the opening of the booster pump outlet valve 45 is reduced, the flow rate required for the performance of the booster pump 17 is considered to be reduced. Therefore, the output from the turbine 14 is reduced in order to reduce the performance of the booster pump 17. In other words, the opening of the turbine inlet valve 47 is reduced to reduce the flow rate of the turbine 14. When the opening of the booster pump outlet valve 45 is increased, the performance of the booster pump 17 is considered to fail to catch up. Therefore, the output from the turbine 14 is increased in order to increase the performance of the booster pump 17. In other words, the opening of the turbine inlet valve 47 is increased to increase the flow rate of the turbine 14.

(5) In addition to softly starting the high-pressure pump 5 with the high-pressure pump rotational speed controller 34 and controlling the flow rate of the high-pressure pump 5 with the high-pressure pump outlet valve 35, the high-pressure pump 5 is controlled for the flow rate by the high-pressure pump rotational speed controller 34.

Although certain preferred embodiments of the present invention have been shown and described in detail, it should be understood that various changes and modifications may be made therein without departing from the scope of the appended claims.

What is claimed is:

1. A power recovery system comprising:
a high-pressure pump for pressuring raw water;
a reverse osmosis membrane cartridge for treating high-pressure water discharged from said high-pressure pump with a reverse osmosis membrane to produce treated water;
a positive-displacement piston pump for pressuring raw water under the pressure of concentrated water which is discharged from said reverse osmosis membrane cartridge without being treated by said reverse osmosis membrane; and
a pump turbine comprising a turbine and a booster pump coupled through a rotational shaft for boosting the pressurized raw water discharged from said positive-displacement piston pump by actuating said turbine with a portion of the concentrated water discharged from said reverse osmosis membrane cartridge and driving said booster pump and for adding the boosted water discharged from said booster pump to the high-pressure water discharged from said high-pressure pump.

2. A power recovery system according to claim 1, further comprising:
an intake pump for drawing in the raw water and supplying the raw water to said high-pressure pump and said positive-displacement piston pump.

3. A power recovery system according to claim 1, wherein;
said turbine is connected to a concentrated water branch line branched from a concentrated water line through which said concentrated water discharged from said reverse osmosis membrane cartridge flows; and
said booster pump is connected to a supply water bypass boost line interconnecting said positive-displacement piston pump and a high-pressure line.

4. A power recovery system according to claim 3, further comprising:
a high-pressure pump outlet valve for controlling the flow rate of said high-pressure water discharged from said high-pressure pump;
a turbine inlet valve for controlling the flow rate of the concentrated water which flows into said turbine;
a booster pump outlet valve for controlling the flow rate of boosted water discharged from said booster pump; and
a power recovery output valve for controlling the concentrated water discharged from a control valve of said positive-displacement piston pump.

5. A power recovery system according to claim 2, further comprising:
a supply water flow meter for measuring the flow rate of the raw water supplied from said intake pump;
a treated water flow meter for measuring the flow rate of the treated water discharged from said reverse osmosis membrane cartridge;
a concentrated water flow meter for measuring the flow rate of the concentrated water discharged from said reverse osmosis membrane cartridge;
a supply water bypass flow meter for measuring the flow rate of a portion of the raw water branched from said intake pump and introduced into a switching valve of said positive-displacement piston pump; and
a turbine inlet flow meter for measuring the flow rate of a portion of the concentrated water discharged from said reverse osmosis membrane cartridge.

6. A power recovery system according to claim 1, wherein said positive-displacement piston pump comprises:
a control valve for introducing the concentrated water and changing flow paths for the concentrated water;
a switching valve for selectively drawing and discharging the supplied raw water; and
a power recovery chamber for transmitting the energy of the concentrated water supplied from said control valve to the raw water supplied from said switching valve.

7. A power recovery system according to claim 1,
said turbine comprising a tubular turbine casing having an inlet port and an outlet port, said rotational shaft positioned diametrically centrally in said tubular turbine casing, and a turbine impeller mounted on an end of said rotational shaft; and
said booster pump comprising a tubular booster pump casing having an inlet port and an outlet port, said rotational shaft positioned diametrically centrally in said tubular booster pump casing, and a booster pump impeller mounted on an end of said rotational shaft.

8. A power recovery system according to claim 7, wherein said tubular turbine casing and said tubular booster pump casing are disposed parallel to each other, said rotational shaft extending through said tubular turbine casing and said tubular booster pump casing and being rotatably supported by a support member provided on said tubular turbine casing and said tubular booster pump casing.

9. A power recovery system according to claim 7, wherein said turbine impeller comprises an axial-flow impeller and said booster pump impeller comprises an axial-flow impeller.

10. A power recovery system according to claim 1,
said turbine comprising a turbine casing having an inlet port and an outlet port, said rotational shaft positioned in said turbine casing, and a turbine impeller mounted on an end of said rotational shaft;
said booster pump comprising a booster pump casing having an inlet port and an outlet port, said rotational shaft positioned in said booster pump casing, and a booster pump impeller mounted on an end of said rotational shaft; and
said turbine casing and said booster casing having respective end faces, which are remote from said inlet and outlet ports, held in abutment against and fastened to each other in an axial direction of said rotational shaft, said rotational shaft being rotatably supported by a bearing device disposed between said turbine casing and said booster casing.

11. A power recovery system according to claim 10, wherein said turbine impeller is rotatably supported by a bearing device in said turbine casing.

12. A power recovery system according to claim 10, wherein said turbine impeller comprises a centrifugal impeller and said booster pump impeller comprises a mixed-flow impeller or an axial-flow impeller.

13. A power recovery system according to claim 2, wherein the flow rate of said high-pressure water discharged from said high-pressure pump is controlled by a high-pressure pump outlet valve, a valve opening of said high-pressure pump outlet valve being controlled based on measured data from a treated water flow meter for measuring the flow rate of the treated water or measured data from a supply water flow meter for measuring the flow rate of the raw water discharged from said intake pump.

14. A power recovery system according to claim 1, wherein said booster pump is controlled by controlling a valve opening of a turbine inlet valve for controlling the flow rate of the concentrated water to be introduced into said turbine so that the flow rate of a concentrated water flow meter for measuring the flow rate of the concentrated water discharged from said reverse osmosis membrane cartridge or the flow rate of a supply water bypass flow meter for measuring the flow rate of the raw water to be introduced into a switching valve of said positive-displacement piston pump reaches a target value.

15. A power recovery system according to claim 1, wherein a valve opening of a turbine inlet valve connected to an inlet port of said turbine is controlled so that the rotational speed of said pump turbine or the flow rate of a turbine inlet flow meter for measuring the flow rate of the concentrated water to be introduced into said turbine becomes constant; and
a valve opening of a booster pump outlet valve for controlling the flow rate of the boosted water pressurized by said booster pump is controlled so that the flow rate of a concentrated water flow meter for measuring the flow rate of said concentrated water or the flow rate of a supply water bypass flow meter for measuring the flow rate of the raw water to be introduced into a switching valve of said positive-displacement piston pump reaches a target value.

16. A power recovery system according to claim 1, wherein a valve opening of a booster pump outlet valve for controlling the flow rate of the boosted water pressurized by said booster pump is controlled so that the flow rate of a concentrated water flow meter for measuring the flow rate of said concentrated water discharged from said reverse osmosis membrane cartridge or the flow rate of a supply water bypass flow meter for measuring the flow rate of the raw water to be introduced into a switching valve of said positive-displacement piston pump reaches a target value; and
the operation of a turbine inlet valve for controlling the flow rate of said concentrated water to be introduced into said turbine is controlled in synchronism with the operation of said booster pump outlet valve.

17. A power recovery system according to claim 16, wherein when the valve opening of said booster pump outlet valve is reduced, said turbine inlet valve is instructed to reduce the valve opening thereof, and thereafter when the valve opening of said booster pump outlet valve becomes sufficiently large, the valve opening of said turbine inlet valve is maintained.

18. A power recovery system according to claim 16, wherein when the valve opening of said booster pump outlet valve is increased, said turbine inlet valve is instructed to increase the valve opening thereof, and thereafter when the valve opening of said booster pump outlet valve becomes sufficiently small, the valve opening of said turbine inlet valve is maintained.

19. A power recovery system comprising:
a high-pressure pump for pressuring raw water;
a reverse osmosis membrane cartridge for treating high-pressure water discharged from said high-pressure pump with a reverse osmosis membrane to produce treated water,
a positive-displacement piston pump for pressuring raw water under the pressure of concentrated water which is discharged from said reverse osmosis membrane cartridge without being treated by said reverse osmosis membrane; and
a pump turbine comprising a turbine connected to receive the high-pressure water discharged from said high-pressure pump, and
a booster pump connected to receive the pressurized raw water discharged from said positive-displacement piston pump, the turbine and booster pump being coupled to one another through a rotational shaft, wherein the pressure of the pressurized raw water discharged from said positive-displacement piston pump is boosted by the booster pump of said pump turbine, by actuating said turbine with the high-pressure water discharged from said high-pressure pump and driving said booster pump via said rotational shaft, and for adding the boosted water discharged from said booster pump to the high-pressure water discharged from said high-pressure pump.

20. A power recovery system according to claim 19, further comprising:
an intake pump for drawing in the raw water and supplying the raw water to said high-pressure pump and said positive-displacement piston pump.

21. A power recovery system according to claim 19, wherein
said turbine is connected to a high-pressure line interconnecting said high-pressure pump and said turbine; and
said booster pump is connected to a supply water bypass boost line interconnecting said positive-displacement piston pump and said high-pressure line.

22. A power recovery system according to claim 19, wherein said positive-displacement piston pump comprises:
a control valve for introducing the concentrated water and changing flow paths for the concentrated water;
a switching valve for selectively drawing and discharging the supplied raw water; and a power recovery chamber for transmitting the energy of the concentrated water supplied from said control valve to the raw water supplied from said switching valve.

23. A power recovery system according to claim 19,
said turbine comprising a tubular turbine casing having an inlet port and an outlet port, said rotational shaft positioned diametrically centrally in said tubular turbine casing, and a turbine impeller mounted on an end of said rotational shaft; and
said booster pump comprising a tubular booster pump casing having an inlet port and an outlet port, said rotational shaft positioned diametrically centrally in said tubular booster pump casing, and a booster pump impeller mounted on an end of said rotational shaft.

24. A power recovery system according to claim 23, wherein said tubular turbine casing and said tubular booster pump casing are disposed parallel to each other, said rotational shaft extending through said tubular turbine casing and said tubular booster pump casing and being rotatably supported by a support member provided on said tubular turbine casing and said tubular booster pump casing.

25. A power recovery system according to claim 23, wherein said turbine impeller comprises an axial-flow impeller and said booster pump impeller comprises an axial-flow impeller.

26. A power recovery system according to claim 19,
said turbine comprising a turbine casing having an inlet port and an outlet port, said rotational shaft positioned in said turbine casing, and a turbine impeller mounted on an end of said rotational shaft;
said booster pump comprising a booster pump casing having an inlet port and an outlet port, said rotational shaft positioned in said booster pump casing, and a booster pump impeller mounted on an end of said rotational shaft; and
said turbine casing and said booster casing having respective end faces, which are remote from said inlet and outlet ports, held in abutment against and fastened to each other in an axial direction of said rotational shaft, said rotational shaft being rotatably supported by a bearing device disposed between said turbine casing and said booster casing.

27. A power recovery apparatus according to claim 26, wherein said turbine impeller is rotatably supported by a bearing device in said turbine casing.

28. A power recovery apparatus according to claim 26, wherein said turbine impeller comprises a centrifugal impeller and said booster pump impeller comprises a mixed-flow impeller or an axial-flow impeller.

29. A power recovery system according to claim 20, wherein the flow rate of said high-pressure water discharged from said high-pressure pump is controlled by a high-pressure pump outlet valve, a valve opening of said high-pressure pump outlet valve being controlled based on measured data from a treated water flow meter for measuring the flow rate of the treated water or measured data from a supply water flow meter for measuring the flow rate of the raw water discharged from said intake pump.

30. A power recovery system according to claim 19, wherein a valve opening of a turbine inlet valve connected to an inlet port of said turbine is controlled so that the rotational speed of said pump turbine becomes constant; and
a valve opening of a booster pump outlet valve for controlling the flow rate of the boosted water pressurized by said booster pump is controlled so that the flow rate of a supply water bypass flow meter for measuring the flow rate of the raw water to be introduced into a switching valve of said positive-displacement piston pump reaches a target value.

* * * * *